(12) United States Patent
Mascari et al.

(10) Patent No.: US 9,211,650 B2
(45) Date of Patent: Dec. 15, 2015

(54) POWER OPERATED ROTARY KNIFE

(71) Applicant: BETTCHER INDUSTRIES, INC., Birmingham, OH (US)

(72) Inventors: Nicholas A. Mascari, Wellington, OH (US); Jeffrey A. Whited, Amherst, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 0 days.

(21) Appl. No.: 14/291,852

(22) Filed: May 30, 2014

(65) Prior Publication Data
US 2014/0259698 A1    Sep. 18, 2014

Related U.S. Application Data

(63) Continuation of application No. 13/420,039, filed on Mar. 14, 2012, now Pat. No. 8,739,416, which is a continuation-in-part of application No. 13/189,951, filed on Jul. 25, 2011, now Pat. No. 8,806,761.

(51) Int. Cl.
*B26B 7/00* (2006.01)
*B26B 25/00* (2006.01)
(Continued)

(52) U.S. Cl.
CPC ............... *B26B 25/002* (2013.01); *A22B 5/165* (2013.01); *A22C 17/12* (2013.01);
(Continued)

(58) Field of Classification Search
CPC . B26B 25/002; F16C 33/422; F16C 33/3825; A22C 17/12; A22B 5/165
USPC ............... 30/347, 276, 272.1; 16/2.5; 83/331, 83/469, 824, 825; 384/523, 470, 527
See application file for complete search history.

(56) References Cited

U.S. PATENT DOCUMENTS 676,772 A    7/1901  Brandt 1,220,345 A *  3/1917  Koster ........................... 384/571
(Continued)

FOREIGN PATENT DOCUMENTS

DE    2906128 A1    8/1980
DE    19958802 C2    7/2001
(Continued)

OTHER PUBLICATIONS

International Search Report dated Oct. 5, 2012 and Written Opinion of the International Searching Authority dated Oct. 5, 2012 for PCT Application No. PCT/US2012/046684, filed Jul. 13, 2012. PCT International Application No. PCT/US2012/048584 corresponds to and claims priority from U.S. Appl. No. 13/189,951, filed Jul. 25, 2011, issued as U.S. Pat. No. 8,806,761 on Aug. 19, 2014. The parent application (U.S. Appl. No. 12/420,039, filed Mar. 14, 2012) of the present application is continuation-in-part application of U.S. Appl. No. 13/189,951, filed Jul. 25, 2011, (17 pages).
(Continued)

*Primary Examiner* — Sean Michalski
(74) *Attorney, Agent, or Firm* — Tarolli, Sundheim, Covell & Tummino LLP

(57) ABSTRACT

A rolling bearing strip for a power operated rotary knife providing bearing support for rotation of a rotary knife blade with respect to a blade housing. The rolling bearing strip includes: a plurality of rolling bearings disposed in spaced apart relation; and a flexible separator cage for positioning the plurality of spaced apart rolling bearings, the flexible separator cage including interlocking first and second ends, the first end of the separator cage including a wall defining a projecting member and the second end of the separator cage including a wall defining a receiving member, the first end projecting member and the second end receiving member being in opposed facing relationship and the first end projecting member extending into the second end receiving member to secure the first end to the second end and form an annular, continuous rolling bearing ring.

20 Claims, 61 Drawing Sheets

(51) Int. Cl.
*A22B 5/16* (2006.01)
*A22C 17/12* (2006.01)
*F16C 33/38* (2006.01)
*F16C 33/42* (2006.01)
*F16C 33/54* (2006.01)

(52) U.S. Cl.
CPC .......... *F16C 33/3825* (2013.01); *F16C 33/422* (2013.01); *F16C 33/425* (2013.01); *F16C 33/543* (2013.01); *F16C 2226/76* (2013.01)

(56) References Cited

U.S. PATENT DOCUMENTS

| | | | |
|---|---|---|---|
| 1,374,988 A * | 4/1921 | Cooper | 384/505 |
| 1,476,345 A | 12/1923 | McGee | |
| 2,266,888 A | 12/1941 | McCurdy et al. | |
| 2,566,421 A * | 9/1951 | Lapointe | 384/526 |
| 2,827,657 A * | 3/1958 | Bettcher | 452/137 |
| 2,883,244 A * | 4/1959 | Berger | 384/49 |
| 3,150,409 A * | 9/1964 | Wilcox | 452/86 |
| RE25,947 E | 12/1965 | Bettcher | |
| 3,269,010 A * | 8/1966 | Bettcher | 30/276 |
| 3,592,519 A * | 7/1971 | Martin | 384/503 |
| 3,816,875 A | 6/1974 | Duncan et al. | |
| 4,082,232 A * | 4/1978 | Brewer | 241/236 |
| 4,170,063 A | 10/1979 | Bettcher | |
| 4,178,683 A * | 12/1979 | Bettcher | 30/276 |
| 4,198,750 A * | 4/1980 | Bettcher | 30/276 |
| 4,236,531 A | 12/1980 | McCullough | |
| 4,267,759 A | 5/1981 | Sullivan et al. | |
| 4,326,361 A | 4/1982 | McGill | |
| 4,363,170 A | 12/1982 | McCullough | |
| 4,418,591 A * | 12/1983 | Astle | 82/113 |
| 4,439,924 A | 4/1984 | Bettcher | |
| 4,494,311 A * | 1/1985 | McCullough | 30/276 |
| 4,509,261 A * | 4/1985 | Bettcher | 30/276 |
| 4,516,323 A * | 5/1985 | Bettcher et al. | 30/276 |
| 4,575,938 A * | 3/1986 | McCullough | 30/276 |
| 4,609,227 A | 9/1986 | Wild et al. | |
| 4,637,140 A * | 1/1987 | Bettcher | 30/276 |
| 4,829,860 A * | 5/1989 | VanderPol | 82/113 |
| 4,854,046 A * | 8/1989 | Decker et al. | 452/149 |
| 4,865,473 A | 9/1989 | De Vito | |
| 4,909,640 A | 3/1990 | Nakanishi | |
| 4,942,665 A | 7/1990 | McCullough | |
| 5,033,876 A | 7/1991 | Kraus | |
| 5,071,264 A | 12/1991 | Franke et al. | |
| 5,099,721 A | 3/1992 | Decker et al. | |
| 5,331,877 A | 7/1994 | Ishii | |
| 5,419,619 A | 5/1995 | Lew | |
| 5,522,142 A * | 6/1996 | Whited | 30/276 |
| 5,529,532 A * | 6/1996 | Desrosiers | 451/344 |
| 5,664,332 A * | 9/1997 | Whited et al. | 30/276 |
| 5,692,307 A * | 12/1997 | Whited et al. | 30/276 |
| 5,749,661 A | 5/1998 | Moller | |
| 5,761,817 A * | 6/1998 | Whited et al. | 30/276 |
| 5,971,413 A | 10/1999 | El-Kassouf | |
| 6,089,117 A * | 7/2000 | Ebina et al. | 74/424.87 |
| 6,247,847 B1 | 6/2001 | Lob | |
| 6,364,086 B1 | 4/2002 | Blaurock et al. | |
| 6,604,288 B2 | 8/2003 | Whited et al. | |
| 6,615,494 B2 | 9/2003 | Long et al. | |
| 6,662,452 B2 | 12/2003 | Whited | |
| 6,665,940 B2 | 12/2003 | Sanders et al. | |
| 6,694,649 B2 | 2/2004 | Whited et al. | |
| 6,751,872 B1 | 6/2004 | Whited et al. | |
| 6,769,184 B1 | 8/2004 | Whited | |
| 6,857,191 B2 | 2/2005 | Whited | |
| 6,978,548 B2 | 12/2005 | Whited et al. | |
| 7,000,325 B2 * | 2/2006 | Whited | |
| 7,107,887 B2 | 9/2006 | Whited | |
| 7,207,114 B2 | 4/2007 | Rosu et al. | |
| 8,074,363 B2 | 12/2011 | Whited | |
| 8,448,340 B2 * | 5/2013 | Whited | 30/276 |
| 8,505,207 B2 * | 8/2013 | Thien | 30/276 |
| 8,756,819 B2 * | 6/2014 | Whited et al. | 30/276 |
| 2003/0131482 A1 * | 7/2003 | Long et al. | 30/276 |
| 2006/0137193 A1 | 6/2006 | Whited | |
| 2006/0211966 A1 * | 9/2006 | Hatton et al. | |
| 2007/0283573 A1 * | 12/2007 | Levsen | 30/276 |
| 2007/0283574 A1 | 12/2007 | Levsen | |
| 2008/0098605 A1 | 5/2008 | Whited et al. | |
| 2008/0101736 A1 * | 5/2008 | Wu et al. | 384/45 |
| 2008/0168667 A1 * | 7/2008 | Spinato | 30/391 |
| 2009/0220181 A1 * | 9/2009 | Yamada et al. | 384/513 |
| 2009/0227192 A1 | 9/2009 | Luthi et al. | |
| 2011/0185580 A1 | 8/2011 | Whited | |
| 2011/0247220 A1 | 10/2011 | Whited et al. | |
| 2012/0030952 A1 * | 2/2012 | Levsen | 30/276 |
| 2013/0025134 A1 * | 1/2013 | Mascari et al. | 30/165 |
| 2013/0025136 A1 * | 1/2013 | Whited et al. | 30/276 |
| 2013/0025137 A1 * | 1/2013 | Whited et al. | 30/276 |
| 2013/0025138 A1 * | 1/2013 | Whited et al. | 30/276 |
| 2013/0025139 A1 * | 1/2013 | Whited et al. | 30/276 |
| 2013/0185944 A1 | 7/2013 | Thompson et al. | |
| 2013/0243358 A1 * | 9/2013 | Stork et al. | 384/445 |

FOREIGN PATENT DOCUMENTS

| | | | |
|---|---|---|---|
| EP | 1864576 A1 | 12/2007 | |
| FR | 1216947 | 4/1960 | |
| WO | WO 01/41980 A1 | 6/2001 | |
| WO | WO 2008/107490 A1 | 9/2008 | |

OTHER PUBLICATIONS

International Search Report dated Dec. 20, 2012 and Written Opinion of the International Searching Authority dated Dec. 20, 2012 for PCT International Application No. PCT/US2012/046591, filed Jul. 13, 2012. PCT International Application No. PCT/US2012/046591 corresponds to and claims priority from the parent application (U.S. Appl. No. 13/420,039, filed Mar. 14, 2012) of the present applicalon. PCT International Application No.PCT/US2012/046591 claims priority from the parent application (U.S. Appl. No. 13/420,039, filed Mar. 14,2012) of the present application and from U.S. Appl. No. 13/189,951, filed Jul. 25, 2011, issued as U.S. Pat. No. 8,806,761 on Aug. 19, 2014, (21 pages).
Extended European Search Report dated Jul. 2, 2015 for European Application No. 12817996.7, filed Feb. 25, 2014. European Application No. 12817996.7 is a national phase application of PCT International Application No. PCT/US 2012/046591, (8 pages).
Oct. 3, 2011 Decision and Opinion of the United States Court of Appeals for the Federal Circuit (Appeal No. 2011-1038, -1046) regarding the case styled *Bettcher Industries, Inc.* v. *Bunzl USA, Inc. and Bunzl Processor Distribution, LLC*, Case No. 3:08 CV 2423, U.S. District Court for the Northern District of Ohio, Judge Zouhary. The Decision and Opinion relates to U.S. Pat. No. 7,000,325, owned by the assignee of the present application, (47 pages).
Catalog entitled "Ball Bearing Cages", Publication No. WLK 100 E. Publication Date-Sep. 2, 2004, Published by International Customized Bearings, (34 pages).
Chinese Search Report and Text of First Office Action dated Apr. 23, 2015 for Chinese Application No. 2012800464768, filed Mar. 24, 2014, Chinese Application No. 201280046476.8 is a national phase application of PCT International Application No. PCT/US2012/046591. (D1 cited in the Search Report, namely CN101088347A is a Chinese Patent Publication which corresponds to U.S. Published Application No. US2007/0283573) (17 pages).

* cited by examiner

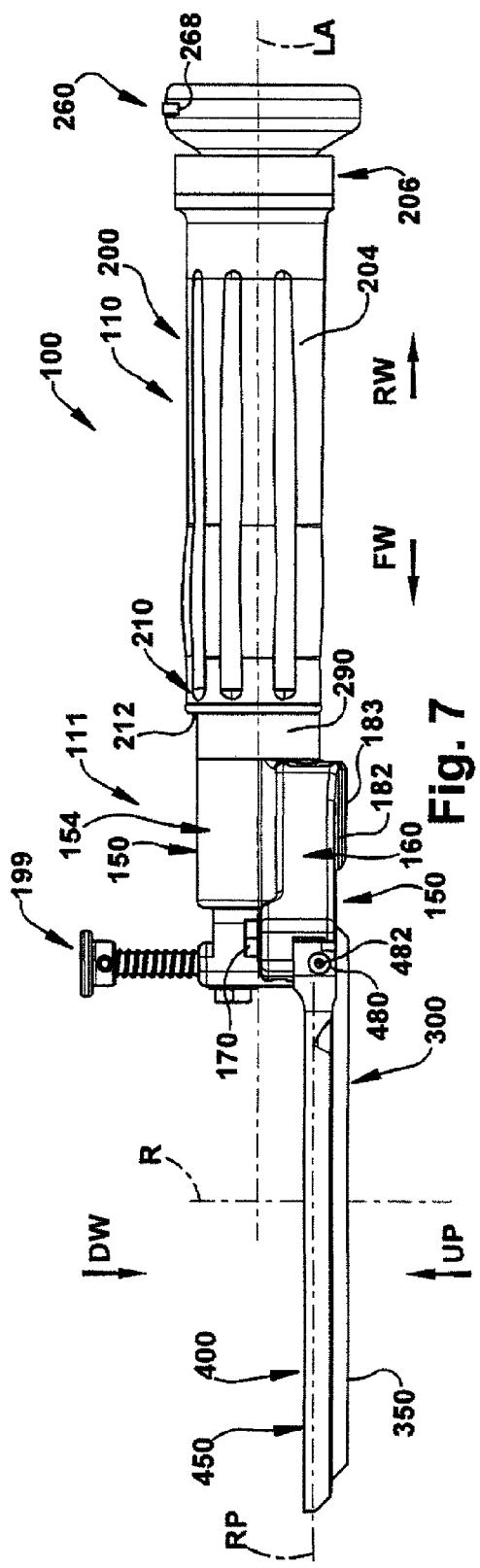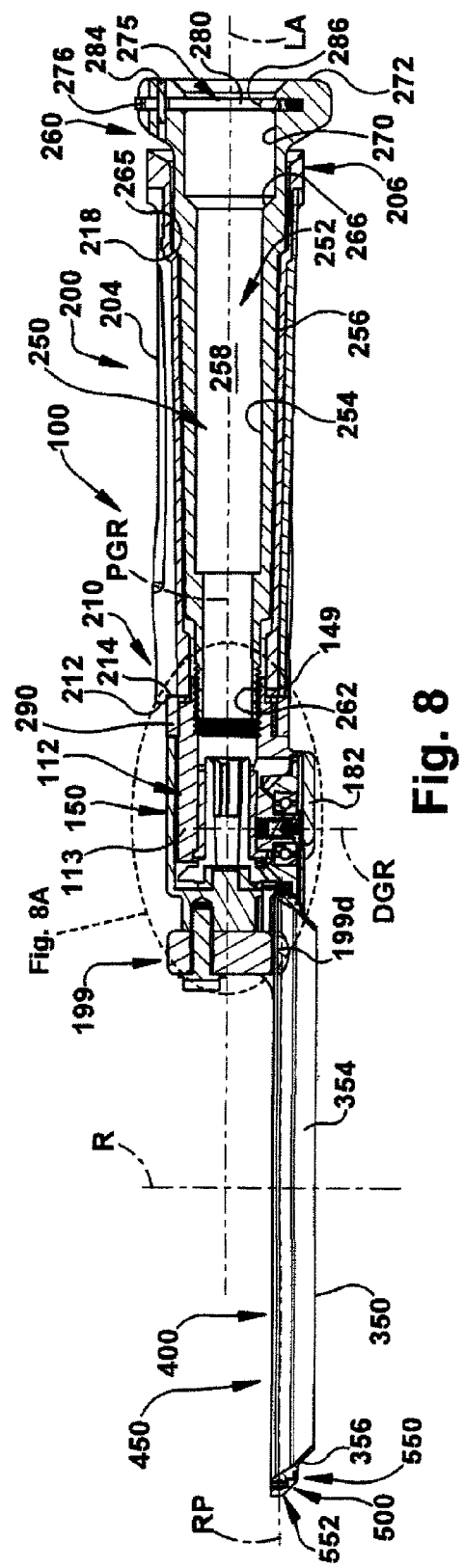

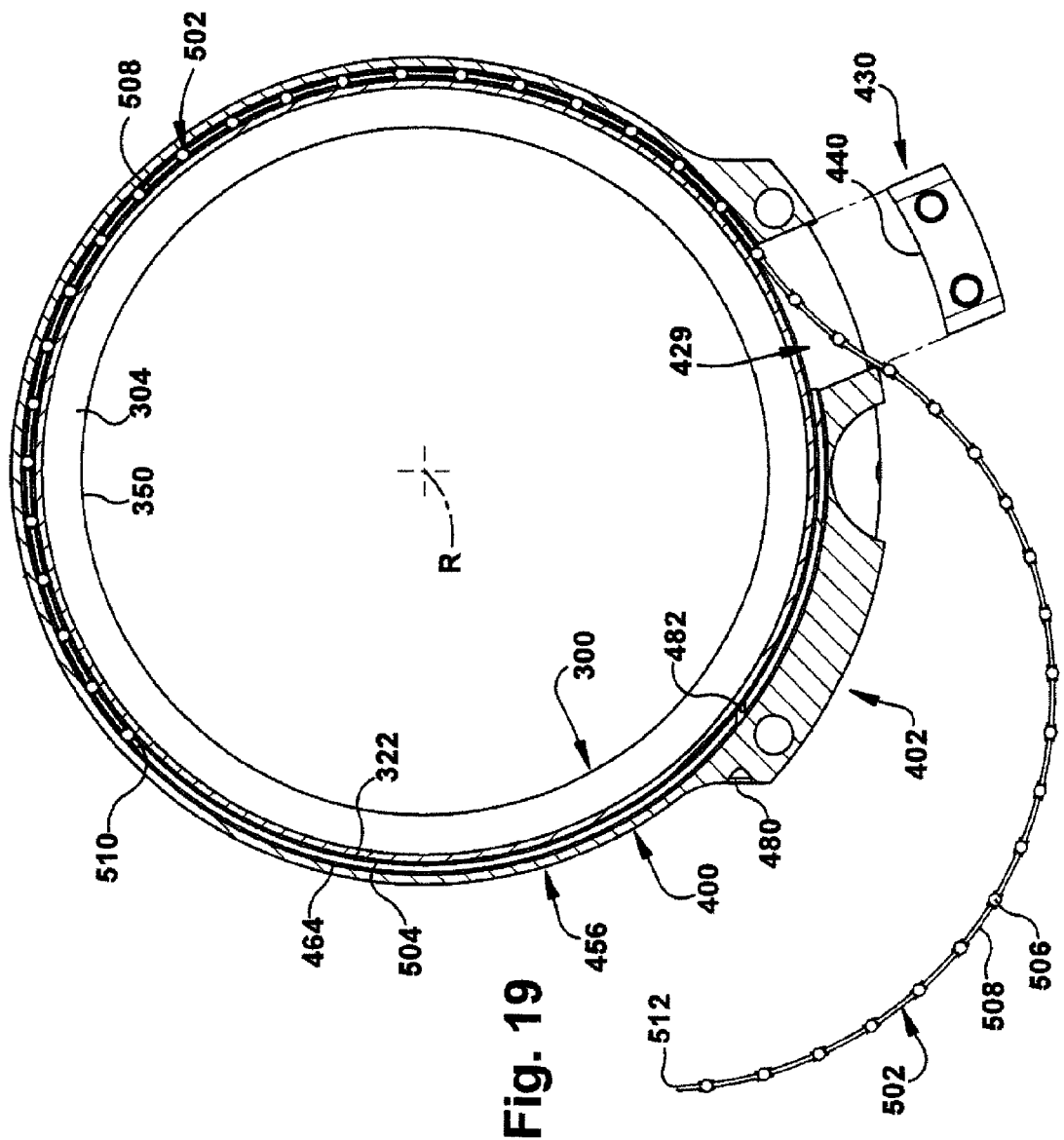

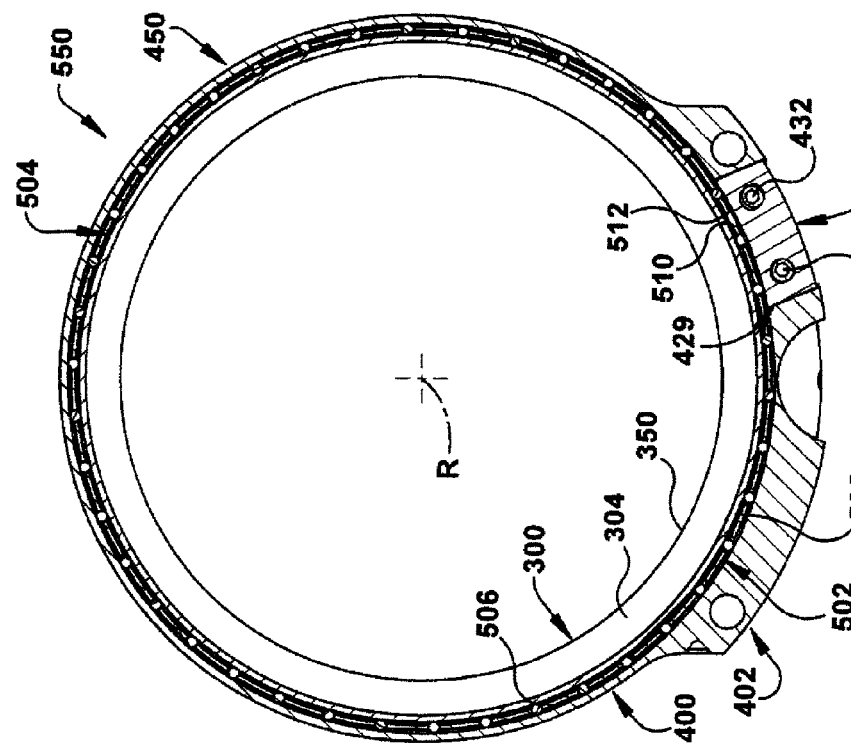
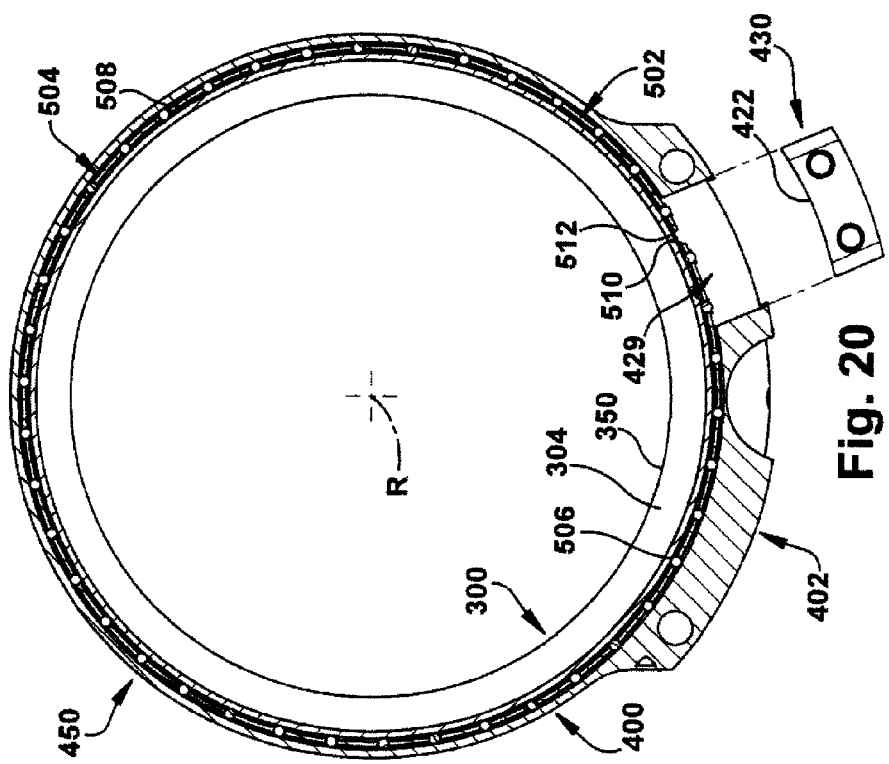

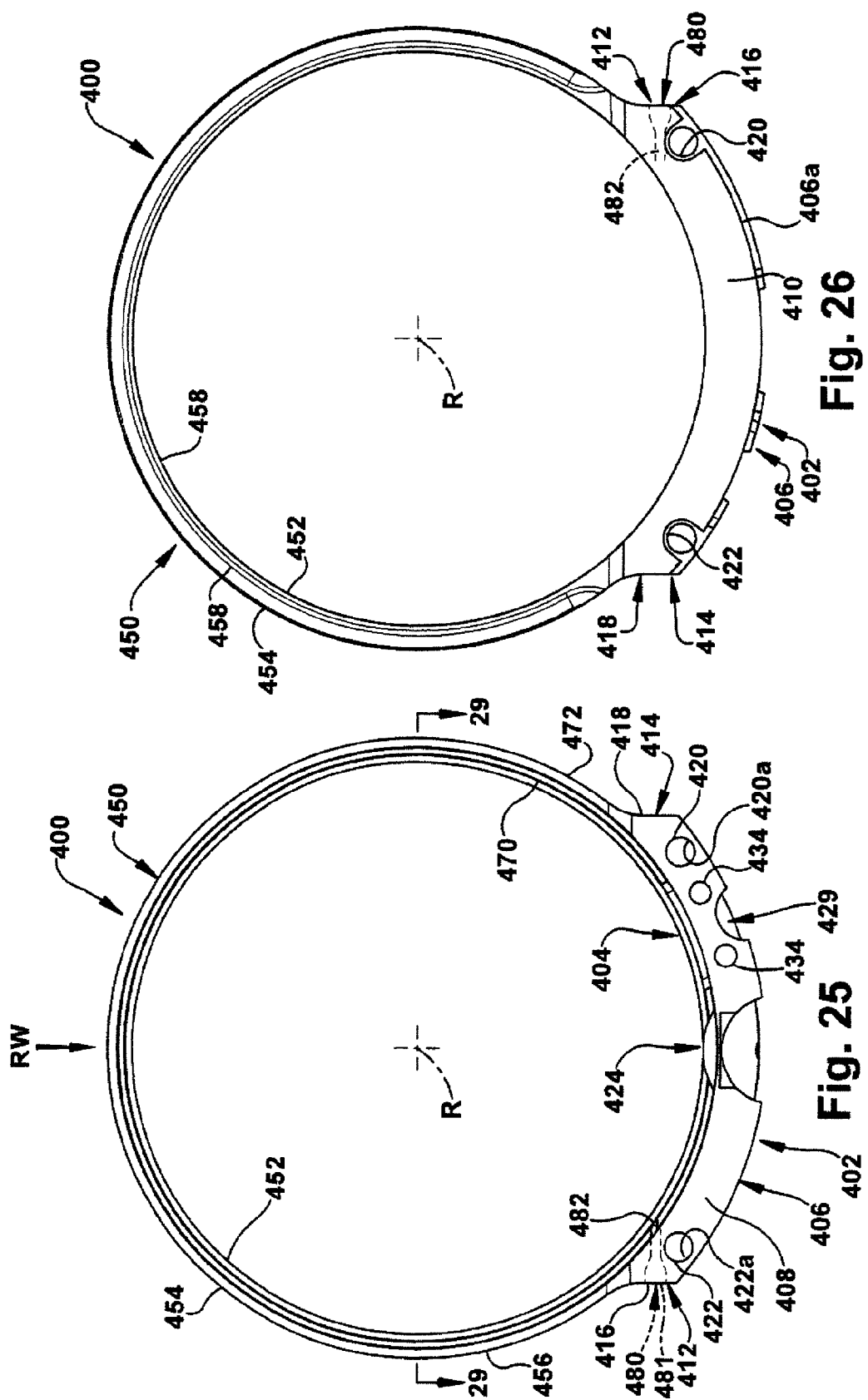

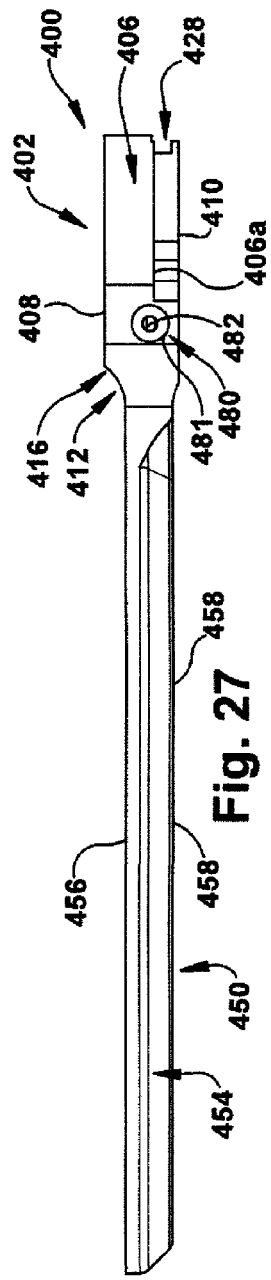
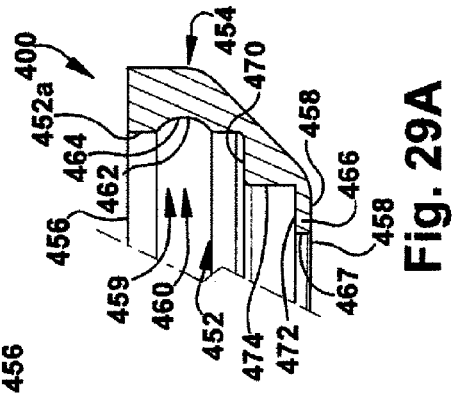
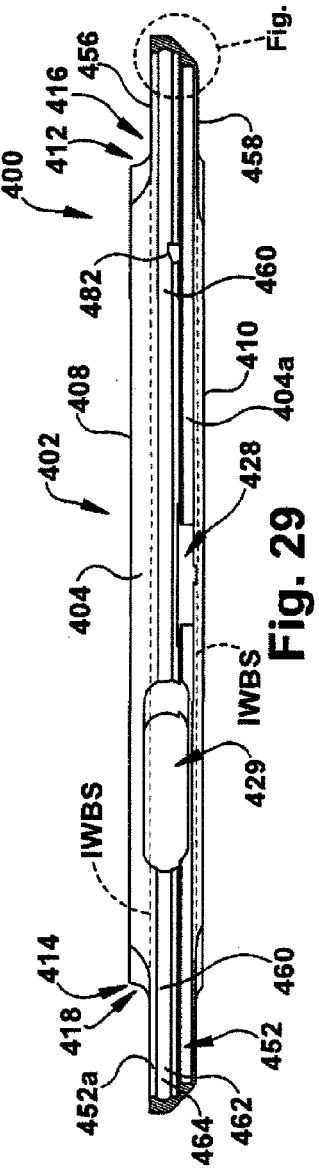
Fig. 27
Fig. 28
Fig. 29
Fig. 29A

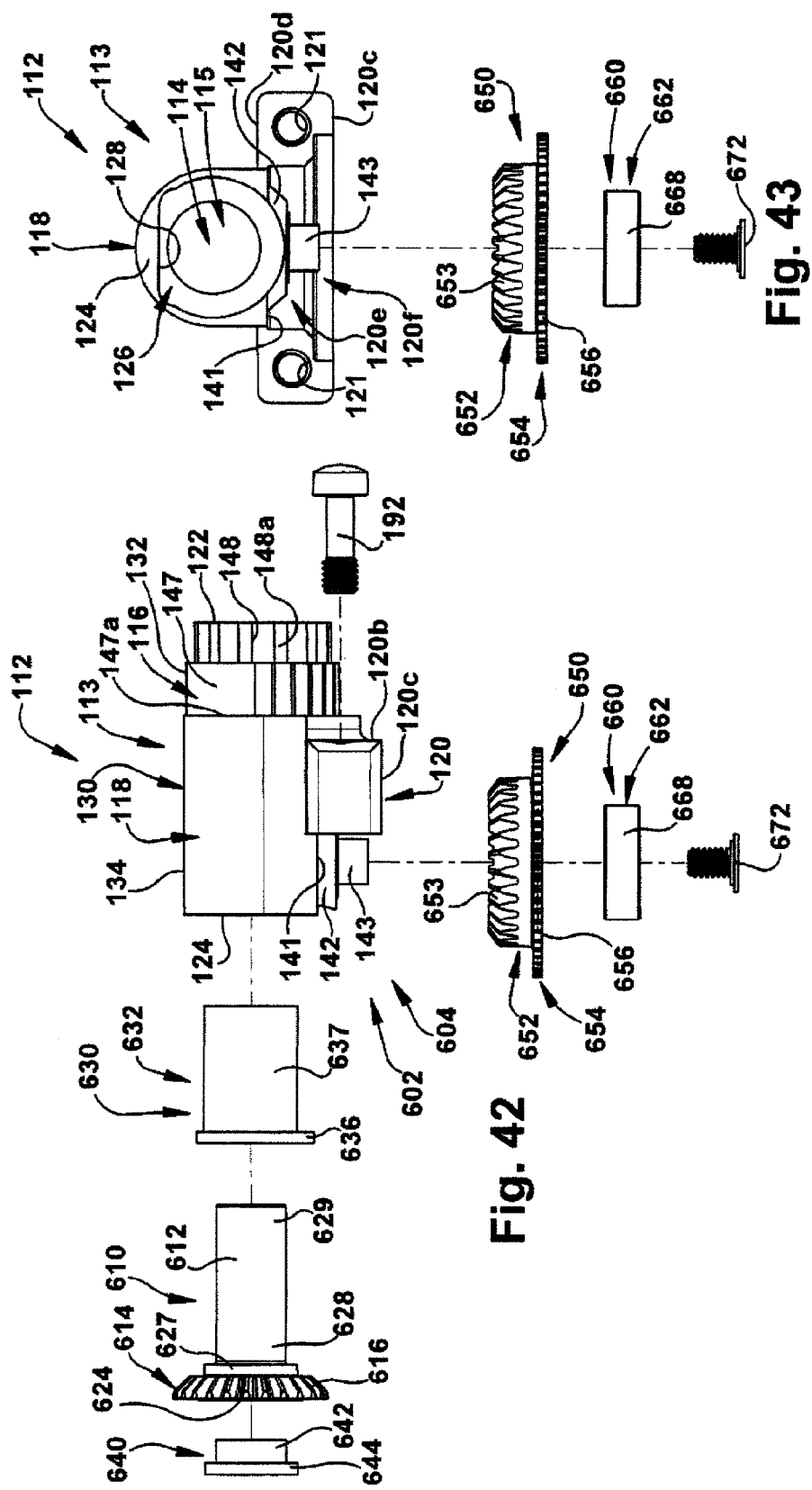

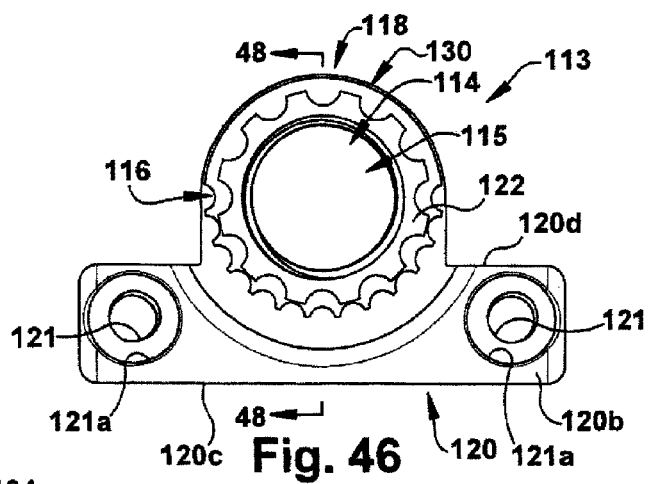
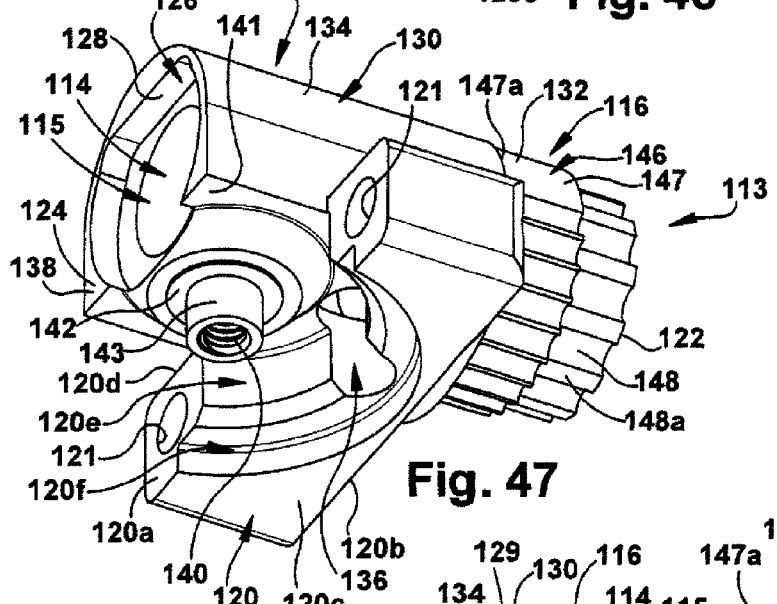
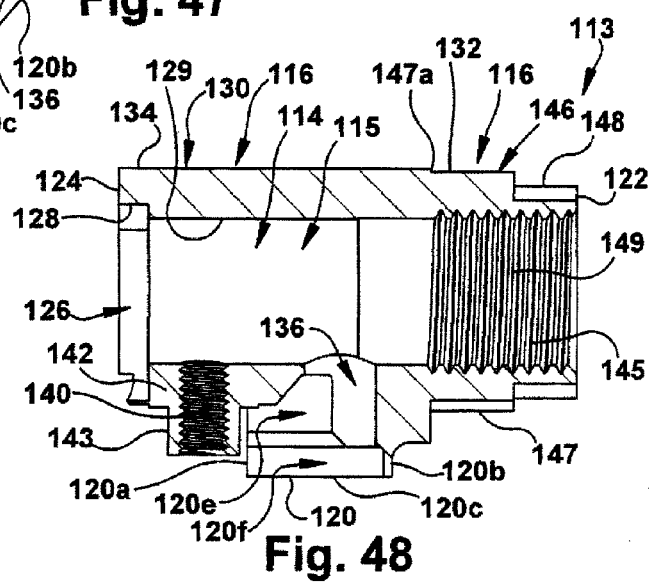

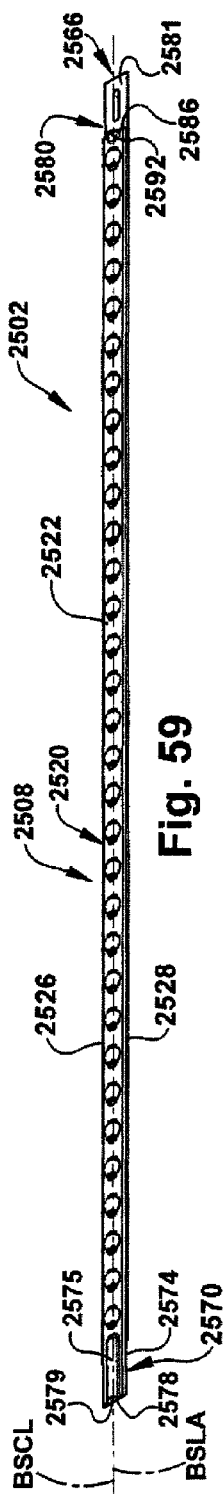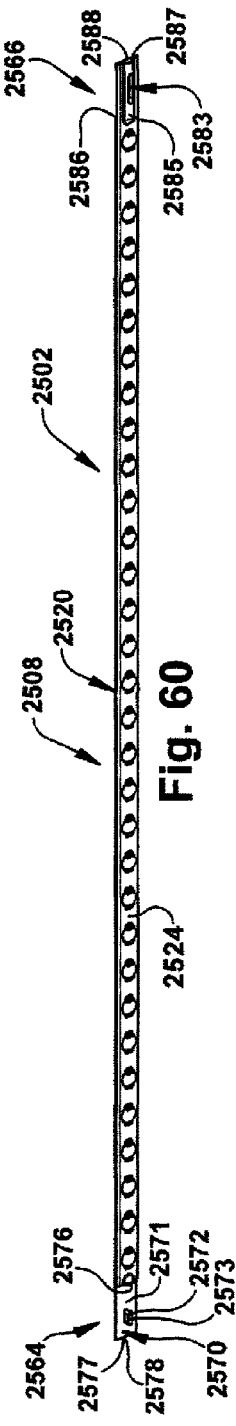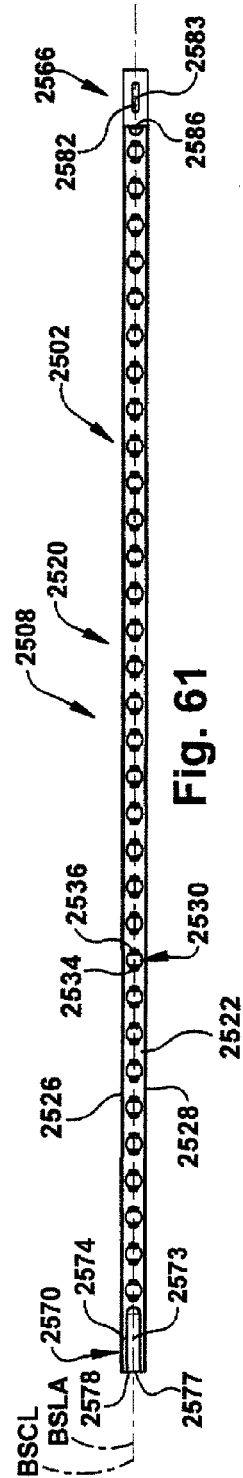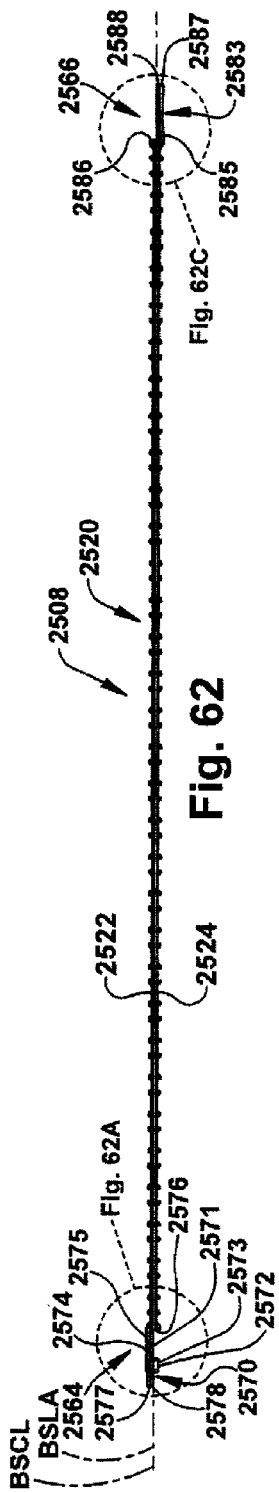

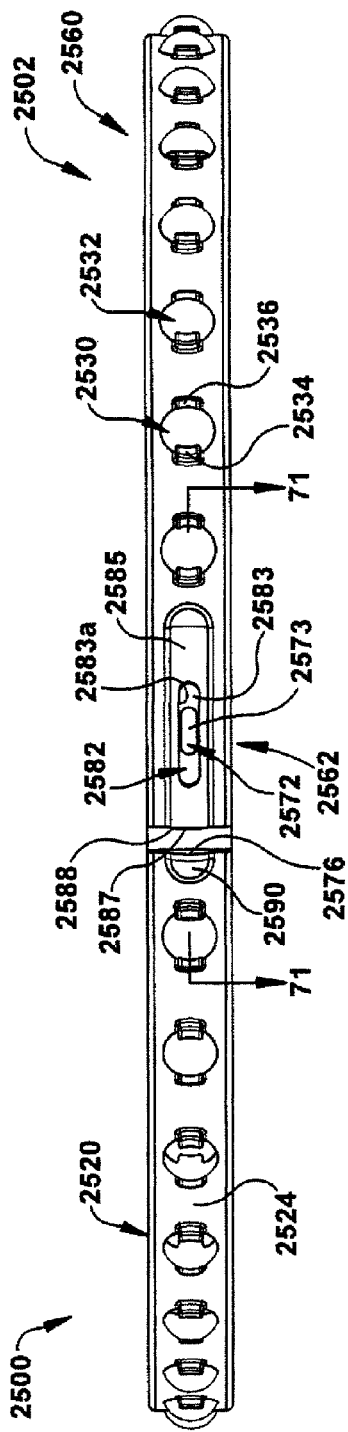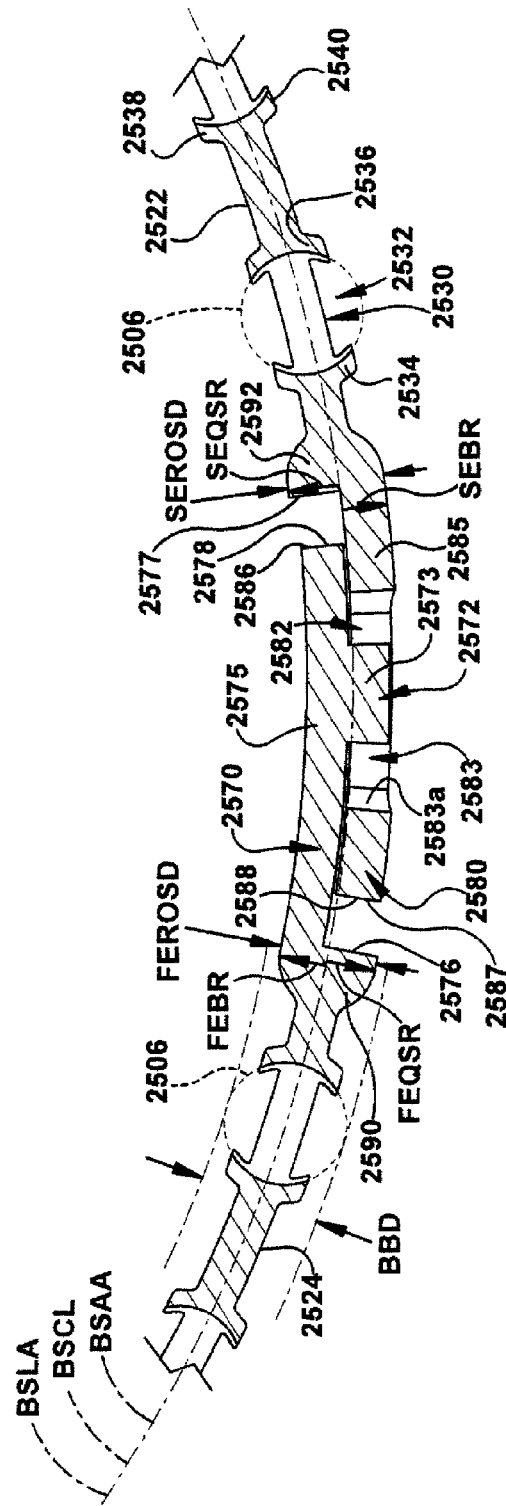
Fig. 70
Fig. 71

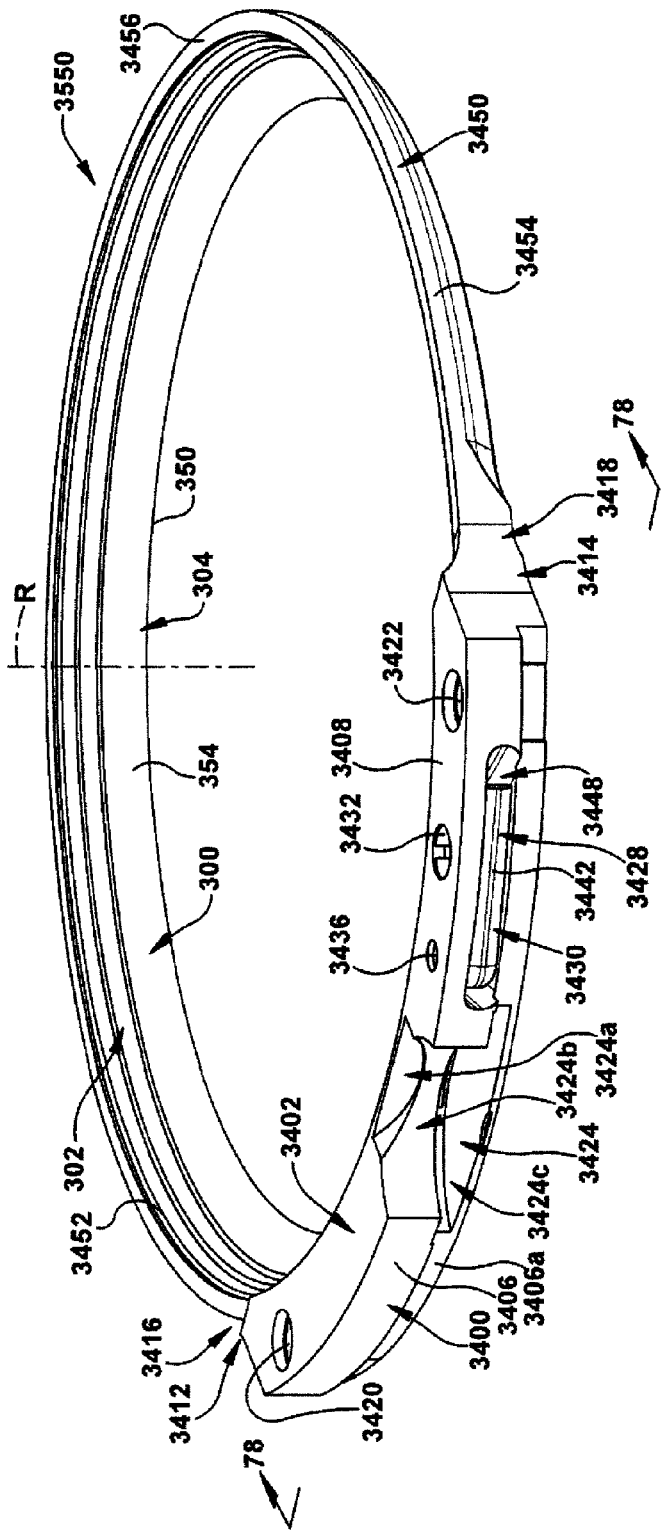
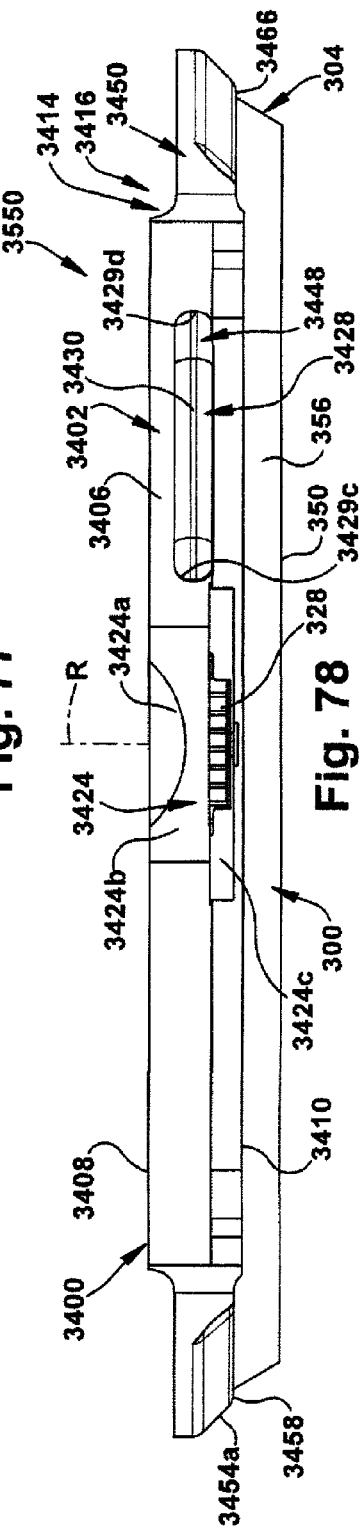
Fig. 77
Fig. 78

POWER OPERATED ROTARY KNIFE

CROSS-REFERENCE TO RELATED APPLICATION

This application claims priority to and is a continuation of currently pending U.S. application Ser. No. 13/420,039, filed on Mar. 14, 2012, published as U.S. Publication No. US-2013-0025134-A1 on Jan. 31, 2013, issuing as U.S. Pat. No. 8,739,416 on Jun. 3, 2014, which is a continuation-in-part of currently pending U.S. application Ser. No. 13/189,951, filed on Jul. 25, 2011, published as U.S. Publication No. US-2013-025139-A1 on Jan. 31, 2013. U.S. application Ser. No. 13/420,039 and U.S. Publication No. US-2013-0025134-A1 and U.S. application Ser. No. 13/189,951 and U.S. Publication No. US-2013-0025139-A1 are incorporated herein in their respective entireties by reference for any and all purposes.

TECHNICAL FIELD

The present disclosure relates to a power operated rotary knife.

BACKGROUND

Power operated rotary knives are widely used in meat processing facilities for meat cutting and trimming operations. Power operated rotary knives also have application in a variety of other industries where cutting and/or trimming operations need to be performed quickly and with less effort than would be the case if traditional manual cutting or trimming tools were used, e.g., long knives, scissors, nippers, etc. By way of example, power operated rotary knives may be effectively utilized for such diverse tasks as taxidermy and cutting and trimming of elastomeric or urethane foam for a variety of applications including vehicle seats.

Power operated rotary knives typically include a handle assembly and a head assembly attachable to the handle assembly. The head assembly includes an annular blade housing and an annular rotary knife blade supported for rotation by the blade housing. The annular rotary blade of conventional power operated rotary knives is typically rotated by a drive assembly which include a flexible shaft drive assembly extending through an opening in the handle assembly. The shaft drive assembly engages and rotates a pinion gear supported by the head assembly. The flexible shaft drive assembly includes a stationary outer sheath and a rotatable interior drive shaft which is driven by a pneumatic or electric motor. Gear teeth of the pinion gear engage mating gear teeth formed on an upper surface of the rotary knife blade.

Upon rotation of the pinion gear by the drive shaft of the flexible shaft drive assembly, the annular rotary blade rotates within the blade housing at a high RPM, on the order of 900-1900 RPM, depending on the structure and characteristics of the drive assembly including the motor, the shaft drive assembly, and a diameter and the number of gear teeth formed on the rotary knife blade. Conventional power operated rotary knives are disclosed in U.S. Pat. No. 6,354,949 to Baris et al., U.S. Pat. No. 6,751,872 to Whited et al., U.S. Pat. No. 6,769,184 to Whited, and U.S. Pat. No. 6,978,548 to Whited et al., all of which are assigned to the assignee of the present invention and all of which are incorporated herein in their respective entireties by reference.

SUMMARY

In one aspect, the present disclosure relates a power operated rotary knife comprising: an annular rotary knife blade including a wall defining a knife blade bearing surface; a blade housing including a wall defining a blade housing bearing surface; and a blade-blade housing bearing structure disposed between the knife blade bearing surface and the blade housing bearing surface, the blade-blade housing bearing structure supporting the knife blade for rotation with respect to the blade housing about a knife blade central axis, the blade-blade housing bearing structure including an elongated rolling bearing strip that extends circumferentially around the knife blade central axis between the knife blade bearing surface and the blade housing bearing surface. In one exemplary embodiment, the elongated rolling bearing strip comprises a plurality of rolling bearings disposed in spaced apart relation and a flexible separator cage for positioning the plurality of spaced apart rolling bearings.

In another aspect, the present disclosure relates to a support structure for use with a power operated rotary knife including an annular rotary knife blade rotating about a central axis and an annular blade housing, the support structure disposed between a knife blade bearing surface and a blade housing bearing surface to secure and rotatably support the knife blade with respect to the blade housing, the support structure comprising: an elongated rolling bearing strip having a plurality of rolling bearings disposed in spaced apart relation and a flexible separator cage for positioning the plurality of spaced apart rolling bearings, the rolling bearing strip extending circumferentially between the knife blade bearing surface and the blade housing bearing surface, the separator cage forming at least a portion of a circle and each of the plurality of rolling bearings extending radially from the separator cage and adapted to contact the knife blade bearing surface and the blade housing bearing surface.

In another aspect, the present disclosure relates to a method of supporting an annular knife blade for rotation about a central axis in a blade housing of a power operated rotary knife, the method comprising: aligning a knife blade and blade housing such that a bearing surface of the knife blade is in radial alignment with a bearing surface of the blade housing, the knife blade bearing surface and the blade housing bearing surface defining an annular passageway; and routing a rolling bearing strip along the annular passageway such that the strip extends circumferentially around the knife blade central axis between the knife blade bearing surface and the blade housing bearing surface forming at least a portion of a circle about the central axis.

In another aspect, the present disclosure relates to a power operated rotary knife comprising: a head assembly including a gearbox assembly, an annular rotary knife blade, a blade housing, and a blade-blade housing bearing structure; the blade housing coupled to the gearbox assembly and including an annular blade support section defining a bearing surface formed on an inner wall of the annular blade support section; the annular rotary knife blade including a body and a blade section extending axially from the body, the body including a first, upper end and a lower, second end spaced axially apart and an inner wall and an outer wall spaced radially apart, the blade section extending from the lower end of the body, the outer wall defining a knife blade bearing surface and a set of gear teeth, the set of gear teeth being axially spaced from the upper end of the body and from the knife blade bearing surface; the blade-blade housing bearing structure disposed between the knife blade bearing surface and the blade housing bearing surface; and a gear train of the gearbox assembly, the gear train including a drive gear having a plurality of gear teeth that mesh with the set of gear teeth of the knife blade to rotate the knife blade with respect to the blade housing.

In another aspect, the present disclosure relates to an annular rotary knife blade for rotation about a central axis in a power operated rotary knife, the rotary knife blade comprising: an annular rotary knife blade including a body and a blade section extending axially from the body, the body including a first upper end and a second lower end spaced axially apart and an inner wall and an outer wall spaced radially apart; the blade section extending from the lower end of the body; and the outer wall defining a knife blade bearing surface and a set of gear teeth, the set of gear teeth being axially spaced from the upper end of the body and axially spaced from the knife blade bearing surface.

In another aspect, the present disclosure relates to a power operated rotary knife comprising: a gearbox assembly including a gearbox housing and a gearbox; a blade housing coupled to the gearbox housing; and an annular rotary knife blade including an upper end and an axially spaced apart lower end, the lower end defining a cutting edge of the blade, the knife blade further including an outer wall defining a set of gear teeth, the set of gear teeth being axially spaced from the upper end of the knife blade, the knife blade rotating about a central axis with respect to the blade housing; the gearbox comprising a gear train including a pinion gear and a drive gear, the pinion gear engaging and rotating the drive gear and the drive gear engaging and rotating the knife blade about the central axis; and the drive gear comprising a double gear including a first gear engaging and being rotated by the pinion gear about a rotational axis of the drive gear and a second gear engaging the set of gear teeth of the knife blade to rotate the knife blade about the central axis, the first and second gears of the drive gear being concentric with the drive gear rotational axis.

In another aspect, the present disclosure relates to a gear train supported in a gearbox housing of a power operated rotary knife to rotate an annular rotary knife blade about a central axis, the gear train comprising: a pinion gear and drive gear wherein the pinion gear engages and rotates the drive gear and the drive gear is configured to engage and rotate an annular rotary knife blade; and wherein the drive gear comprises a double gear including a first gear engaging and being rotated by the pinion gear about a rotational axis of the drive gear and a second gear configured to engage an annular rotary knife blade, the first and second gears of the drive gear being concentric with the drive gear rotational axis.

In another aspect, the present disclosure relates to an annular blade housing for a power operated rotary knife, the blade housing comprising: an inner wall and an outer wall, the inner wall defining a blade housing bearing surface, the blade housing further including a cleaning port having an entry opening and exit opening, the exit opening being in the inner wall and in fluid communication with the blade housing bearing surface.

In another aspect, the present disclosure relates to a power operated rotary knife comprising: an annular rotary knife blade including a wall defining a knife blade bearing surface; an annular blade housing comprising an inner wall and an outer wall, the inner wall defining a blade housing bearing surface on the inner wall; a blade-blade housing bearing structure disposed between the knife blade bearing surface and the blade housing bearing surface, the blade-blade housing bearing structure supporting the knife blade for rotation with respect to the blade housing about a knife blade central axis; and the blade housing further including a cleaning port extending radially between the inner wall and the outer wall, cleaning port including an entry opening and an exit opening, the exit opening being in the inner wall and in fluid communication with the blade housing bearing surface.

In another aspect, the present disclosure relates to an annular blade housing for a power operated rotary knife, the blade housing comprising: an inner wall and an outer wall, the inner wall defining a blade housing bearing surface, the blade housing further including a blade housing plug opening extending between and through the inner wall and the outer wall, an end of the blade housing plug opening at the inner wall intersecting the blade housing bearing surface to provide access to the blade housing bearing surface through the blade housing plug opening, and a blade housing plug configured to be releasably secured within the blade housing plug opening.

In another aspect, the present disclosure relates to a power operated rotary knife comprising: an annular rotary knife blade including a wall defining a knife blade bearing surface; an annular blade housing comprising an inner wall and an outer wall, the inner wall defining a blade housing bearing surface; a blade-blade housing bearing structure disposed between the knife blade bearing surface and the blade housing bearing surface, the blade-blade housing bearing structure supporting the knife blade for rotation with respect to the blade housing about a knife blade central axis; and wherein the blade housing further includes a blade housing plug opening extending between and through the inner wall and the outer wall, an end of the blade housing plug opening at the inner wall intersecting the blade housing bearing surface to provide access to the blade housing bearing surface through the blade housing plug opening, and a blade housing plug configured to be releasably secured within the blade housing plug opening.

In another aspect, the present disclosure relates to an annular blade housing comprising: an inner wall and an outer wall, a section of the inner wall defining a blade housing bearing surface, the blade housing bearing surface being axially spaced from opposite first and second ends of the inner wall, the blade housing further including a projection at one of the first and second ends of the inner wall, the projection extending radially inwardly with respect to the section of the inner wall defining the blade housing bearing surface.

In another aspect, the present disclosure relates to a power operated rotary knife comprising: an annular rotary knife blade including a wall defining a knife blade bearing surface; an annular blade housing comprising an inner wall and an outer wall, the inner wall defining a blade housing bearing surface; a blade-blade housing bearing structure disposed between the knife blade bearing surface and the blade housing bearing surface, the blade-blade housing bearing structure supporting the knife blade for rotation with respect to the blade housing about a knife blade central axis; and wherein the blade housing further includes a projection at one of the first and second ends of the inner wall, the projection extending radially inwardly with respect to the section of the inner wall defining the blade housing bearing surface.

In another aspect, the present disclosure relates to a rolling bearing strip for a power operated rotary knife providing bearing support for rotation of a rotary knife blade with respect to a blade housing, the rolling bearing strip comprising: a plurality of rolling bearings disposed in spaced apart relation; and a flexible separator cage for positioning the plurality of rolling bearings, the flexible separator cage including interlocking first and second ends, the first end of the separator cage including a wall defining a projecting member and the second end of the separator cage including a wall defining a receiving member, the first end projecting member and the second end receiving member being in opposed facing relationship and the first end projecting member extending into the second end receiving member to secure the first end to the second end and form a continuous ring.

In another aspect, the present disclosure relates to a rolling bearing strip for a power operated rotary knife providing bearing support for rotation of a rotary knife blade with respect to a blade housing of the power operated rotary knife, the rolling bearing strip comprising: a plurality of rolling bearings disposed in spaced apart relation; a flexible separator cage for positioning the plurality of rolling bearings, the flexible separator cage including interlocking first and second ends, the first end of the separator cage including a wall having a projection extending transversely from the wall and the second end of the separator cage including a wall defining a slot extending radially into the wall, the first end wall and second end wall being in opposed facing relationship and the first end wall projection extending into the second end wall slot to secure the first end to the second end and form a continuous ring.

In another aspect, the present disclosure relates to an annular blade housing for a power operated rotary knife, the blade housing comprising: an inner wall and an outer wall, the inner wall defining a blade housing bearing surface, the blade housing further including a blade housing plug opening extending between and through the inner wall and the outer wall, an end of the blade housing plug opening at the inner wall intersecting the blade housing bearing surface to provide access to the blade housing bearing surface through the blade housing plug opening, and a blade housing plug being pivotally coupled to the blade housing and sized to at least partially fit within the blade housing plug opening.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which:

FIG. 7 is a schematic right side elevation view of the power operated rotary knife of FIG. 1, as viewed from a front or rotary knife blade end of the power operated knife;

FIG. 8 is a schematic section view taken along a longitudinal axis of the handle assembly of the power operated rotary knife of FIG. 1, as seen from a plane indicated by the line 8-8 in FIG. 3;

FIG. 19 is a schematic section view representation of a method of releasably securing the rotary knife blade to the blade housing utilizing the blade-blade housing bearing structure in the power operated rotary knife of FIG. 1, showing partial insertion of the elongated rolling bearing strip into the annular passageway between the rotary knife blade and the blade housing;

FIG. 20 is a schematic section view representation of a method of releasably securing the rotary knife blade to the blade housing utilizing the blade-blade housing bearing structure in the power operated rotary knife of FIG. 1, showing completion of insertion of the elongated rolling bearing strip into the annular passageway between the knife blade and the blade housing;

FIG. 21 is a schematic section view representation of a method of releasably securing the rotary knife blade to the blade housing utilizing the blade-blade housing bearing structure in the power operated rotary knife of FIG. 1, showing attachment of the blade housing plug to the blade housing after insertion of the elongated rolling bearing strip into the annular passageway between the knife blade and the blade housing;

FIG. 25 is a schematic top plan view of the blade housing of the power operated rotary knife of FIG. 1;

FIG. 26 is a schematic bottom plan view of the blade housing of FIG. 25;

FIG. 27 is a schematic right side elevation view of the blade housing of FIG. 25;

FIG. 28 is a schematic rear elevation view of the blade housing of FIG. 25 showing a blade housing plug opening of a mounting section of the blade housing;

FIG. 29 is a schematic section view of the blade housing of FIG. 25 as seen from a plane indicated by the line 29-29 in FIG. 25;

FIG. 29A is a schematic enlarged section view of a portion of the blade housing of FIG. 25 that is within a dashed circle labeled FIG. 29A in FIG. 29;

FIG. 42 is a schematic exploded side elevation view of the gearbox assembly of FIG. 33;

FIG. 43 is a schematic exploded front elevation view of the gearbox assembly of FIG. 33;

FIG. 46 is a schematic rear elevation view of the gearbox housing of the gearbox assembly of the power operated rotary knife of FIG. 1;

FIG. 47 is a schematic front, bottom perspective view of the gearbox housing of FIG. 46;

FIG. 48 is a schematic longitudinal section view of the gearbox housing of FIG. 46, as seen from a plane indicated by the line 48-48 in FIG. 46;

FIG. 59 is a schematic perspective view of a second exemplary embodiment of an elongated rolling bearing strip of the present disclosure suitable for use in the power operated rotary knife of FIG. 1, the elongated rolling bearing strip depicted in an unlocked or open condition and including a flexible separator cage and a plurality of rolling bearings;

FIG. 60 is another schematic perspective view of the elongated rolling bearing strip of FIG. 59 depicted in an unlocked or open condition;

FIG. 61 is a schematic front elevation view of the elongated rolling bearing strip of FIG. 59 depicted in an unlocked or open condition, with the plurality of rolling bearings removed;

FIG. 62 is a schematic top plan view of the elongated rolling bearing strip of FIG. 59 depicted in an unlocked or open condition, with the plurality of rolling bearings removed;

FIG. 70 is a schematic top plan view of the elongated rolling bearing strip of FIG. 59 depicted in a locked or continuous condition;

FIG. 71 is a schematic section view of a portion the elongated rolling bearing strip of FIG. 59 as seen from a plane indicated by the line 71-71 in FIG. 70, with the plurality of rolling bearings removed;

FIG. 77 is a schematic perspective view of a second exemplary embodiment of a blade housing of the present disclosure suitable for use in the power operated rotary knife of FIG. 1, the blade housing including a hinged, pivotable blade housing plug, the blade housing plug shown in a closed position, the blade housing shown in an assembled combination of a rotary knife blade and blade-blade housing bearing structure of the power operated rotary knife of FIG. 1;

FIG. 78 is a schematic front elevation view of the blade housing of FIG. 77 with the blade housing plug shown in the closed position, as seen from a plane indicated by the line 78-78 in FIG. 77, the blade housing shown in an assembled combination of a rotary knife blade and blade-blade housing bearing structure of the power operated rotary knife of FIG. 1;

DETAILED DESCRIPTION

First Exemplary Embodiment

Power Operated Rotary Knife 100 Overview

Figure 1:
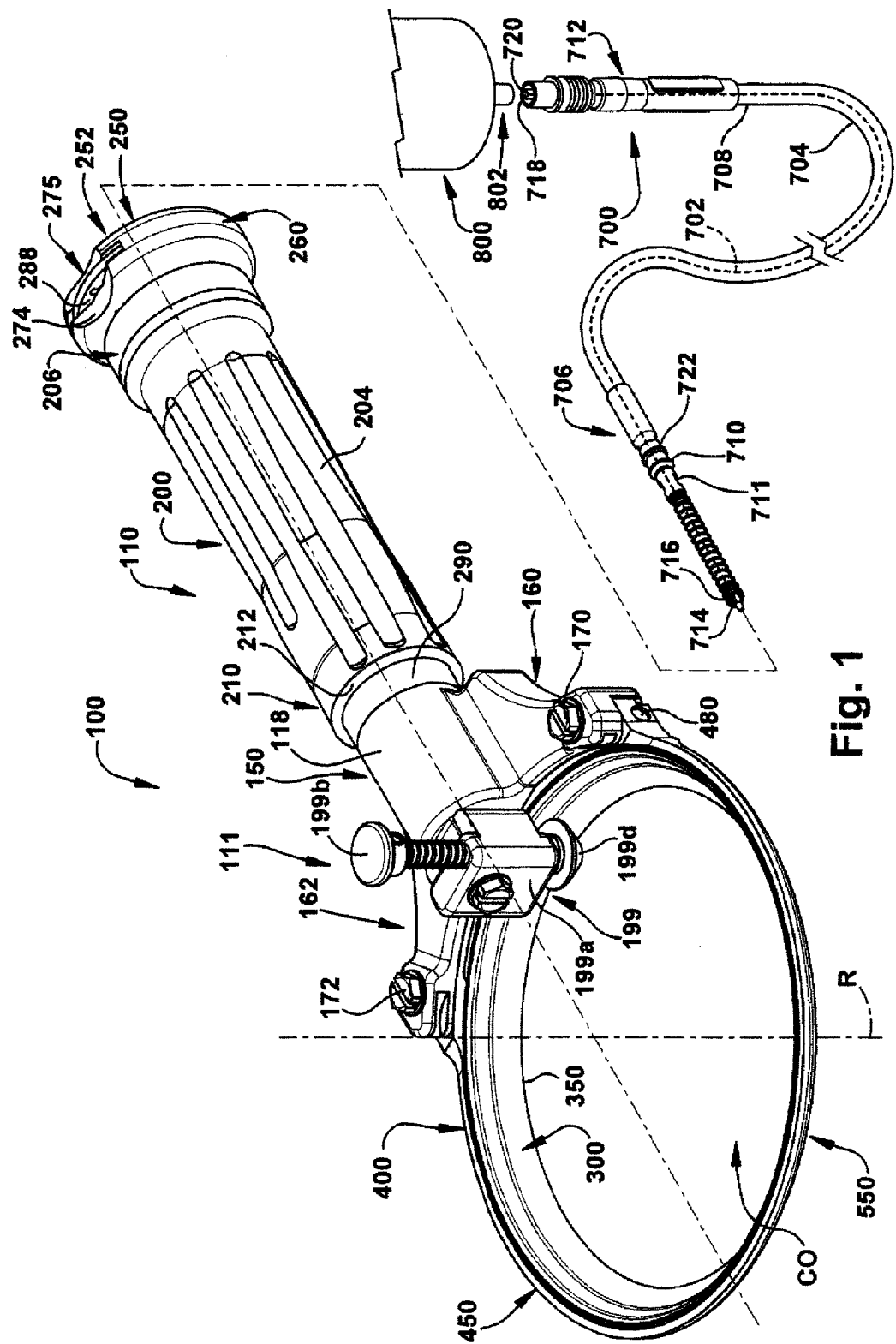
FIG. 1 is a schematic front perspective view of a first exemplary embodiment of a power operated rotary knife of the present disclosure including a head assembly, a handle assembly and a drive mechanism, the head assembly including a gearbox assembly, an annular rotary knife blade, a blade housing, and a blade-blade housing support or bearing structure and the handle assembly including a hand piece and a hand piece retaining assembly.

Designers of power operated rotary knives are constantly challenged to improve the design of such knives with respect to multiple objectives. For example, there is a desire for increasing the rotational speed of the rotary knife blade of a power operated rotary knife. Generally, increasing blade rotational speed reduces operator effort required for cutting and trimming operations. There is also a desire for reducing the heat generated during operation of the power operated rotary knife. One source of generated heat is the blade-blade housing bearing interface, that is, heat generated at the bearing interface between the rotating knife blade and the stationary blade housing. Reducing generated heat during power operated rotary knife operation will tend to increase the useful life of various knife components. Additionally, reducing generated heat during knife operation will tend to reduce undesirable "cooking" of the product being cut or trimmed. If sufficient heat is generated in the bearing region of the rotary knife blade and blade housing, dislodged pieces or fragments of a product being cut or trimmed (e.g., small pieces or fragments of fat, gristle or meat dislodged during a trimming or cutting operations) in proximity to the bearing region may become so hot that the pieces "cook". The cooked materials tend to gum up the blade and blade housing bearing region resulting in even more undesirable heating.

There is further a desire for reducing the vibration of a power operated rotary knife during operation for purposes of improved operator ergonomics and, consequently, improved operator productivity. There is also a desire for increasing the useful life of components of a power operated rotary knife. Areas of potential improvement include the design of the rotary knife blade, the blade housing, the blade-blade housing bearing interface or bearing structure that supports the knife blade for rotation in the blade housing, and the gearing that rotatably drives the rotary knife blade in the blade housing.

Many conventional power operated rotary knives include a so-called split ring, annular blade housing. A split ring or split annular blade housing is one that includes a split through a diameter of the blade housing. The split allows for expansion of a circumference of the blade housing for purposes of removing a rotary knife blade that needs to be sharpened or is at the end of its useful life and inserting a new rotary knife blade. A split ring blade housing has several inherent disadvantages. Because of the split, a split ring blade housing is weaker than a blade housing without a split. Further, the split, which defines a discontinuity along the rotational path of the knife blade, is often a collection point for fragments of meat, fat, gristle and/or bones that are created during a cutting or trimming operation. Accumulation of such fragment or debris in the region of the split may generate heat and/or potentially result in increased vibration of the power operated rotary knife, both of which are undesirable results.

Additionally, a split ring blade housing requires operator adjustment of the blade housing circumference as the rotary knife blade wears. Given the large loading forces applied to the blade when cutting and trimming meat, wear will occur between the bearing structure of the blade and the corresponding bearing structure of the blade housing that support the blade for rotation within the blade housing. In some power operated rotary knives, the blade-blade housing bearing structure includes a portion of a radial outer surface of the rotary knife blade which serves as a bearing structure of the blade and a portion of a radial inner surface of the blade housing which serves as the corresponding or mating bearing structure of the blade housing. In such power operated rotary knifes, the outer radial surface of the blade and the corresponding radial inner surface of the blade housing will wear over time resulting in a gradual loosening of the rotary knife blade within the blade housing.

In certain power operated rotary knives, the blade-blade housing bearing structure comprises an inwardly extending bead of the blade housing that extends into a bearing race formed in a radial outer surface of the rotary knife blade to support the blade for rotation in the blade housing. Again, the bearing race of the blade and the bearing bead of the blade housing will wear over time resulting in looseness of the rotary knife blade within the blade housing. As the rotary knife blade becomes looser within the blade housing, the power operated rotary knife will typically experience increased vibration. An inexperienced operator may simply accept the increased vibration of the power operated rotary knife as a necessary part of using such a knife and will reduce his or her productivity by cutting or trimming at a slower pace, turning the knife off, taking additional time between cuts, etc.

An experienced operator may recognize that a potential solution to the problem of increased vibration is to adjust, that is, reduce the blade housing circumference, i.e., reduce the effective blade housing diameter, to account for the blade and blade housing bearing interface wear. Such an adjustment of the blade housing circumference is a trial and error technique that requires the operator to find a suitable operating clearance. Operating clearance can be viewed as striking a proper balance between providing sufficient blade-blade housing bearing clearance, that is, having the bearing diameter of the blade housing sufficiently larger than the corresponding mating bearing diameter of the knife blade such that the knife blade freely rotates in the blade housing while at the same time not having too much clearance that would cause the knife blade to have excessive play and/or vibrate in the blade housing.

However, even for an experience operator, adjustment of the blade housing circumference may be problematic. If the operator fails to appropriately adjust the blade housing circumference, i.e., find a suitable operating clearance, the power operated rotary knife may not function properly. If the operator's adjustment leads to insufficient operating clearance, the knife blade will not rotate freely in the blade housing, that is, the knife blade will tend to bind in the blade housing thereby generating heat and tending to increase the wear of the rotary knife blade, blade housing and drive gear components, all undesirable results. Depending on the degree of binding, the rotary knife blade may lock-up within the housing. On the other hand if the operator adjusts the blade housing circumference such that the operating clearance is too large, the knife blade will be loose in the blade housing. This may result in excessive movement of the knife blade within the blade housing and attendant problems of excessive vibration of the power operated rotary knife during operation.

Further, even if the operator is successful in adjusting the blade housing to an acceptable circumference, adjustment of the blade housing circumference necessarily requires the operator to cease cutting/trimming operations with the power operated rotary knife during the trial and error adjustment process. The adjustment process results in downtime and lost operator productivity. Finally, since wear of the rotary knife blade and blade housing bearing interface is ongoing as the power operated rotary knife continues to be used for cutting and trimming operations, the blade housing circumference adjustment undertaken by the operator is only a temporary fix as further wear occurs.

The present disclosure relates to a power operated rotary knife that addresses many of the problems associated with conventional power operated rotary knives and objectives of power operated rotary knife design. One exemplary embodiment of a power operated rotary knife of the present disclosure is schematically shown generally at 100 in FIGS. 1-9. The power operated rotary knife 100 comprises an elongated handle assembly 110 and a head assembly or head portion 111 removably coupled to a forward end of the handle assembly 110. The handle assembly 110 includes a hand piece 200 that is secured to the head assembly 111 by a hand piece retaining assembly 250.

In one exemplary embodiment, the head assembly 111 includes a continuous, generally ring-shaped or annular rotary knife blade 300, a continuous, generally ring-shaped or annular blade housing 400, and a blade-blade housing support or bearing structure 500. Annular, as used herein, means generally ring-like or generally ring-shaped in configuration. Continuous annular, as used herein, means a ring-like or ring-shape configuration that is continuous about the ring or annulus, that is, the ring or annulus does not include a split extending through a diameter of the ring or annulus. The head assembly 111 further includes a gearbox assembly 112 and a frame or frame body 150 for securing the rotary knife blade 300 and the blade housing 400 to the gearbox assembly 112.

The rotary knife blade 300 rotates in the blade housing 400 about a central axis of rotation R. In one exemplary embodiment, the rotary knife blade 300 includes a bearing surface 319 and a driven gear 328. Both the bearing race 319 and the driven gear 328 are axially spaced from an upper end 306 of a body 302 of the blade 300 and from each other. The rotary knife blade 300 is supported for rotation in the blade housing 400 by the blade-blade housing support or bearing structure 500 of the present disclosure (best seen in FIGS. 2A and 14). The blade-blade housing bearing structure 500 advantageously both supports the rotary knife blade 300 for rotation with respect to the blade housing 400 and releasably secures the rotary knife blade 300 to the blade housing 400.

In one exemplary embodiment, the blade-blade housing bearing structure 500 includes an elongated rolling bearing strip 502 (FIG. 14) having a plurality of spaced apart rolling bearings 506 supported in a flexible separator cage 508. The elongated rolling bearing strip 502 is disposed in an annular passageway 504 (FIG. 13) formed between opposing bearing surfaces 319, 459 of the rotary knife blade 300 and the blade housing 400, respectfully. The blade-blade housing bearing structure 500 defines a plane of rotation RP (FIGS. 7 and 8) of the rotary knife blade 300 with respect to the blade housing 400, the rotational plane RP being substantially orthogonal to the rotary knife blade central axis of rotation R.

In one exemplary embodiment, the plurality of rolling bearings 506 comprises a plurality of generally spherical ball bearings. The plurality of ball or rolling bearings 506 are in rolling contact with and bear against the opposing bearing surfaces 319, 459 of the rotary knife blade 300 and the blade housing 400 to support the knife blade 300 for rotation with respect to the blade housing 400 and secure the knife blade 300 with respect to the blade housing 400. The flexible separator cage 508 rotatably supports and locates the plurality of rolling bearings 506 in spaced apart relation within the annular passageway 504. The flexible separator cage 508 does not function as a bearing structure or provide a bearing surface with respect to the rotary knife blade 300 and the blade housing 400. The function of rotatably supporting the rotary knife blade 300 with respect to the blade housing 400 is solely provided by the rolling bearing support of the plurality of spaced apart ball bearings 506. This rolling bearing support can be contrasted with power operated rotary knives utilizing a sliding bearing structure. For example, U.S. Pat. No. 6,769,184 to Whited, discloses a sliding bearing structure comprising a blade housing having a plurality of circumferentially spaced, radially inwardly extending bead sections that extend into and bear against a bearing race or groove of a rotary knife blade and U.S. Published Application Pub. No. US 2007/0283573 to Levsen, which discloses a sliding bearing structure comprising an annular bushing having an elongated bushing body disposed along a groove in a blade housing and in contact with opposing bearing surfaces of a rotary knife blade and the blade housing.

Figure 13:
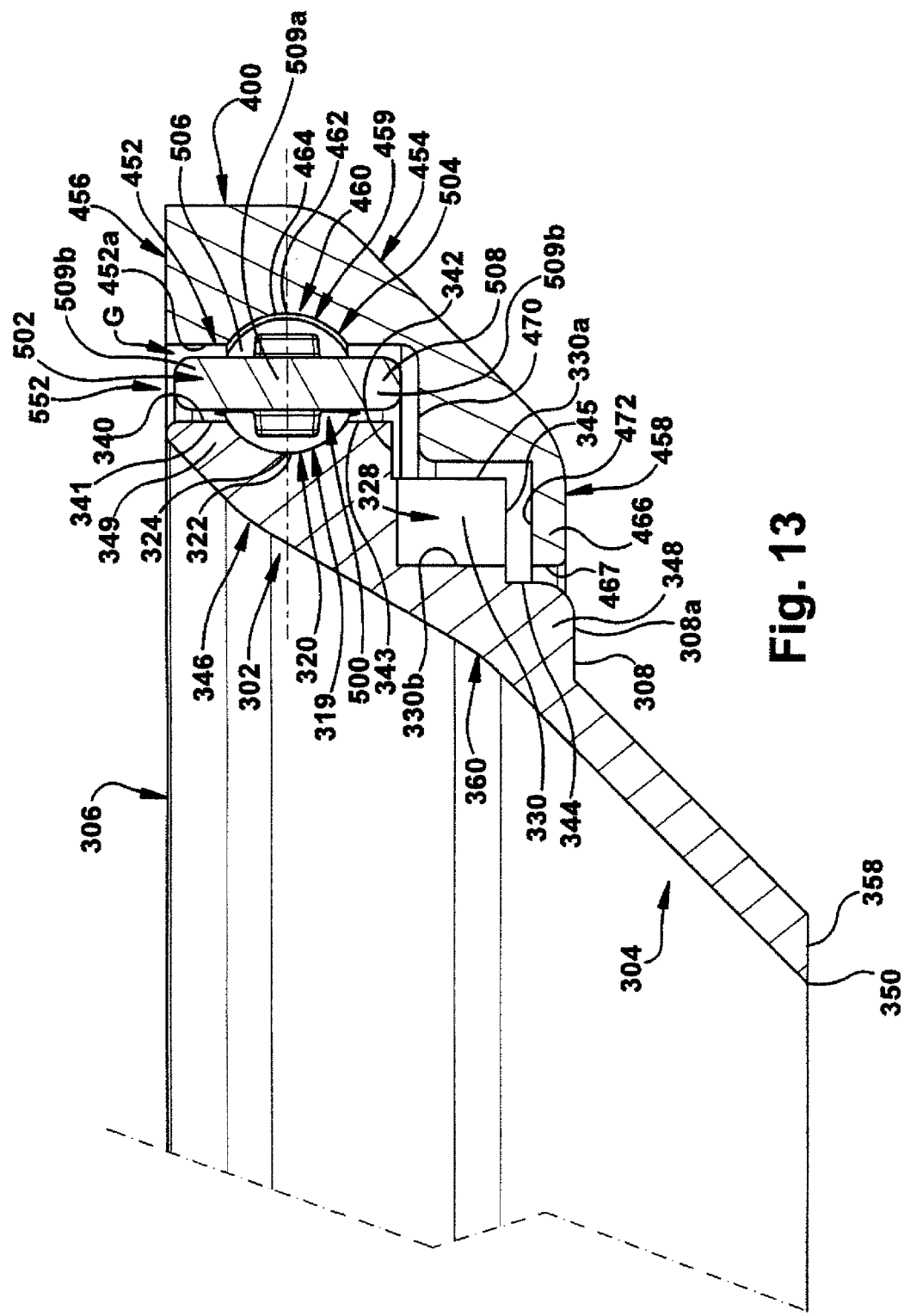
FIG. 13 is a schematic enlarged section view of the assembled combination of the rotary knife blade, the blade housing and the blade-blade housing bearing structure of the power operated rotary knife of FIG. 1 as seen from a plane indicated by the line 13-13 in FIG. 10.

As can best be seen in the sectional view of FIG. 13, the flexible separator cage 508 is configured to ride in the annular passageway 504 without substantial contact with either the knife blade 300 or the blade housing 400 or the opposing bearing surfaces 319, 459 of the knife blade 300 and blade housing. Indeed, it would not be desired for the flexible separator cage 508 to be in contact with or in bearing engagement with either the rotary knife blade 300 or the blade housing 400 as this would resulting in undesirable sliding friction. The blade-blade housing bearing structure 500 rotatably supports the knife blade 300 with respect to the blade housing 400 via rolling bearing support provided by the plurality of ball bearings 506 of the rolling bearing strip 502 bearing against the opposing bearing surfaces 319, 459 of the rotary knife blade 300 and the blade housing 400.

The rotational speed of a specific rotary knife blade 300 in the power operated rotary knife 100 will depend upon the specific characteristics of a drive mechanism 600 (shown schematically in FIG. 53) of the power operated rotary knife 100, including an external drive motor 800, a flexible shaft drive assembly 700, a gear train 604, and a diameter and gearing of the rotary knife blade 300. Further, depending on the cutting or trimming task to be performed, different sizes and styles of rotary knife blades may be utilized in the power operated rotary knife 100 of the present disclosure. For example, rotary knife blades in various diameters are typically offered ranging in size from around 1.4 inches in diameter to over 7 inches in diameter. Selection of a blade diameter will depend on the task or tasks being performed.

Increasing the rotational speed of the rotary knife blade of a power operated rotary knife is an important objective of designers of power operated rotary knives. The rolling bearing structure of the blade-blade housing bearing structure 500 of the present disclosure results in reduced friction, less generated heat and less surface wear than would be the case with a sliding or journal bearing structure. Because of the reduced friction and heat resulting from a rolling bearing structure, the rolling blade-blade housing bearing structure 500 permits increased rotational speed of the rotary knife blade 300 compared to the sliding bearing structures disclosed or used in prior power operated rotary knives.

By way of example only and without limitation, the following table compares blade rotational speed of two exemplary power operated rotary knives of the present disclosure versus the assignee's previous versions of those same models of power operated rotary knives. Of course, it should be appreciated the blade rotational speed increase will vary by model and will be dependent upon the specific characteristics of each particular model and blade size.

| Model | Approx. Blade Diameter | Approximate Blade Rotational Speed % Increase |
|---|---|---|
| 1000/1500 | 5.0 inches | 51% (930 RPM vs. 1,400 RPM) |
| 620 | 2.0 inches | 57% (1,400 RPM vs. 2,200 RPM) |

There are also significant advantages to using the flexible separator cage 508 to support and locate the plurality of rolling bearings 506, as opposed to, for example, using only a plurality of rolling bearings, such as ball bearings, inserted into a gap or passageway between the rotary knife blade and the blade housing. The flexible separator cage 508 facilitates insertion of and removal of, as a group, the plurality of rolling bearings 506 into and from the annular passageway 504. That is, it is much easier to insert the rolling bearing strip 502 into the annular passageway 504, as opposed to attempting to insert individual rolling bearings into the annular passageway 504 in a one-at-a-time, sequential order, which would be both time consuming and fraught with difficulty. This is especially true in a meat processing environment where a dropped or misplaced rolling bearing could fall into a cut or trimmed meat product. Similarly, removal of the plurality of rolling bearings 506, as a group, via removal of the rolling bearing strip 502 is much easier and less prone to dropping or losing rolling bearings than individually removing rolling bearings from the annular passageway 504.

Additionally, from the viewpoints of friction, bearing support and cost, utilizing the plurality of rolling bearings 506 supported in a predetermined, spaced apart relationship by the flexible separator cage 508, is more efficient and effective than utilizing a plurality of rolling bearings disposed loosely in a gap or passageway between the rotary knife blade and the blade housing. For example, the separator cage 508 allows for the plurality of rolling bearings 506 to be appropriately spaced to provide sufficient rolling bearing support to the rotary knife blade 300 given the application and characteristics of the product or material to be cut or trimmed with the power operated rotary knife 100, while at the same time, avoids the necessity of having more rolling bearings than required for proper bearing support of the rotary knife blade 500 and the application being performed with the power operated rotary knife 100.

For example, if the individual rolling bearings are tightly packed in a one-adjacent-the-next relationship in the annular passageway 504, more rolling bearings than needed for most applications would be provided, thereby unnecessarily increasing cost. Further, having more rolling bearings than needed would also increase total friction because of the friction between each pair of adjacent, in-contact, rolling bearings. If, on the other hand, the individual rolling bearings are loosely packed in the annular passageway 504, there is no control over the spacing between adjacent rolling bearings. Thus, there may be instances where a large gap or space may occur between two adjacent rolling bearings resulting in insufficient bearing support in a particular region of the annular passageway 504, given the cutting forces being applied to the rotary knife blade 300 during a specific cutting or trimming application or operation.

Figure 2:
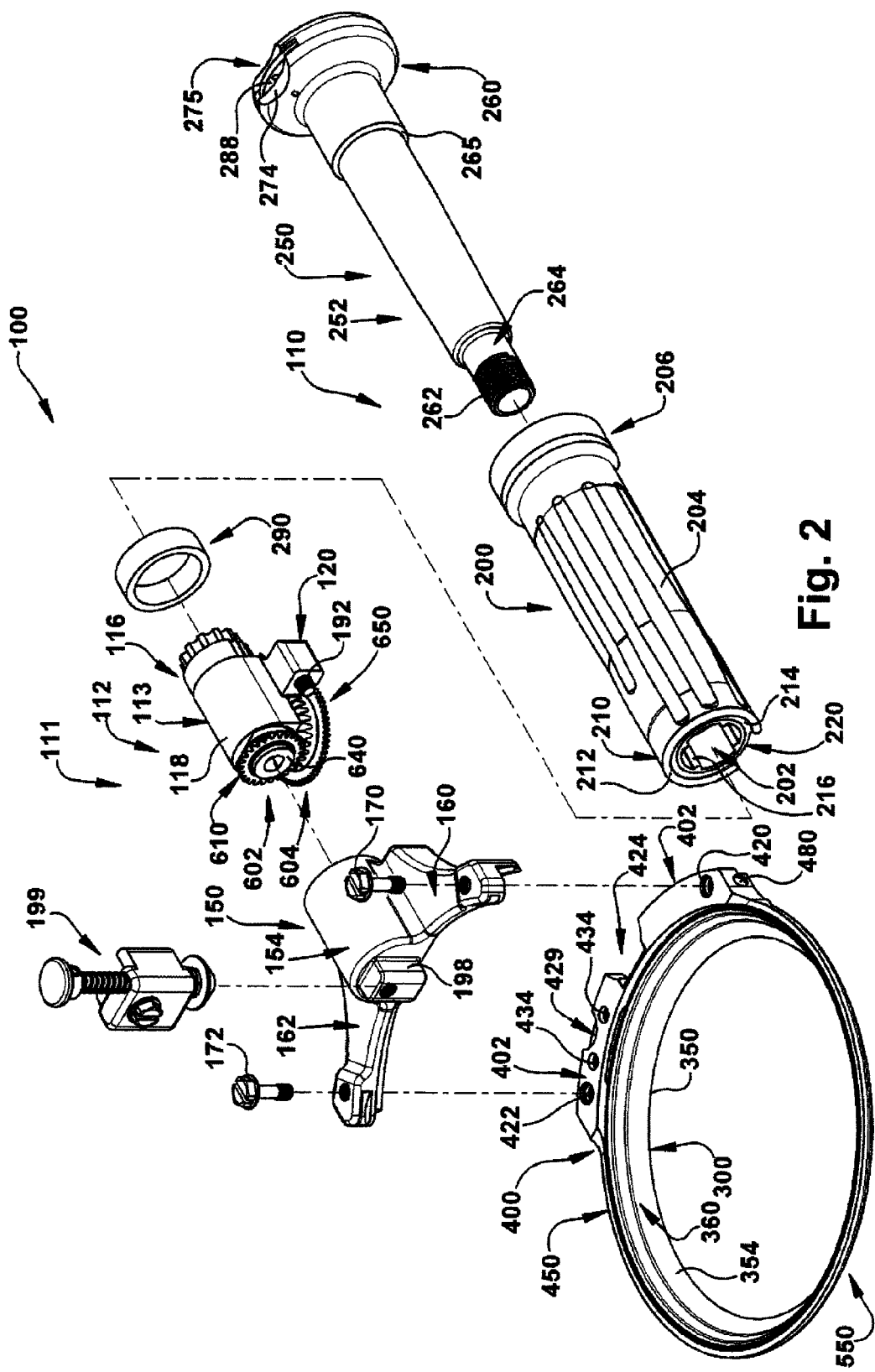
FIG. 2 is a schematic exploded perspective view of the power operated rotary knife of FIG. 1.

As can best be seen in FIG. 2, an assembled combination 550 of the rotary knife blade 300, the blade housing 400 and blade-blade housing bearing structure 500 is releasably secured as a unitary structure to the gearbox assembly 112 by the frame body 150 thereby completing the head assembly 111. For brevity, the assembled combination 550 of the rotary knife blade 300, the blade housing 400 and blade-blade housing bearing structure 500 will hereinafter be referred to as the blade-blade housing combination 550. The handle assembly 110 is releasably secured to the head assembly 111 thereby completing the power operated rotary knife 100. As used herein, a front or distal end of the power operated rotary knife 100 is an end of the knife 100 that includes the blade-blade housing combination 550 (as seen in FIG. 1), while a rear or proximal end of the power operated rotary knife 100 is an end of the knife 100 that includes the handle assembly 110, and specifically, an enlarged end 260 of an elongated central core 252 of the hand piece retaining assembly 250 (as seen in FIG. 1).

Figure 2A:
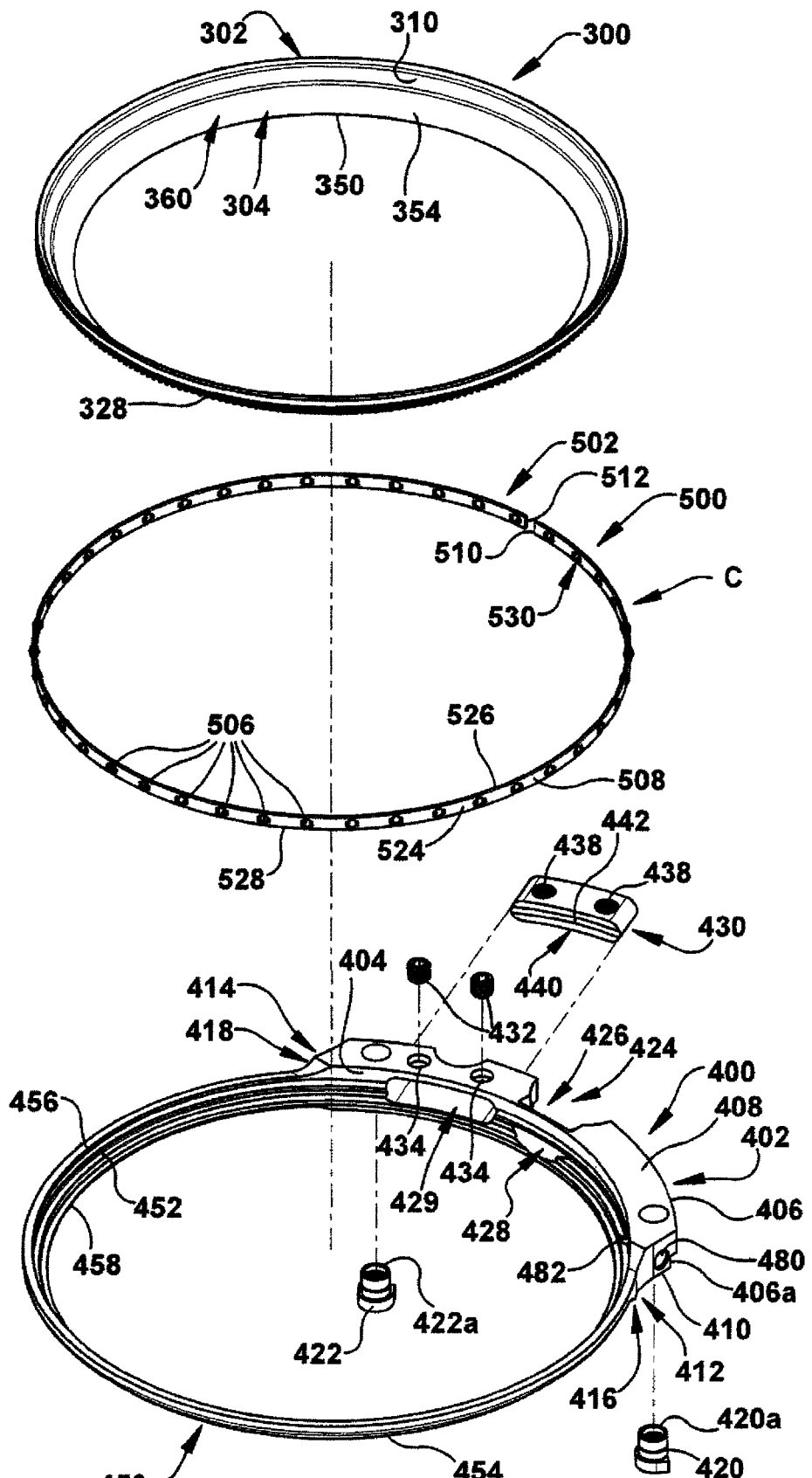
FIG. 2A is a schematic exploded perspective view of a portion of the head assembly of the power operated rotary knife of FIG. 1 including the rotary knife blade, the blade housing and the blade-blade housing bearing structure that, in one exemplary embodiment, includes an elongated rolling bearing strip that secures and rotatably supports the rotary knife blade with respect to the blade housing.
Figure 2B:
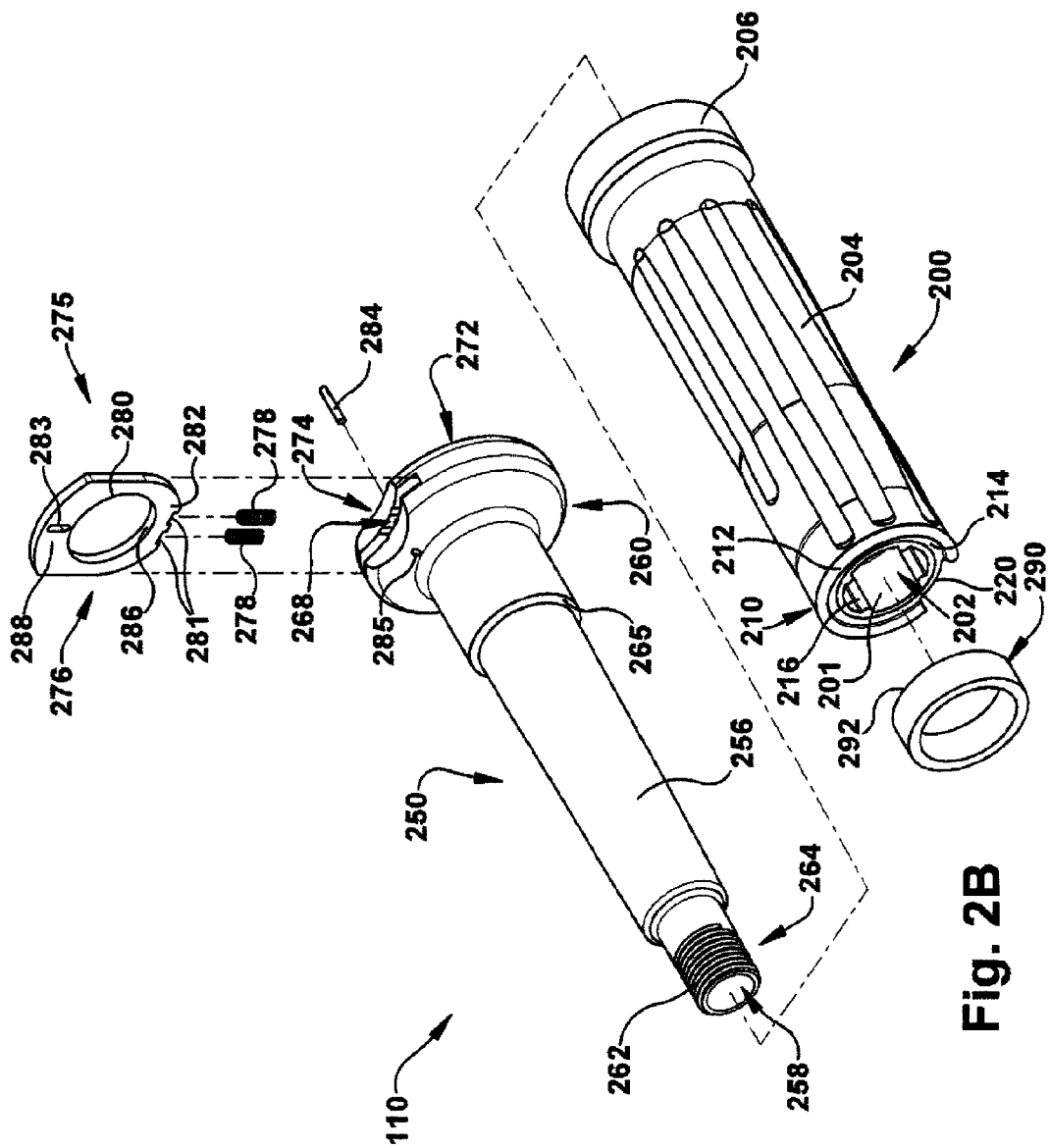
FIG. 2B is a schematic exploded perspective view of the handle assembly of the power operated rotary knife of FIG. 1 including the hand piece, the hand piece retaining assembly and a drive shaft latching assembly supported by the hand piece retaining assembly.
Figure 2C:
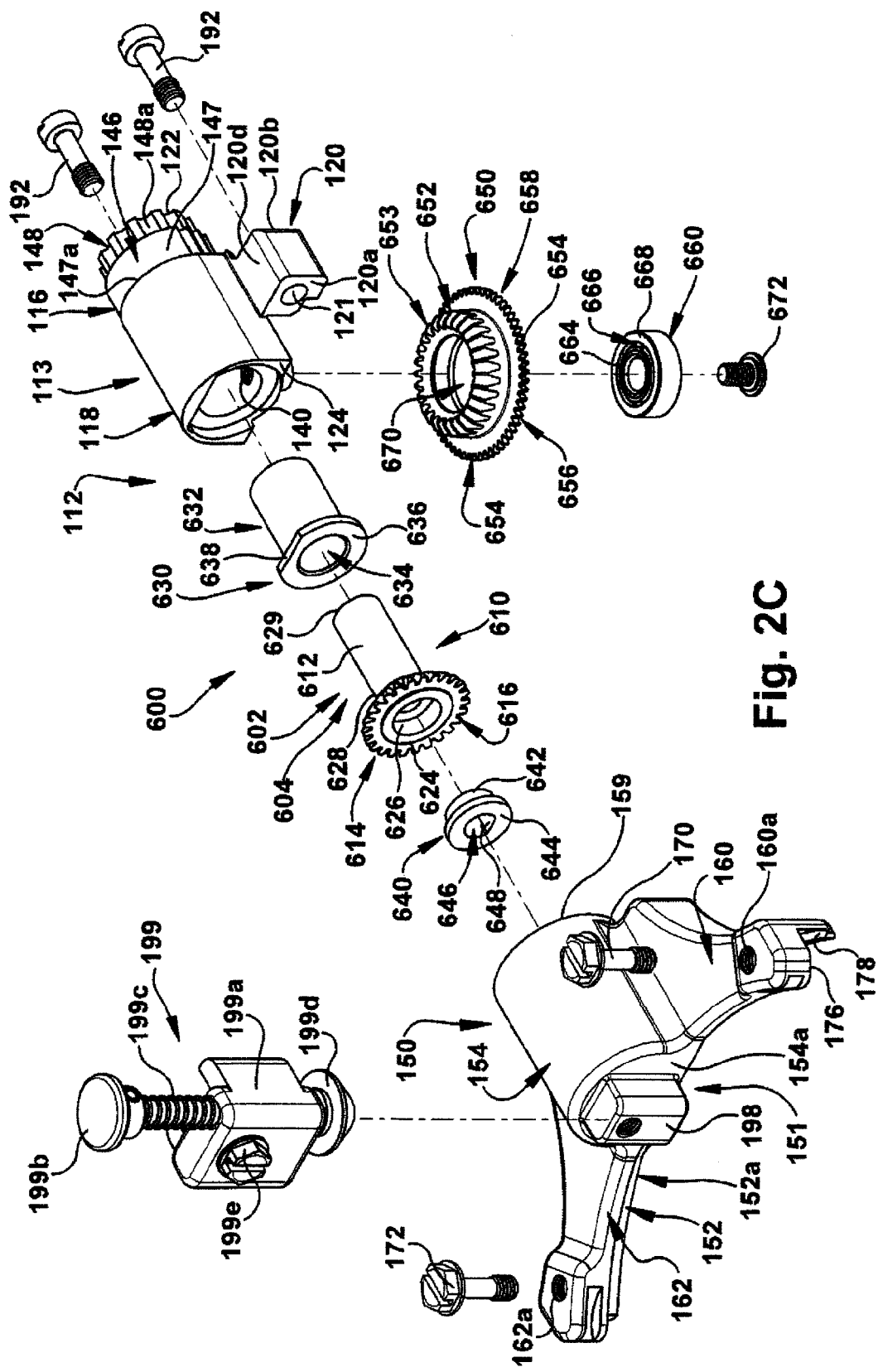
FIG. 2C is a schematic exploded perspective view of a portion of the head assembly of the power operated rotary knife of FIG. 1 including the gearbox assembly, a steeling assembly and a frame body, the gearbox assembly including a gearbox and a gearbox housing.
Figure 3:
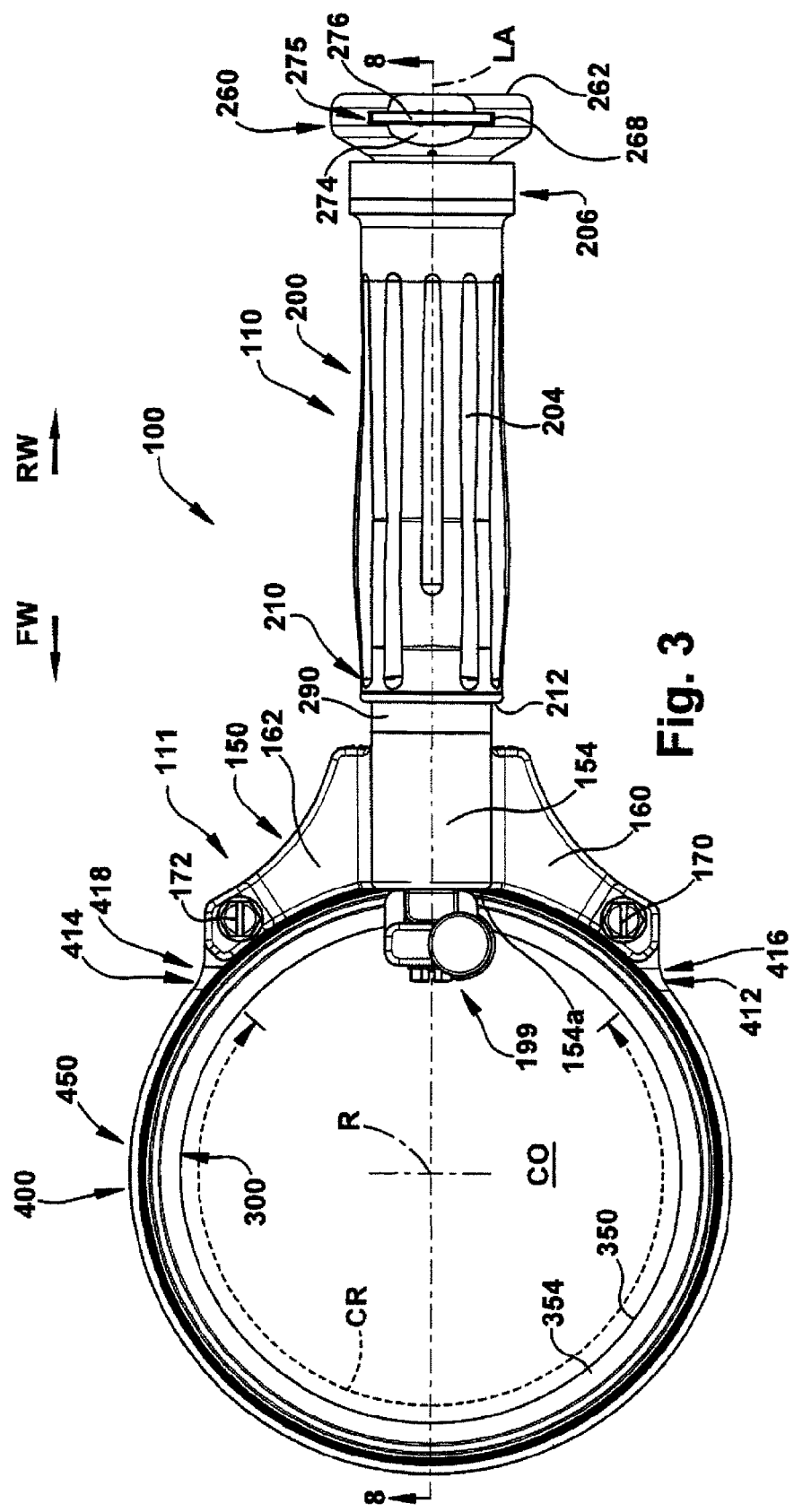
FIG. 3 is a schematic top plan view of the power operated rotary knife of FIG. 1.
Figure 4:
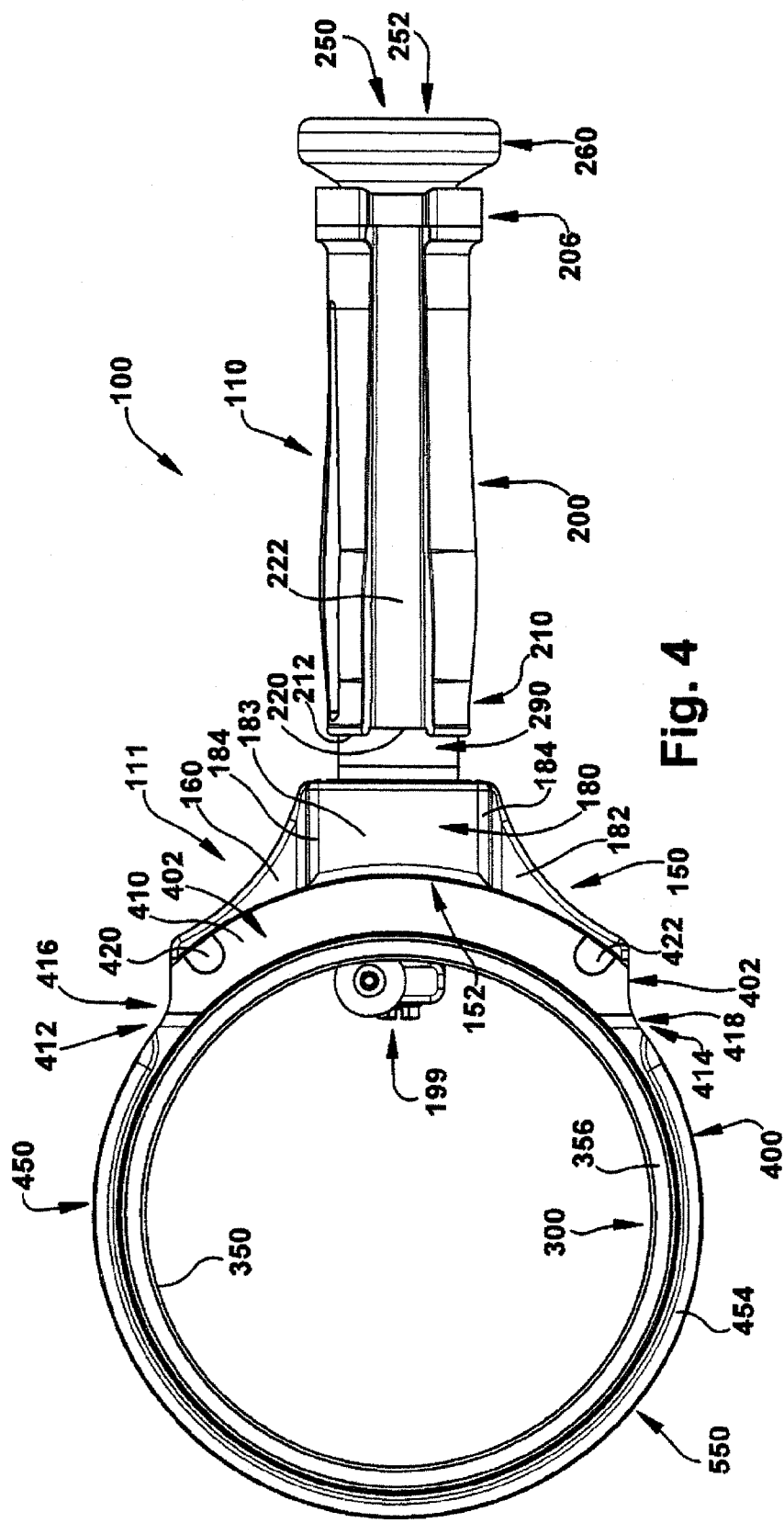
FIG. 4 is a schematic bottom plan view of the power operated rotary knife of FIG. 1.
Figure 5:
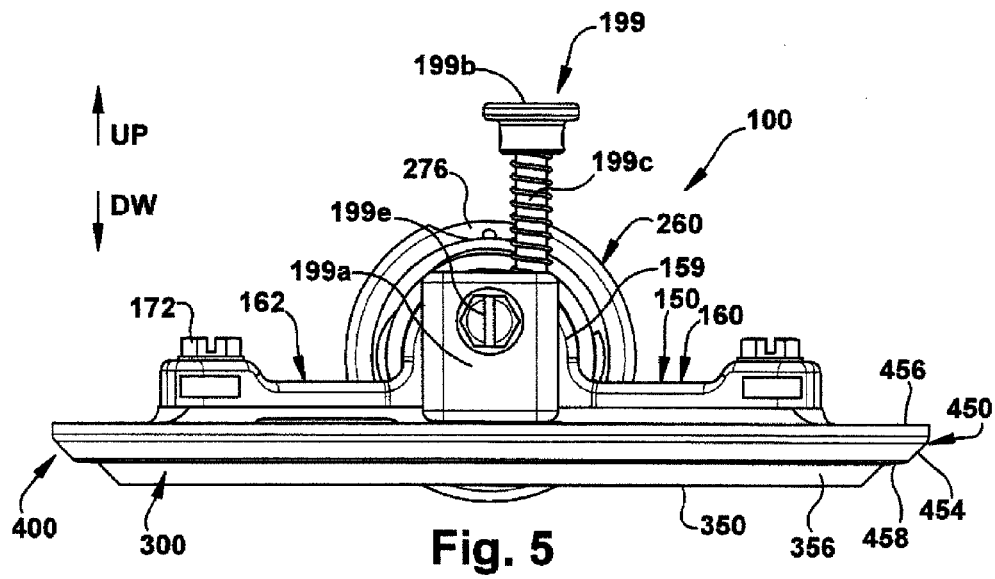
FIG. 5 is a schematic front elevation view of the power operated rotary knife of FIG. 1.
Figure 33:
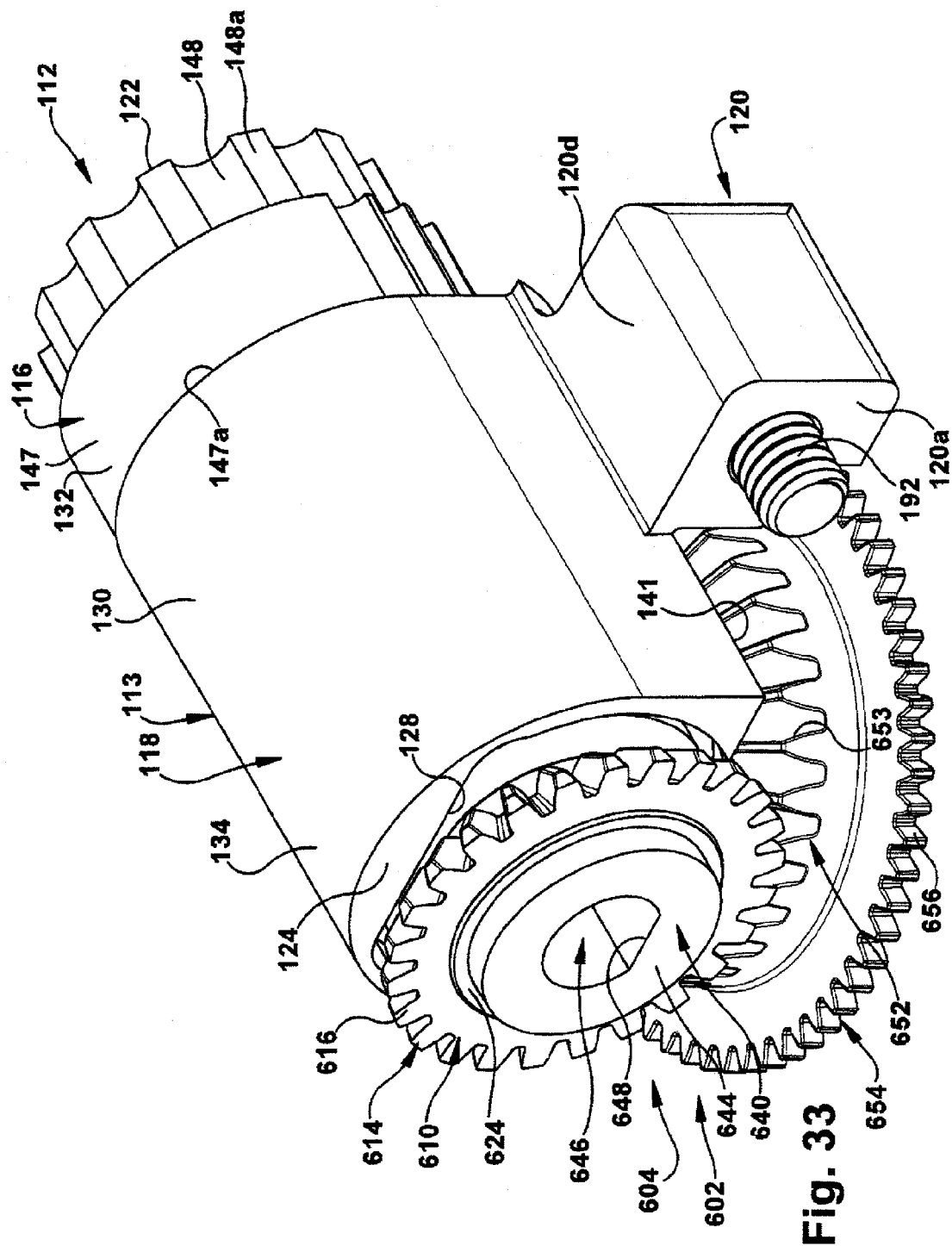
FIG. 33 is a schematic front prospective view of the gearbox assembly of the power operated rotary knife of FIG. 1.
Figure 34:
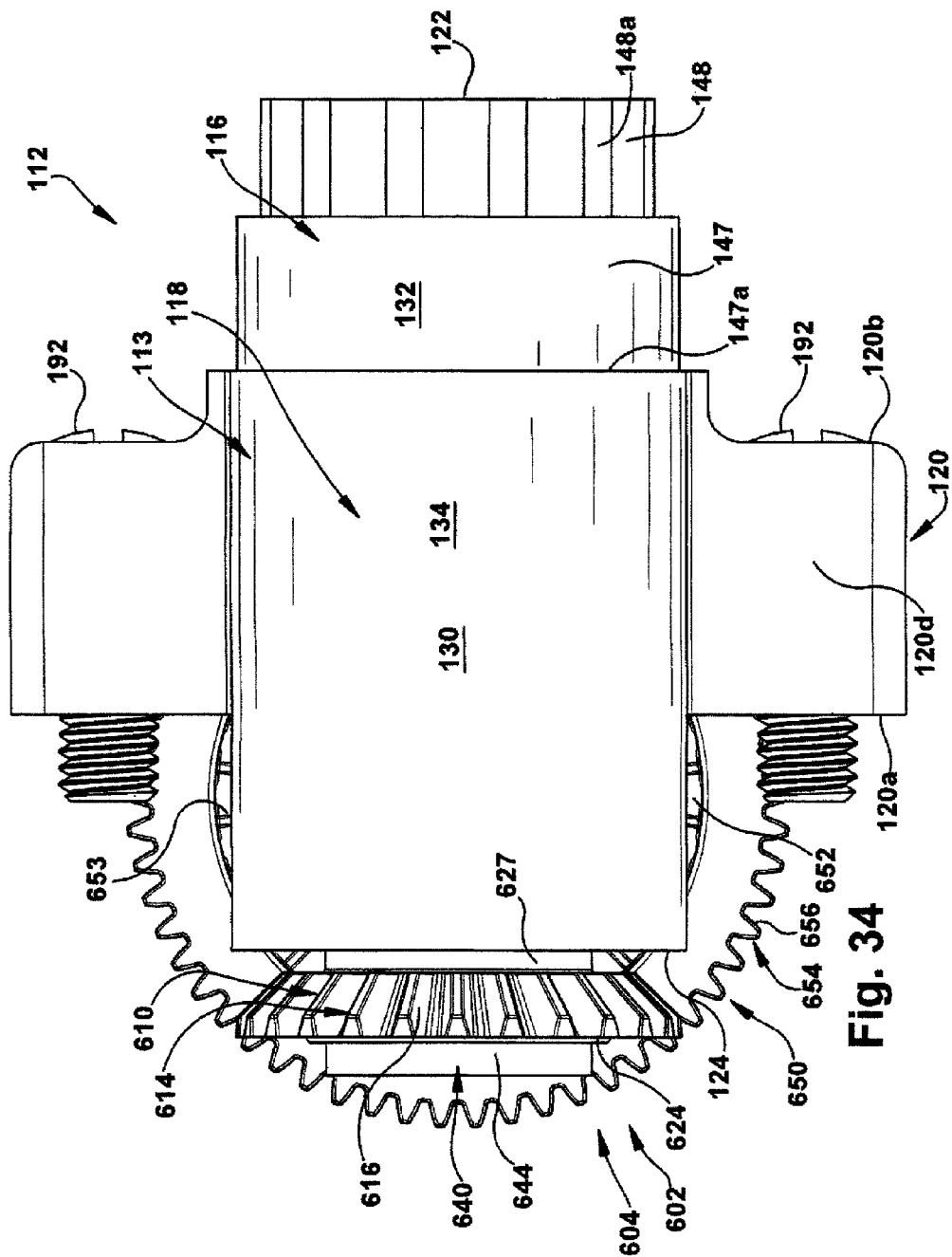
FIG. 34 is a schematic top plan view of the gearbox assembly of FIG. 33.
Figure 35:
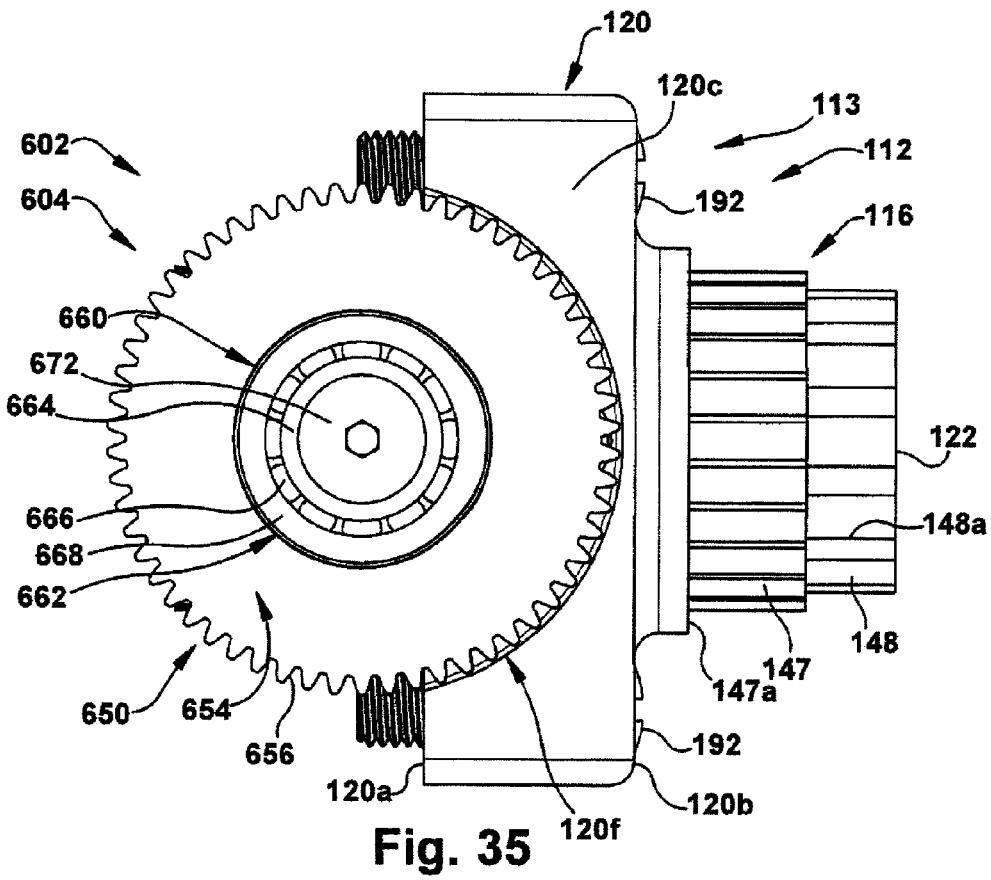
FIG. 35 is a schematic bottom plan view of the gearbox assembly of FIG. 33.
Figure 36:
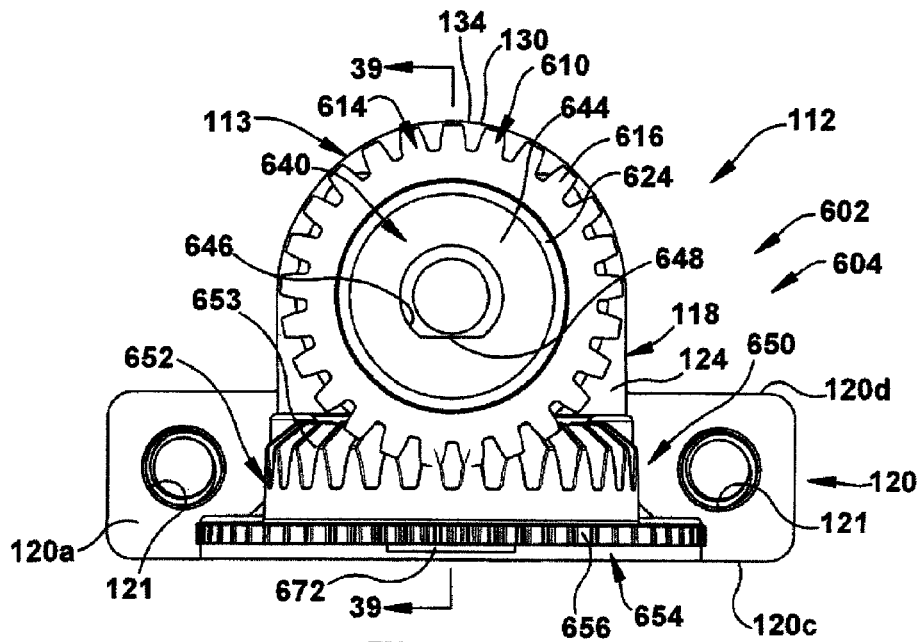
FIG. 36 is a schematic front elevation view of the gearbox assembly of FIG. 33.
Figure 41:
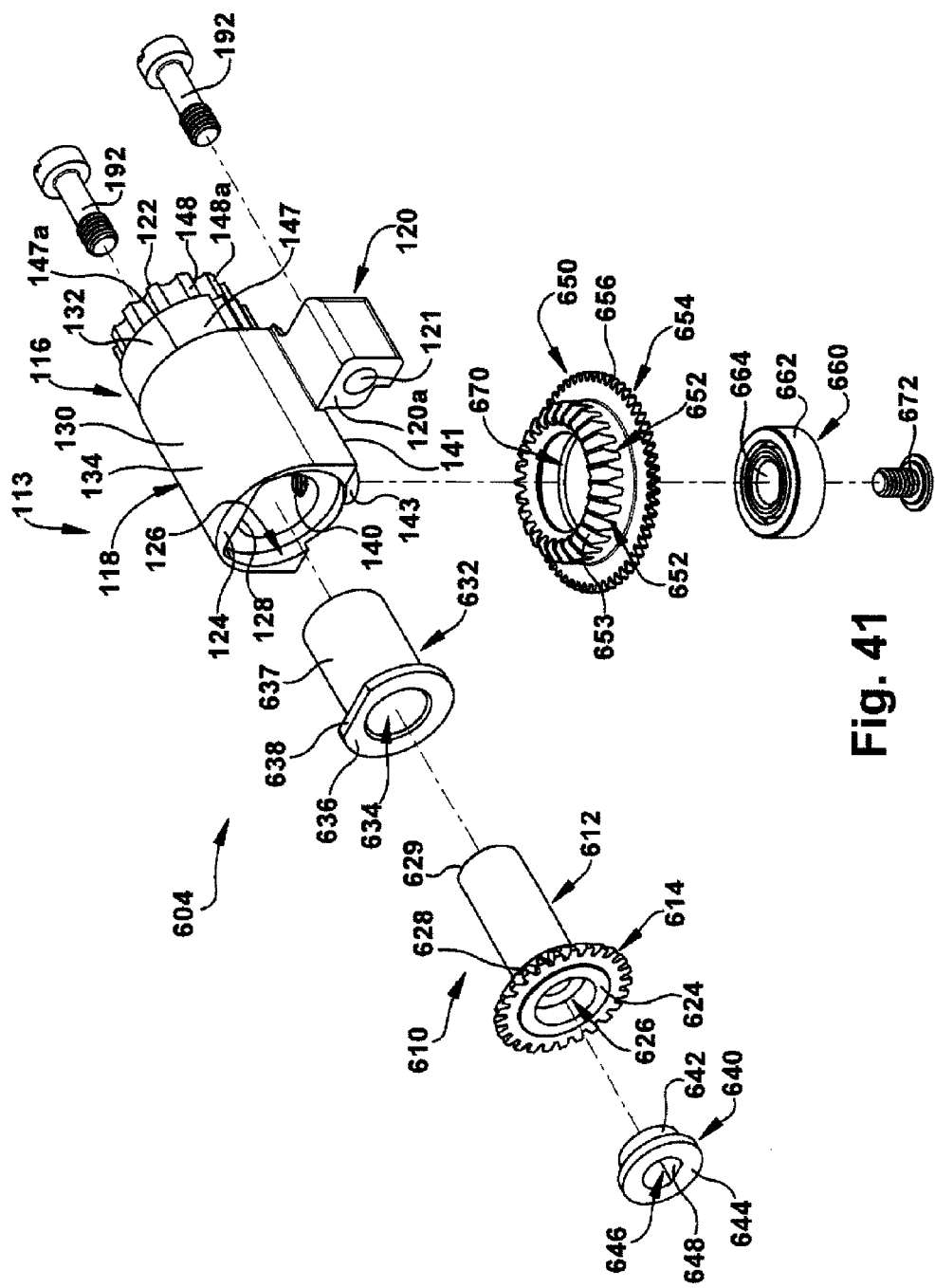
FIG. 41 is a schematic exploded perspective view of the gearbox assembly of FIG. 33.
Figure 44:
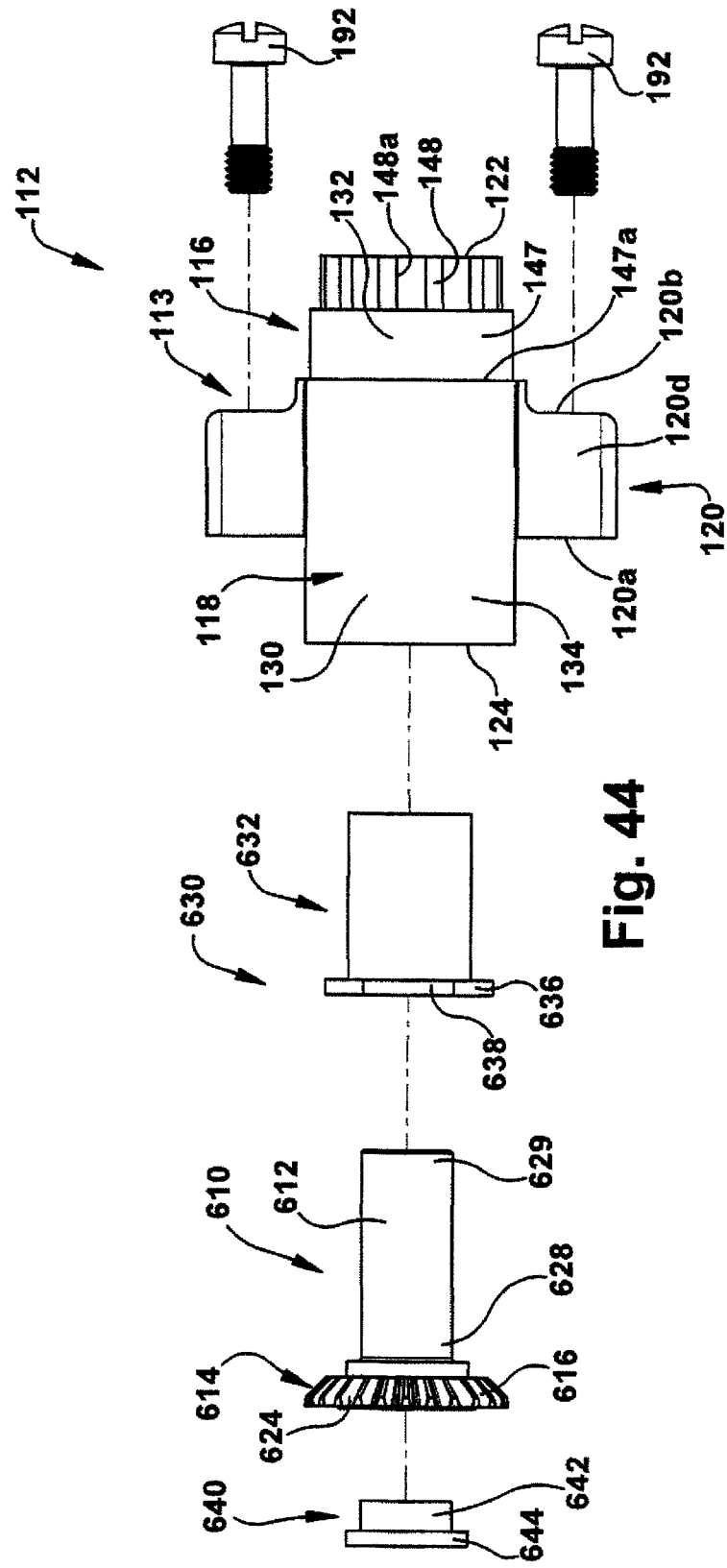
FIG. 44 is a schematic exploded top plan view of the gearbox assembly of FIG. 33.

The head assembly 111 includes the frame 150 and the gearbox assembly 112. As is best seen in FIGS. 2C and 33, the gearbox assembly 112 includes a gearbox housing 113 and a gearbox 602. The gearbox 602 is supported by the gearbox housing 113. The gearbox 602 includes the gear train 604 (FIG. 41). The gear train 604 includes, in one exemplary embodiment, a pinion gear 610 and a drive gear 650. The gearbox 602 includes the gear train 604, along with a bearing support assembly 630 that rotatably supports the pinion gear 610 and a bearing support assembly 660 that rotatably supports the drive gear 650.

The drive gear 650 is a double gear that includes a first bevel gear 652 and a second spur gear 654, disposed in a stacked relationship, about an axis of rotation DGR (FIG. 8A) of the drive gear 650. The drive gear axis of rotation DRG is substantially parallel to the rotary knife blade axis of rotation R. The drive gear first bevel gear 652 meshes with the pinion gear 610 to rotatably drive the drive gear 650 about the drive gear axis of rotation DGR. The second spur gear 654 of the drive gear engages the driven gear 328 of the rotary knife blade 300, forming an involute gear drive, to rotate the knife blade 300 about the blade axis of rotation R.

The gear train 604 is part of the drive mechanism 600 (shown schematically in FIG. 53), some of which is external to the power operated rotary knife 100, that provides motive power to rotate the rotary knife blade 300 with respect to the blade housing 400. The drive mechanism 600 includes the external drive motor 800 and the flexible shaft drive assembly 700, which is releasably secured to the handle assembly 110 by a drive shaft latching assembly 275 (FIG. 2B). The gear train 604 of the power operated rotary knife 100 transmits rotational power from a rotating drive shaft 702 of the flexible shaft drive assembly 700, through the pinion and drive gears 610, 650, to rotate the rotary knife blade 300 with respect to the blade housing 400.

Figure 45:
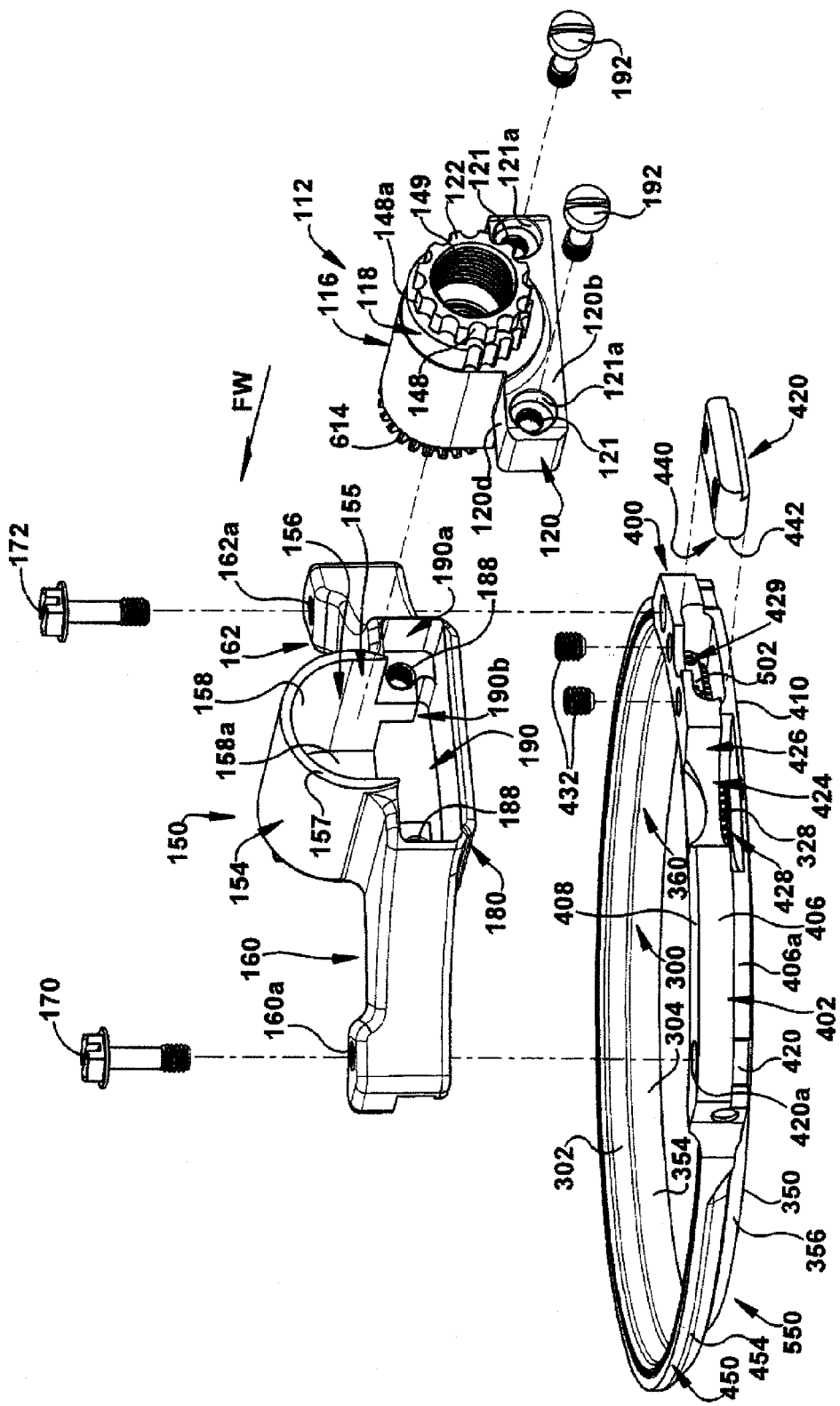
FIG. 45 is a schematic exploded rear perspective view of the head assembly of the power operated rotary knife of FIG. 1 showing the gearbox assembly, the frame body, and the assembled combination of the blade, blade housing and blade-blade housing bearing structure.

The frame body 150 (FIGS. 2C and 49) of the head assembly 111 includes an arcuate mounting pedestal 152 at a front or forward end of the frame body 150. The arcuate mounting pedestal 152 defines a seating region 152a for a mounting section 402 of the blade housing 400 such that the blade-blade housing combination 550 may be releasably affixed to the frame body 150. The frame body 150 also defines a cavity or opening 155 (FIG. 49) that slidably receives the gearbox housing 113, as the gearbox housing is moved in a forward direction FW (FIGS. 3, 7 and 45) along the longitudinal axis LA in the direction of the frame body 150. When the gearbox housing 113 is fully inserted into the frame cavity 155 and secured to the frame body 150 by a pair of threaded fasteners 192, as is shown schematically in FIG. 53, the drive gear 650 of the gear train 604 engages and meshes with the driven gear 328 of the rotary knife blade 300 to rotate the blade 300 about its axis of rotation R.

The frame body 150 releasably couples the blade-blade housing combination 550 to the gearbox housing 113 to form the head assembly 111 of the power operated rotary knife 100. The hand piece 200 of the handle assembly 110 is secured or mounted to the head assembly 111 by the hand piece retaining assembly 250 (FIG. 2B) to complete the power operated rotary knife 100. The elongated central core 252 of the hand piece retaining assembly 250 extends through a central throughbore 202 of the hand piece 200 and threads into the gearbox housing 113 to secure the hand piece 200 to the gearbox housing 113.

The handle assembly 110 (FIG. 2B) extends along a longitudinal axis LA (FIGS. 3, 7 and 8) that is substantially orthogonal to the central axis of rotation R of the rotary knife blade 300. The hand piece 200 includes an inner surface 201 that defines the central throughbore 202, which extends along the handle assembly longitudinal axis LA. The hand piece 200 includes a contoured outer handle or outer gripping surface 204 that is grasped by an operator to appropriately manipulate the power operated rotary knife 100 for trimming and cutting operations.

In one exemplary embodiment, the hand piece 200 and the elongated central core 252 of the handle assembly 110 may be fabricated of plastic or other material or materials known to have comparable properties and may be formed by molding and/or machining. The hand piece 200, for example, may be fabricated of two over molded plastic layers, an inner layer comprising a hard plastic material and an outer layer or gripping surface comprised of a softer, resilient plastic material that is more pliable and easier to grip for the operator. The gearbox housing 113 and the frame body 150 of the head assembly 111 may be fabricated of aluminum or stainless steel or other material or materials known to have comparable properties and may be formed/shaped by casting and/or machining. The blade and blade housing 400 may be fabricated of a hardenable grade of alloy steel or a hardenable grade of stainless steel, or other material or materials known to have comparable properties and may be formed/shaped by machining, forming, casting, forging, extrusion, metal injection molding, and/or electrical discharge machining or another suitable process or combination of processes.

Rotary Knife Blade 300

Figure 24:
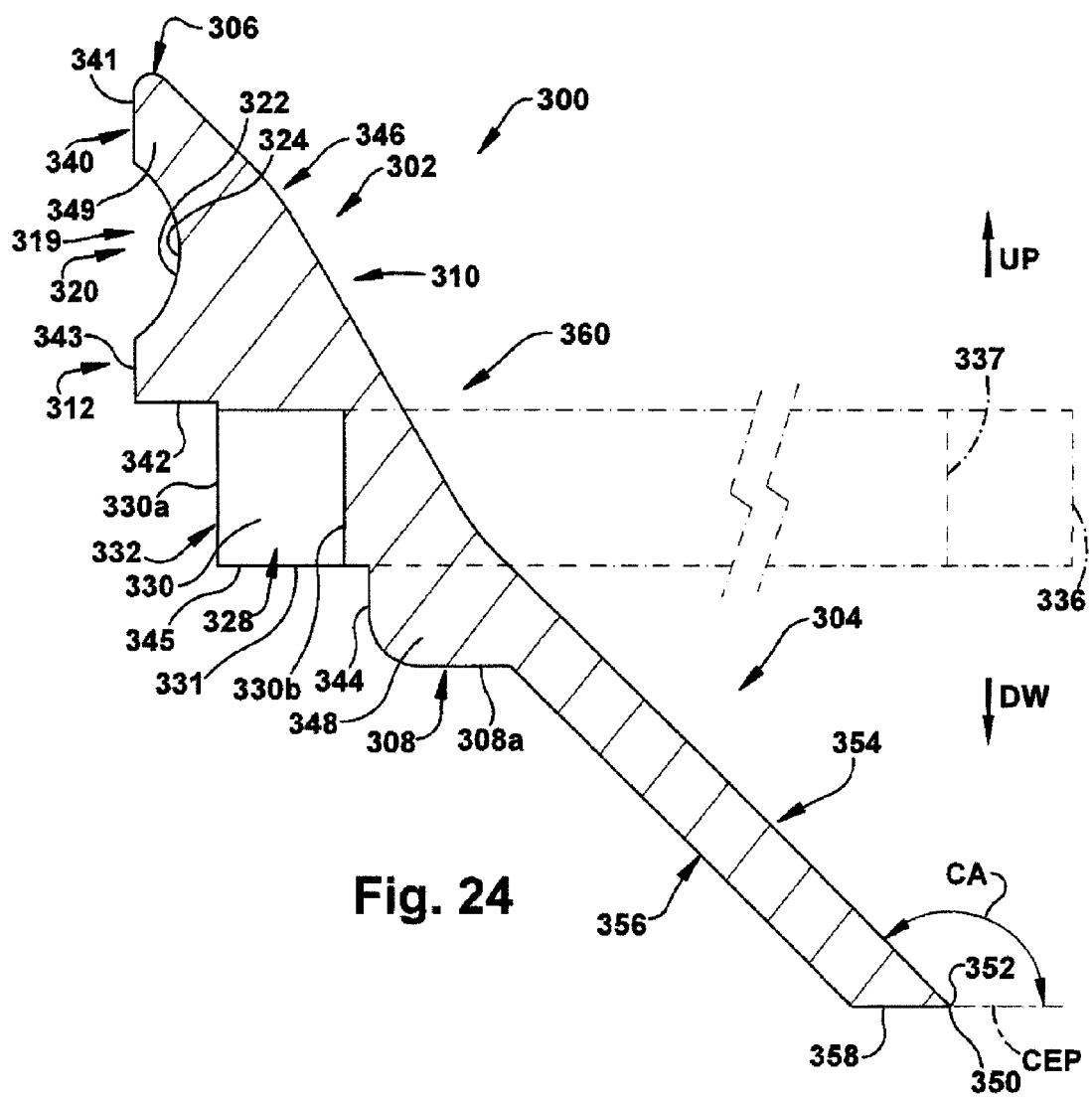
FIG. 24 is a schematic section view of the annular rotary knife blade of FIG. 22, as seen from a plane indicated by the line 24-24 in FIG. 22.

In one exemplary embodiment and as best seen in FIGS. 2A and 22-24, the rotary knife blade 300 of the power operated rotary knife 100 is a one-piece, continuous annular structure. As can best be seen in FIG. 24, the rotary knife blade 300 includes the body 302 and a blade section 304 extending axially from the body 302. The knife blade body 302 includes an upper end 306 and a lower end 308 spaced axially from the upper end 306. The body 302 of the rotary knife blade 300 further includes an inner wall 310 and an outer wall 312 spaced radially apart from the inner wall 310. An upper, substantially vertical portion 340 of the body outer wall 312 defines the knife blade bearing surface 319. In one exemplary embodiment of the power operated rotary knife 100 and as best seen in FIGS. 13 and 24, the knife blade bearing surface 319 comprises the bearing race 320 that extends radially inwardly into the outer wall 312. In one exemplary embodiment, the knife blade bearing race 320 defines a generally concave bearing surface, and, more specifically, a generally arcuate bearing face 322 in a central portion 324 of the bearing race 320. As can be seen in FIG. 24, the knife blade bearing race 320 is axially spaced from an upper end 306 of the knife blade body 302. Specifically, a section 341 of the vertical portion 340 of the body outer wall 312 extends between the knife blade bearing race 320 and the upper end 306 of the knife blade body 302. Stated another way, the knife blade body outer wall 213 includes the vertical section 341 which separates the knife blade bearing race 320 from the upper end 306 of the knife blade body 302. When viewed in three dimensions, the vertical section 341 defines a uniform diameter, cylindrical portion of the knife blade body outer wall 312 which separates the knife blade bearing race 320 from the upper end 306 of the knife blade body 302.

The outer wall 312 of the body 302 of the rotary knife blade 300 also defines the driven gear 328. The driven gear 328 comprises a set of spur gear teeth 330 extending radially outwardly in a stepped portion 331 of the outer wall 312. The blade gear 330 is a spur gear which means that it is a cylindrical gear with a set of gear teeth 328 that are parallel to the axis of the gear, i.e., parallel to the axis of rotation R of the rotary knife blade 300 and a profile of each gear tooth of the set of gear teeth 328 includes a tip or radially outer surface 330a (FIG. 13) and a root or radially inner surface 330b. The root 330b of the gear tooth is sometimes referred to as a bottom land, while the tip 330a of the gear tooth is sometimes referred to as a top land. The root 330b is radially closer to the axis of rotation R of the blade 300, the root 330a and the tip 330a are radially spaced apart by a working depth plus clearance of a gear tooth of the set of gear teeth 330. The driven gear 328 of the rotary knife blade 300 is axially spaced from and disposed below the bearing race 320, that is, closer to the second lower end 308 of the knife blade body 302. The knife blade body outer wall 312 includes the vertical portion 340 which separates the set of gear teeth 330 from the upper end 306 of the knife blade body 302. When viewed in three dimensions, the vertical portion 340 defines a uniform diameter, cylindrical portion of the knife blade body outer wall 213 which separates the knife blade bearing race 320 from the upper end 306 of the knife blade body 302. The driven gear 328, in one exemplary embodiment, defines a plurality of involute spur gear teeth 332.

The set of spur gear teeth 330 of the knife blade driven gear 328 are axially spaced from both the upper end 306 of the body 302 and the lower end 308 of the body 302 and are axially spaced from the arcuate bearing race 320 of the body 302. Additionally, the driven gear 328 is also offset radially inwardly with respect to the upper vertical portion 340 of the body outer wall 312 that defines the blade bearing race 320. Specifically, the set of spur gear teeth 330 are disposed radially inwardly of an outermost extent 343 of the outer wall 312 of the knife blade body 302. As can be seen in FIGS. 13 and 24, the upper vertical portion 340 of the body outer wall 312 defines the outermost extent 343 of the outer wall 312. Accordingly, the upper vertical portion 340 of the outer wall 312 extends radially outwardly over the set of gear teeth 330 and form a gear tooth cap 349. The gear tooth cap 349 is axially spaced from and overlies the set of gear teeth 330 and functions to further protect the set of gear teeth 330.

This configuration of the rotary knife blade 300, wherein the set of gear teeth 330 are both axially spaced from the upper end 306 of the knife blade body 302 and inwardly offset from the outermost extent 343 of the blade body outer wall 312 is sometimes referred to as a "blind gear tooth" configuration. Advantageously, the driven gear 328 of the rotary knife blade 300 of the present disclosure is in a relatively protected position with respect to the knife blade body 302. That is, the driven gear 328 is in a position on the knife blade body 302 where there is less likely to be damage to the set of gear teeth 330 during handling of the rotary knife blade 300 and, during operation of the power operated rotary knife 100, there is less ingress of debris, such as small pieces fat, meat, bone and gristle generated during cutting and trimming operations, into the gear teeth region.

Conceptually, the respective gear tips or radially outer surfaces 330a of the set of gear teeth 330, when the knife blade 300 is rotated, can be viewed as forming a first imaginary cylinder 336 (shown schematically in FIG. 24). Similarly, the respective roots or radially inner surfaces 330b of the set of gear teeth 330, when the knife blade 300 is rotated, can be viewed as forming a second imaginary cylinder 337. A short radially or horizontally extending portion 342 of the outer wall 312 of the blade body 302 extends between the radially outer surfaces 330a of the driven gear 328 and the vertical upper portion 340 of the outer wall 312 of the blade body. A second substantially vertical lower portion 344 of the outer wall 312 of the blade body 302 extends between a bottom surface 345 of the driven gear 328 and the lower end 308 of the blade body. As can be seen in FIG. 24, the vertical lower portion 344 of the knife blade body 302 results in a radially extending projection 348 adjacent the lower end 308 of the blade body 302.

Axial spacing of the drive gear 328 from the upper end 306 of the knife blade body 302 advantageously protects the set of gear teeth 330 from damage that they would otherwise be exposed to if, as is the case with conventional rotary knife blades, the set of gear teeth 330 were positioned at the upper end 306 of the blade body 302 of the rotary knife blade 300. Additionally, debris is generated by the power operated rotary knife 100 during the cutting/trimming operations. Generated debris include pieces or fragments of bone, gristle, meat and/or fat that are dislodged or broken off from the product being cut or trimmed by the power operated rotary knife 100. Debris may also include foreign material, such as dirt, dust and the like, on or near a cutting region of the product being cut or trimmed. Advantageously, spacing the set of gear teeth 330 from both axial ends 306, 308 of the knife blade body 302, impedes or mitigates the migration of such debris into the region of the knife blade driven gear 328. Debris in the region of knife blade driven gear 328 may cause or contribute to a number of problems including blade vibration, premature wear of the driven gear 328 or the mating drive gear 650, and "cooking" of the debris.

Similar advantages exist with respect to axially spacing the blade bearing race 320 from the upper and lower ends 306, 308 of the blade body 302. As will be explained below, the rotary knife blade body 302 and the blade housing 400 are configured to provide radially extending projections or caps which provide a type of labyrinth seal to inhibit entry of debris into the regions of the knife blade driven gear 328 and the blade-blade housing bearing structure 500. These labyrinth seal structures are facilitated by the axial spacing of the knife blade drive gear 328 and the blade bearing race 320 from the upper and lower ends 306, 308 of the blade body 302 of the rotary knife blade 300.

As can best be seen in FIG. 24, in the rotary knife blade 300, the second end 308 of the knife blade body 302 transitions radially inwardly between the body 302 and the blade section 304. The second end 308 of the body 302 is defined by a radially inwardly extending step or shoulder 308a. The blade section 304 extends from the second end 308 of the body 302 and includes a blade cutting edge 350 at an inner, lower end 352 of the blade section 304. As can be seen, the blade section 304 includes an inner wall 354 and a radially spaced apart outer wall 356. The inner and outer walls 354, 356 are substantially parallel. A bridging portion 358 at the forward end of the rotary knife blade 300 extends between the inner and outer walls 354, 356 and forms the cutting edge 350 at the intersection of the bridging portion 358 and the inner wall 354. Depending on the specific configuration of the blade section 304, the bridging portion 358 may extend generally radially or horizontally between the inner and outer walls 354, 356 or may taper at an angle between the inner and outer walls 354, 356.

The rotary knife blade body inner wall 310 and the blade section inner wall 354 together form a substantially continuous knife blade inner wall 360 that extends from the upper end 306 to the cutting edge 350. As can be seen in FIG. 24, there is a slightly inwardly protruding "humpback" region 346 of the inner wall 310 of the blade body 302 in the region of the bearing race 320. The protruding region 346 provides for an increased width or thickness of the blade body 302 in the region where the bearing race 320 extends radially inwardly into the blade body outer wall 312. The knife blade inner wall 360 is generally frustoconical in shape, converging in a downward direction (labeled DW in FIG. 24), that is, in a direction proceeding away from the driven gear 328 and toward the cutting edge 350. The knife blade inner wall 360 defines a cutting opening CO (FIGS. 1 and 54) of the power operated rotary knife 100, that is, the opening defined by the rotary knife blade 300 that cut material, such as a cut layer CL1 (FIG. 54) passes through, as the power operated rotary knife 100 trims or cut a product P.

Blade Housing 400

In one exemplary embodiment and as best seen in FIGS. 25-29, the blade housing 400 of the power operated rotary knife 100 is a one-piece, continuous annular structure. The blade housing 400 includes the mounting section 402 and a blade support section 450. The blade housing 400 is continuous about its perimeter, that is, unlike prior split-ring annular blade housings, the blade housing 400 of the present disclosure has no split along a diameter of the housing to allow for expansion of the blade housing circumference. The blade-blade housing bearing or support structure 500 of the present disclosure secures the rotary knife blade 300 to the blade housing 400. Accordingly, removal of the knife blade 300 from the blade housing 400 is accomplished by removing a portion of the blade-blade housing structure 500 from the power operated rotary knife 100. The blade-blade housing bearing structure 500 permits use of the continuous annular blade housing 400 because there is no need to expand the blade housing circumference to remove the rotary knife blade 300 from the blade housing 400.

The continuous annular blade housing 400 of the present disclosure provides a number of advantages over prior split-ring annular blade housings. The one-piece, continuous annular structure provides for greater strength and durability of the blade housing 400, as compared to prior split-ring annular blade housings. In addition to greater strength and durability of the blade housing 400, the fact that a circumference of the blade housing 400 is not adjustable eliminates need for and precludes the operator from adjusting the circumference of the blade housing 400 during operation of the power operated rotary knife 100 in an attempt to maintain proper operating clearance. This is a significant improvement over the prior split ring annular blade housings. Advantageously, the combination of the rotary knife blade 300, the blade housing 400 and the blade-blade housing bearing structure 500 of the power operated rotary knife 100 provide for proper operating clearance of the rotary knife blade 300 with respect to the blade housing 400 over the useful life of a given rotary knife blade.

As can best be seen in FIG. 25, in the blade housing 400, the blade support section extends around the entire 360 degrees (360°) circumference of the blade housing 400. The mounting section 402 extends radially outwardly from the blade support section 450 and subtends an angle of approximately 120°. Stated another way, the blade housing mounting section 402 extends approximately ⅓ of the way around the circumference of the blade housing 400. In the region of the mounting section 402, the mounting section 402 and the blade support section 450 overlap.

The mounting section 402 is both axially thicker and radially wider than the blade support section 450. The blade housing mounting section 402 includes an inner wall 404 and a radially spaced apart outer wall 406 and a first upper end 408 and an axially spaced apart second lower end 410. At forward ends 412, 414 of the mounting section 402, there are tapered regions 416, 418 that transition between the upper end 408, lower end 410 and outer wall 406 of the mounting section and the corresponding upper end, lower end and outer wall of the blade support section 450.

The blade housing mounting section 402 includes two mounting inserts 420, 422 (FIG. 2A) that extend between the upper and lower ends 408, 410 of the mounting section 402. The mounting inserts 420, 422 define threaded openings 420a, 422a. The blade housing mounting section 402 is received in the seating region 152a defined by the arcuate mounting pedestal 152 of the frame body 150 and is secured to the frame body 150 by a pair of threaded fasteners 170, 172 (FIG. 2C). Specifically, the pair of threaded fasteners 170, 172 extend through threaded openings 160a, 162a defined in a pair of arcuate arms 160, 162 of the frame body 150 and thread into the threaded openings 420a, 422a of the blade housing mounting inserts 420, 422 to releasably secure the blade housing 400 to the frame body 150 and, thereby, couple the blade housing 400 to the gearbox assembly 112 of the head assembly 111.

The mounting section 402 further includes a gearing recess 424 (FIGS. 25 and 28) that extends radially between the inner and outer walls 404, 406. The gearing recess 424 includes an upper clearance recess 426 that does not extend all the way to the inner wall and a wider lower opening 428 that extends between and through the inner and outer walls 404, 406. The upper clearance recess 426 provides clearance for the pinion gear 610 and the axially oriented first bevel gear 652 of the gearbox drive gear 650. The lower opening 428 is sized to receive the radially extending second spur gear 654 of the gearbox drive gear 650 and thereby provide for the interface or meshing of the second spur gear 654 and the driven gear 328 of the rotary knife blade 300 to rotate the knife blade 300 with respect to the blade housing 400.

Figure 30:
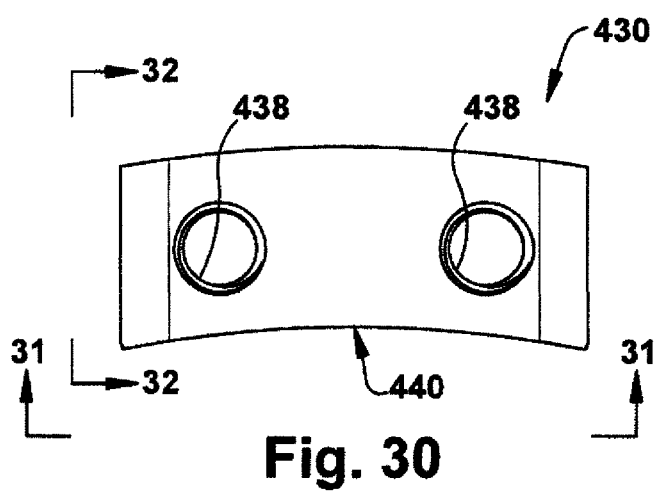
FIG. 30 is a schematic top plan view of the blade housing plug that is removably secured to the blade housing of FIG. 25.
Figure 32:
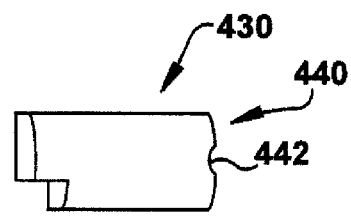
FIG. 32 is a schematic left side elevation view of the blade housing plug of FIG. 30 as seen from a plane indicated by the line 32-32 in FIG. 30.
Figure 31:
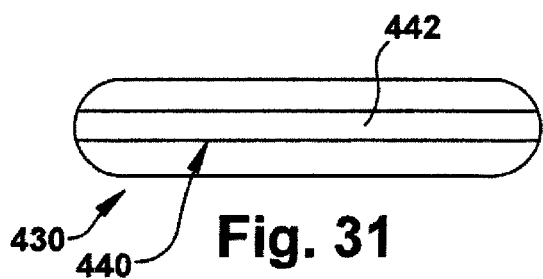
FIG. 31 is a schematic front elevation view of the blade housing plug of FIG. 30 as seen from a plane indicated by the line 31-31 in FIG. 30.

The mounting section 402 of the blade housing 400 also includes a blade housing plug opening 429 extends between the inner and outer walls 404, 406. The blade housing plug opening 429 is generally oval-shaped in cross section and is sized to receive a blade housing plug 430 (FIGS. 30-32). The blade housing plug 430 is removably secured to the blade housing 400 by two screws 432 (FIG. 2A). The screws 432 pass through a pair of countersunk openings 434 that extend from the upper end 408 of the mounting section 402 to the lower portion 428 of the gearing recess 424 and threaded engage a pair of aligned threaded openings 438 of the blade housing plug 430.

As can best be seen in FIG. 29A, the blade support section 450 includes an inner wall 452 and radially spaced apart outer wall 454 and a first upper end 456 and an axially spaced second lower end 458. The blade support section 450 extends about the entire 360° circumference of the blade housing 400. The blade support section 450 in a region of the mounting section 402 is continuous with and forms a portion of the inner wall 404 of the mounting section 402. As can be seen in FIG. 29, a portion 404a of the inner wall 404 of the mounting section 402 of the blade housing 400 within the horizontally extending dashed lines IWBS constitutes both a part of the inner wall 404 of the mounting section 402 and a part of the of the inner wall 452 of the blade support section 450. The dashed lines IWBS substantially correspond to an axial extent of the inner wall 452 of the blade support section 450, that is, the lines IWBS correspond to the upper end 456 and the lower end 458 of the blade support section 450. A substantially vertical portion 452a of the blade support section inner wall 452 adjacent the first upper end 456 defines the blade housing bearing surface 459. In one exemplary embodiment of the power operated rotary knife 100 and as best seen in FIGS. 13 and 29A, the blade housing bearing surface 459 comprises a bearing race 460 that extends radially inwardly into the inner wall 452. The bearing race 460 is axially spaced from the upper end 456 of the blade support section 450. In one exemplary embodiment, a central portion 462 of the blade housing bearing race 460 defines a generally concave bearing surface, and, more specifically, a generally arcuate bearing face 464.

In one exemplary embodiment of the power operated rotary knife 100, the knife blade bearing surface 319 is concave with respect to the outer wall 312, that is, the knife blade bearing surface 319 extends into the outer wall 312 forming the bearing race 320. It should be appreciated that the knife blade bearing surface 319 and/or the blade housing bearing surface 459 may have a different configuration, e.g., in an alternate embodiment, the knife blade bearing surface 319 and the blade housing bearing surface 459 could, for example, be convex with respect to their respective outer and inner walls 312, 452. The plurality of rolling bearings 506 of the blade-blade housing bearing structure 500 would, of course, have to be configured appropriately.

Though other geometric shapes could be used, the use of arcuate bearing faces 322, 464 for the bearing races 320, 460 of both the rotary knife blade 300 and the blade housing 400 is well suited for use with the power operated knife 100 of the present disclosure. Due to the unpredictable and varying load direction the plurality of ball bearing 506 and the arcuate bearing faces 322, 464 allow the rotary knife blade 300 and blade housing 400 to be assembled in such a way to allow for running or operating clearance. This helps to maintain to the extent possible, the theoretical ideal of a single point of rolling bearing contact between a given ball bearing of the plurality of ball bearings 506 and the rotary knife blade arcuate bearing face 322 and the theoretical ideal of a single point of rolling bearing contact between a given ball bearing of the plurality of ball bearings 506 and the blade housing bearing face 464. (It being understood, of course, that a single point of rolling bearing contact is a theoretical because deformation between a ball bearing and a bearing race necessarily causes deformation of the ball bearing and the bearing race resulting in a small region of contact as opposed to a point of contact.) Nevertheless, the arcuate bearing face configurations 322, 464 provide for reduced frictional torque produced in the bearing region. Due to the thin cross sections of the rotary knife blade 300 and the blade housing 400 of the power operated rotary knife 100, there is a tendency for both the inner or blade bearing race 320 and the outer or blade housing outer race 460 to flex and bend while in use. An arcuate bearing race design of slightly larger radius than the ball of the plurality of ball bearings 506 will allow the balls to move along an arc defined by the annular passageway 504 and still contact the respective bearing races 320, 460 at respective single points thereby maintaining low friction even during bending and flexing of the rotary knife blade 300 and the blade housing 400. The arcuate shape of the blade and blade housing bearing races 320, 460 also helps compensate for manufacturing irregularities within the rotary knife blade 300 and the blade housing 400 and thereby helps maintain theoretical ideal of the single point of bearing contact between a ball bearing of the plurality of ball bearings 506 and the respective bearing races 320, 460, as discussed above, thereby reducing friction.

A radially inner wall 440 (FIGS. 2A, 30 and 31) of the blade housing plug 430 defines a bearing race 442 that is a portion of and is continuous with the bearing race 460 of the blade housing 400. Like the portion 404a of the inner wall 404 of the mounting section 402 of the blade housing 400 within the horizontally extending dashed lines IWBS, a portion of the inner wall 440 of the blade housing plug 430 that would be within the horizontally extending dashed lines IWBS of FIG. 29 is both a part of the inner wall 440 of the blade housing plug 430 and a part of the inner wall 452 of the blade support section 450. Thus, when the blade housing plug 430 is inserted in the blade housing plug opening 429 of the blade housing 400, the blade housing bearing race 460 is substantially continuous about the entire 360° circumference of the blade support section 450.

As can best be seen in FIG. 13, when the blade is secured and supported within the blade housing 400 by the blade-blade housing support structure 500, in order to impede the ingress of pieces of meat, bone and other debris into the driven gear 328 of the rotary knife blade 300, a radially outwardly extending driven gear projection or cap 466 at the lower end 458 of the blade support section 450 is axially aligned with and overlies at least a portion of the bottom surface 345 of the set of gear teeth of the knife blade driven gear 328. The driven gear projection or cap 466 defines the lower end 458 of the blade support section 450. The driven gear cap 466 overlies or bridges a gap between the first and second imaginary cylinders 336, 337 (FIG. 24) formed by the driven gear 328 of the rotary knife blade 300. As can be seen in FIG. 13, because of the radial projection 348 of the knife blade body 302 and the driven gear cap 466, only a small radial clearance gap exists between the radially extending end 467 of the driven gear cap 466 of the blade housing 400 and the projection vertical lower portion 344 of outer wall 312 of the knife blade body 302. Advantageously, the combination of the knife blade radial projection 348 and the blade housing cap 466 form a type of labyrinth seal that inhibits ingress of debris into the regions of the driven gear 328 and the bearing race 320 of the rotary knife blade 300.

As can best be seen in FIG. 13, the blade support section inner wall 452 of the blade housing 400 includes a first radially outwardly extending ledge 470 that is located axially below the blade housing bearing race 460. The blade support section inner wall 452 also includes a second radially outwardly extending ledge 472 that forms an upper surface of the driven gear cap portion 466 and is axially spaced below the first radially outwardly extending ledge 470. The first and second ledges 470, 472 provide a seating regions for the horizontally extending portion 342 of the knife blade outer wall 312 and the bottom surface 345 of the set of gear teeth 330, respectively, to support the knife blade 300 when the knife blade 300 is positioned in the blade housing 400 from axially above and the rolling bearing strip 502 of the blade-blade housing bearing structure 500 has not been inserted into a passageway 504 (FIG. 13) between the rotary knife blade 300 and the blade housing 400 defined by opposing arcuate bearing faces 322, 464 of the knife blade bearing race 320 and the blade housing bearing race 460. Of course, it should be understood that without insertion of the rolling bearing strip 502 into the passageway 504, if the power operated rotary knife 100 were turned upside down, that is, upside down from the orientation of the power operated rotary knife 100 shown, for example, in FIG. 7, the rotary knife blade 300 would fall out of the blade housing 400.

As is best seen in FIGS. 25, 27 and 29, the right tapered region 416 (as viewed from a front of the power operated rotary knife 100, that is, looking at the blade housing 400 from the perspective of an arrow labeled RW (designating a rearward direction) in FIG. 25) of the blade housing mounting section 402 includes a cleaning port 480 for injecting cleaning fluid for cleaning the blade housing 400 and the knife blade 300 and the rolling bearing strip 502 during a cleaning process. The cleaning port 480 includes an entry opening 481 in the outer wall 406 of the mounting section 402 and extends through to exit opening 482 in the inner wall 404 of the mounting section 402. As can best be seen in FIG. 29, a portion of the exit opening 482 in the mounting section inner wall is congruent with and opens into a region of the bearing race 460 of the blade housing 400. The exit opening 482 in the mounting section inner wall 404 and a radial gap G (FIG. 13) between the blade 300 and the blade housing 400 provides fluid communication and injection of cleaning fluid into bearing race regions 320, 460 of the knife blade 300 and blade housing 400, respectively, and the driven gear 328 of the knife blade 300.

Blade-Blade Housing Bearing Structure 500

The power operated rotary knife 100 includes the blade-blade housing support or bearing structure 500 (best seen in FIGS. 2A, 13 and 14) that: a) secures the knife blade 300 to the blade housing 400; b) supports the knife blade for rotation with respect to the blade housing about the rotational axis R; and c) defines the rotational plane RP of the knife blade. As noted previously, advantageously, the blade-blade housing support structure 500 of the present disclosure permits the use of a one-piece, continuous annular blade housing 400. Additionally, the blade-blade housing bearing structure 500 provides for lower friction between the knife blade 300 and blade housing 400 compared to prior power operated rotary knife designs.

The lower friction afforded by the blade-blade housing bearing structure 500 advantageously permits the power operated rotary knife 100 of the present disclosure to be operated without the use of an additional, operator applied source of lubrication. Prior power operated rotary knives typically included a lubrication reservoir and bellows-type manual pump mechanism, which allowed the operator to inject an edible, food-grade grease from the reservoir into the blade-blade housing bearing region for the purpose of providing additional lubrication to the bearing region. When cutting or trimming a meat product, lubrication in the nature of fat/grease typically occurs as a natural by-product or result of cutting/trimming operations, that is, as the meat product is cut or trimmed the rotary knife blade cuts through fat/grease. As cutting/trimming operations continue and the rotary knife blade rotates within the blade housing, fat/grease from the meat product may migrate, among other places, into the blade-blade housing bearing region.

In the power operated rotary knife 100, the fat/grease may migrate into the annular passageway 504 (FIG. 13) defined by the opposing arcuate bearing faces 322, 464 of the rotary knife blade bearing race 320 and the blade housing bearing race 460 as the knife 100 is used for meat cutting/trimming operations. However, in prior power operated rotary knives, this naturally occurring lubrication would typically be supplemented by the operator by using the pump mechanism to apply additional lubrication into the blade-blade housing region in an attempt to reduce blade-blade housing bearing friction, make the blade rotate easier, and reduce heating.

In one exemplary embodiment of the power operated rotary knife 100, there is no reservoir of grease or manual pump mechanism to apply the grease. Elimination of the need for additional lubrication, of course, advantageously eliminates those components associated with providing lubrication (grease reservoir, pump, etc.) in prior power operated rotary knives. Elimination of components will reduce weight and/or reduce maintenance requirements associated with the lubrication components of the power operated rotary knife 100. Lower friction between the knife blade 300 and the blade housing 400 decreases heat generated by virtue of friction between the rotary knife blade 300, the blade-blade housing bearing structure 500 and the blade housing 400. Reducing heat generated at the blade-blade housing bearing region has numerous benefits including mitigation of the aforementioned problem of "cooking" of displaced fragments of trimmed meat, gristle, fat, and bone that migrated into the blade-blade housing bearing region 504. In prior power operated rotary knives, frictional contact between the blade and blade housing, under certain conditions, would generate sufficient heat to "cook" material in the blade-blade housing bearing region. The "cooked" material tended to accumulate in the blade-blade housing bearing region as a sticky build up of material, an undesirable result.

Additionally, the lower friction afforded by the blade-blade housing bearing structure 500 of the power operated rotary knife 100 has the additional advantage of potentially increasing the useful life of one or more of the knife blade 300, the blade housing 400 and/or components of the gearbox 602. Of course, the useful life of any component of the power operated rotary knife 100 is dependent on proper operation and proper maintenance of the power operated knife.

As can best be seen in FIGS. 14-17, the blade-blade housing bearing structure 500 comprises an elongated rolling bearing strip 502 that is routed circumferentially through the annular passageway 504 about the axis of rotation R of the knife blade 300. A rotary knife bearing assembly 552 (FIG. 13) of the power operated rotary knife 100 includes the combination of the blade-blade housing bearing structure 500, the blade housing bearing race 460, the knife blade bearing race 320 and the annular passageway 504 defined therebetween. In an alternate exemplary embodiment, a plurality of elongated rolling bearing strips may be utilized, each similar to, but shorter in length than, the elongated bearing strip 502. Utilizing a plurality of shorter elongated bearing strips in place of the single, longer elongated bearing strip 502 may be advantageous in that shorter elongated bearing strips are less difficult and less expensive to fabricate. If a plurality of elongated bearing strips are used, such strips would be sequentially inserted within the annular passageway 504 in head-to-tail fashion or in spaced apart relationship. The plurality of elongated bearing strips may include slightly enlarged end portions so that two adjacent bearing strips do not run together or to limit an extent of overlapping of two adjacent bearing strips.

Figure 14:
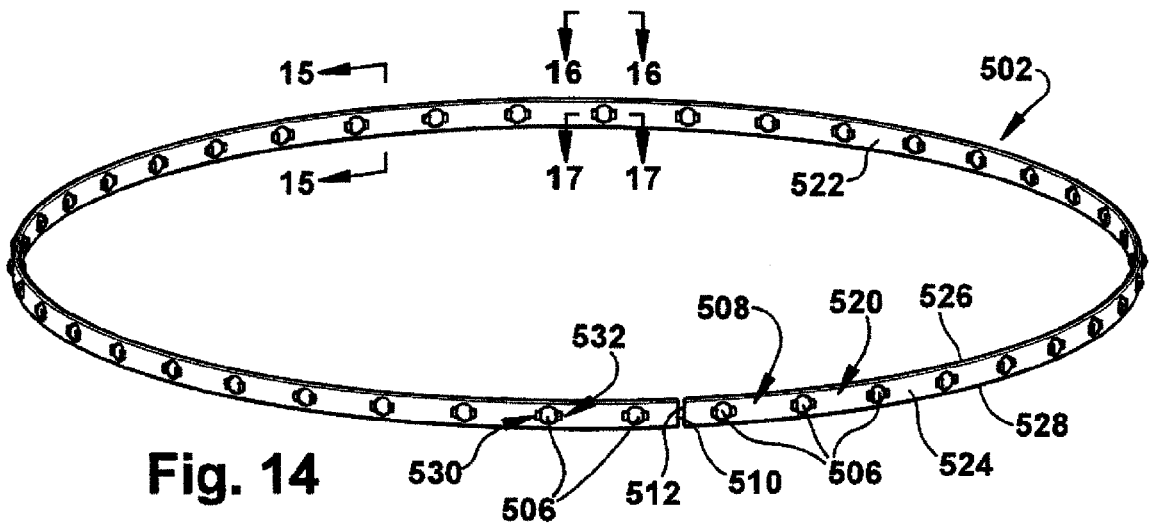
FIG. 14 is a schematic perspective view of the elongated rolling bearing strip of the blade-blade housing bearing structure of the power operated rotary knife of FIG. 1.
Figure 15:
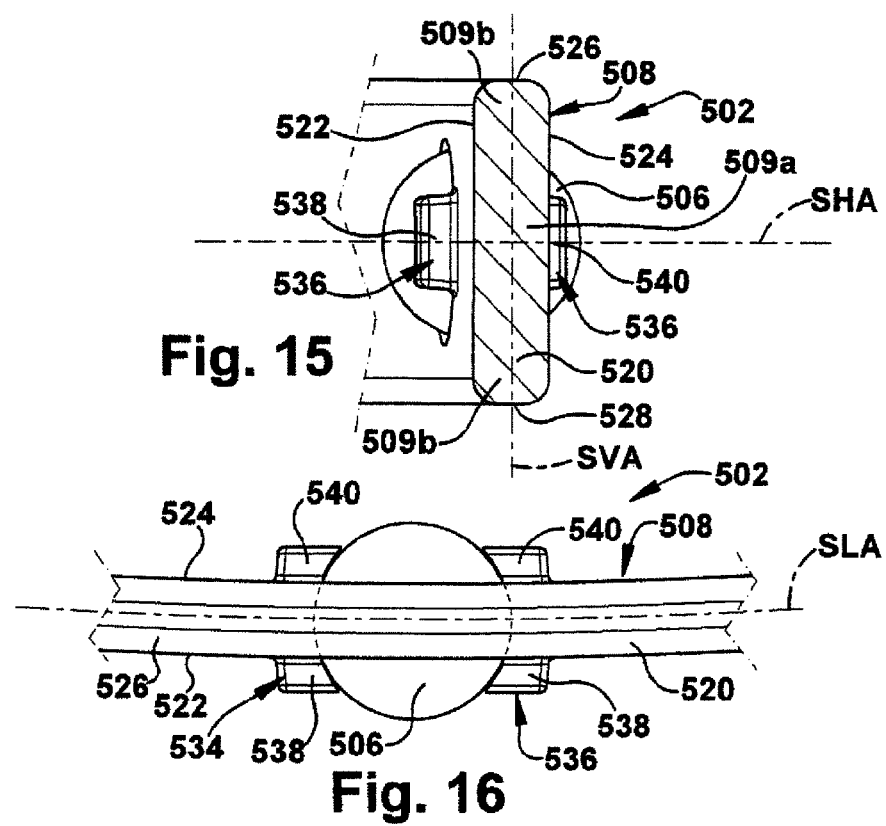
FIG. 15 is a schematic section view of the rolling bearing strip of FIG. 14 taken transverse to a longitudinal axis of the strip, as seen from a plane indicated by the line 15-15 in FIG. 14, to show a schematic section view of an elongated separator cage of the rolling bearing strip at a position where no rolling bearing is located.
Figure 16:
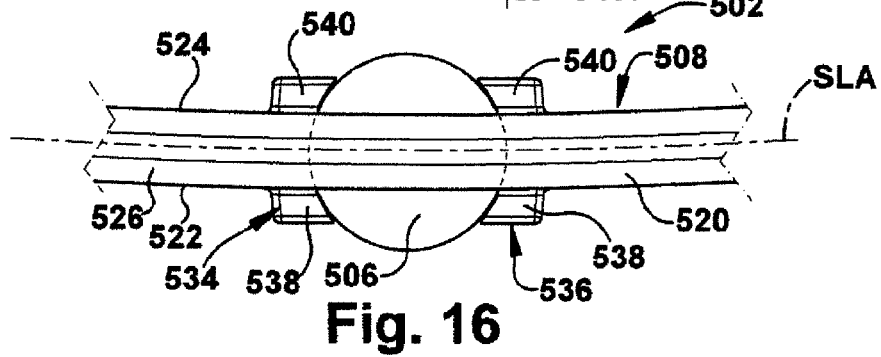
FIG. 16 is a schematic top plan view of a short portion of the rolling bearing strip of FIG. 14 taken along the longitudinal axis of the strip, as seen from a plane indicated by the line 16-16 in FIG. 14, to show a schematic top plan view of the elongated separator cage of the rolling bearing strip at a position where a rolling bearing is located.
Figure 17:
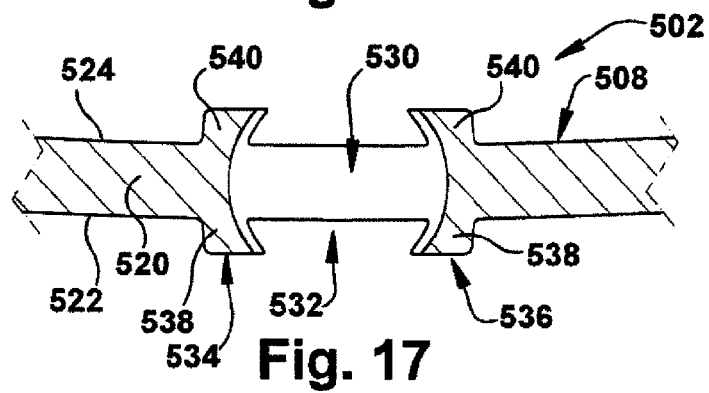
FIG. 17 is a schematic section view of the short portion of the rolling bearing strip of FIG. 14, as seen from a plane indicated by the line 17-17 in FIG. 14, with the rolling bearing removed to show a schematic section view of a pocket of the elongated separator cage.

In one exemplary embodiment, the central portion 462 of the blade housing bearing race 460 defines, in cross section, the substantially arcuate bearing face 464. Similarly, the central portion 324 of the knife blade bearing race 320 defines, in cross section, the substantially arcuate bearing face 322. As can best be seen in FIGS. 14-17, the elongated rolling bearing strip 502, in one exemplary embodiment, comprises the plurality of spaced apart rolling bearings 506 supported for rotation in the flexible separator cage 508. In one exemplary embodiment, the flexible separator cage 508 comprises an elongated polymer strip 520. The elongated polymer strip 520 defines a strip longitudinal axis SLA (FIG. 16) and is generally rectangular when viewed in cross section. The strip 520 includes a first vertical axis SVA (FIG. 15) that is orthogonal to the strip longitudinal axis SVA and a second horizontal axis SHA (FIG. 15) orthogonal to the strip longitudinal axis SLA and the first vertical axis SVA. The strip first vertical axis SVA is substantially parallel to a first inner surface 522 and a second outer surface 524 of the strip 520. As can be seen in FIG. 15, the first inner surface 522 and the second outer surface 524 are generally planar and parallel. The strip second horizontal axis SHA is substantially parallel to a third top or upper surface 526 and a fourth bottom or lower surface 528 of the strip 520.

Each of the plurality of ball bearings 506 is supported for rotation in a respective different bearing pocket 530 of the strip 520. The bearing pockets 530 are spaced apart along the strip longitudinal axis SLA. Each of the strip bearing pockets 530 defines an opening 532 extending between the first inner surface 522 and the second outer surface 524. Each of the plurality of bearing pockets 530 includes a pair of spaced apart support arms 534, 536 extending into the opening 532 to contact and rotationally support a respective ball bearing of the plurality of ball bearings 506. For each pair of support arms 534, 536, the support arms 534, 536 are mirror images of each other. Each of the pairs of support arms 534, 536 defines a pair of facing, generally arcuate bearing surfaces that rotationally support a ball bearing of the plurality of ball bearings 506. Each of the pairs of support arms 534, 536 includes an extending portion 538 that extends outwardly from the strip 520 beyond the first planar inner surface 522 and an extending portion 540 that extends outwardly from the strip 520 beyond the second planar outer surface 524.

The plurality of ball bearings 506 of the elongated rolling bearing strip 502 are in rolling contact with and provide bearing support between the knife blade bearing race 320 and the blade housing bearing race 460. At the same time, while supporting the knife blade 300 for low friction rotation with respect to the blade housing 400, the elongated rolling bearing strip 502 also functions to secure the knife blade 300 with respect to the blade housing 400, that is, the bearing strip 502 prevents the knife blade 300 from falling out of the blade housing 400 regardless of the orientation of the power operated rotary knife 100.

When the rolling bearing strip 502 and, specifically, the plurality of ball bearings 506 are inserted into the passageway 504, the plurality of ball bearings 506 support the knife blade 300 with respect to the blade housing 400. In one exemplary embodiment, the plurality of ball bearings 506 are sized that their radii are smaller than the respective radii of the arcuate bearing surfaces 464, 322. In one exemplary embodiment, the radius of each of the plurality of ball bearings 506 is 1 mm. or approximately 0.039 inch, while radii of the arcuate bearing surfaces 464, 322 are slightly larger, on the order of approximately 0.043 inch. However, it should be recognized that in other alternate embodiments, the radii of the plurality of ball bearings 506 may be equal to or larger than the radii of the arcuate bearing faces 464, 322. That is, the radii of the plurality of ball bearings 506 may be in a general range of between 0.02 inch and 0.07 inch, while the radii of the arcuate bearing surfaces 464, 322 may be in a general range of between 0.03 inch and 0.06 inch. As can best be seen in FIG. 13, when the rolling bearing strip 502 is inserted into the radial, annular gap G, the plurality of ball bearings 506 and a central portion 509a of the separator cage 508 are received in the annular passageway 504 defined between the opposing bearing surfaces 319, 459 of the rotary knife blade 300 and the blade housing 400. The annular passageway 504 comprises part of the annular gap G between the opposing outer wall 312 of the rotary knife blade body 302 and the inner wall 452 of the blade housing blade support section 450. In one exemplary embodiment, the annular gap G is in a range of approximately 0.04-0.05 inch and is disposed between the vertical inner wall portion 452a of the blade support section 450 of the blade housing 400 and the facing vertical outer wall portion 340 of the outer wall 312 of the body 302 of the knife blade 300, adjacent or in the region of the opposing bearing surfaces 319, 459.

As can be seen in FIG. 13, the annular passageway 504 is generally circular in cross section and receives the plurality of ball bearings 506 and a central portion 509a of the separator cage 508 of the elongated rolling bearing strip 502. When positioned in the annular passageway 504, the elongated rolling bearing strip 502 and, specifically, the separator cage 508 of the rolling bearing strip 502, forms substantially a circle or a portion of a circle within the annular passageway 504 centered about an axis that is substantially congruent with the rotary knife blade axis of rotation R. As the separator cage 508 of the rolling bearing strip 502 is vertically oriented in the gap 0, the cage 508 includes top and bottom portions 509b extending from the central portion 509a. As can be seen in FIG. 13, the top and bottom portions 509b of the separator cage 508 extend axially slightly above and slightly below the plurality of ball bearings 506. When positioned in the annular passageway 504, the elongated rolling bearing strip 502 forms substantially a circle or a portion of a circle within the annular passageway 504 centered about an axis that is substantially congruent with the rotary knife blade axis of rotation R, while the separator cage 508 forms substantially a cylinder or a portion of a cylinder with the gap G centered about the rotary knife blade axis of rotation R.

As can be seen in FIG. 13, the separator cage 508, in cross section, is rectangular and is oriented in an upright position within the gap G, the separator cage 508 may be viewed as forming substantially a cylinder or a partial cylinder within the gap G centered about the rotary knife blade axis of rotation R. The plurality of ball bearings 506 ride within the annular passageway 504, which is substantially circular in cross section and is centered about the blade axis of rotation R.

To minimize friction, it is not desirable for the flexible separator cage 508 to be in contact with or in bearing engagement with either the rotary knife blade 300 or the blade housing 400 as this would unnecessarily generate sliding friction. What is desired is for the rotary knife blade 300 to be solely supported with respect to the blade housing 400 via rolling bearing support provided by the plurality of ball bearings 506 of the rolling bearing strip 502 bearing against the opposing arcuate bearing faces 322, 464 of the rotary knife blade 300 and the blade housing 400. Accordingly, as can best be seen in the sectional view of FIG. 13, the flexible separator cage 508 is configured to ride in the annular passageway 504 and in the annular gap G without substantial contact with either the knife blade 300 or the blade housing 400 or the opposing bearing surfaces 319, 459 of the knife blade 300 and blade housing 400. In one exemplary embodiment, a width of the upper and lower portions 509b of the separator cage 508 is on the order of 0.03 inch and, as mentioned previously, the annular gap G is on the order of 0.04-0.05 inch. Thus, when the rolling bearing strip 502 is inserted into the annular passageway 504, a clearance of approximately 0.005-0.010 inch exists between the separator cage 508 and the facing vertical outer wall portion 340 of the outer wall 312 of the body 302 of the knife blade 300, adjacent the opposing bearing surfaces 319, 459. Depending on the specific length of the separator cage 508 and the circumference of the gap G, the ends 510, 512 of the separator cage 508 may be spaced apart slightly (as is shown in FIG. 14), may be in contact, or may be slightly overlapping.

Figure 10:
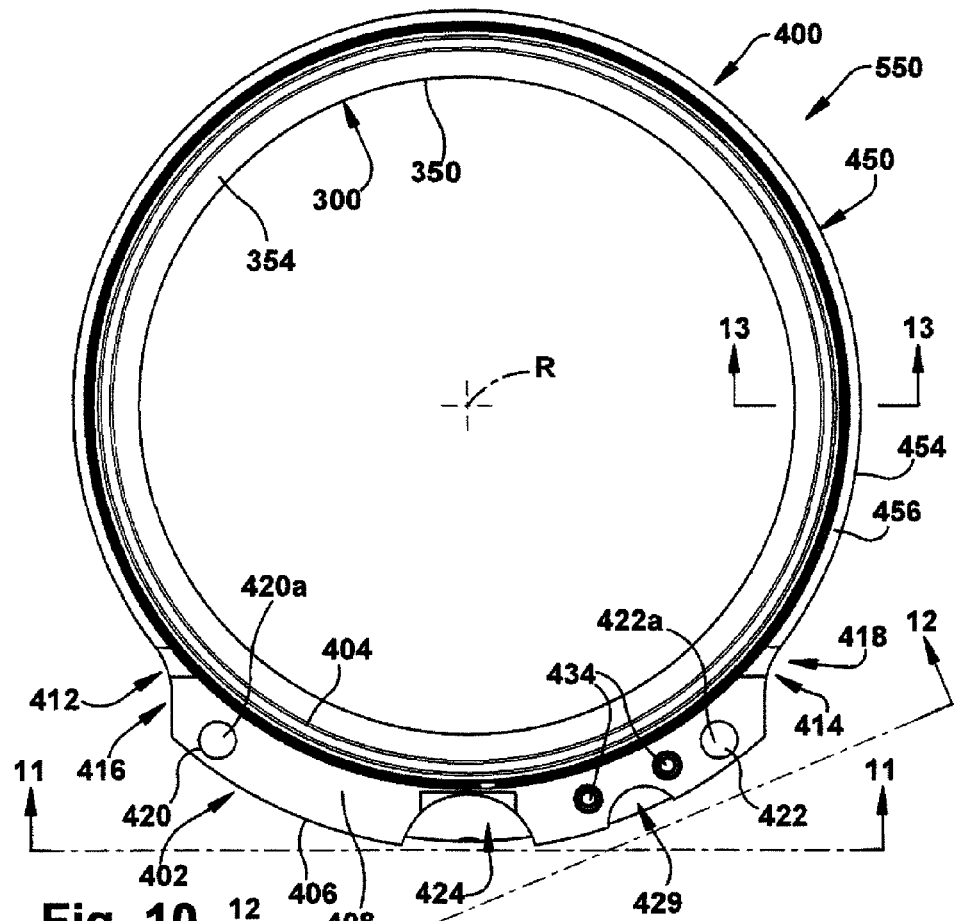
FIG. 10 a schematic top plan view of an assembled combination of the rotary knife blade, the blade housing, and the blade-blade housing bearing structure of the power operated rotary knife of FIG. 1.
Figure 11:
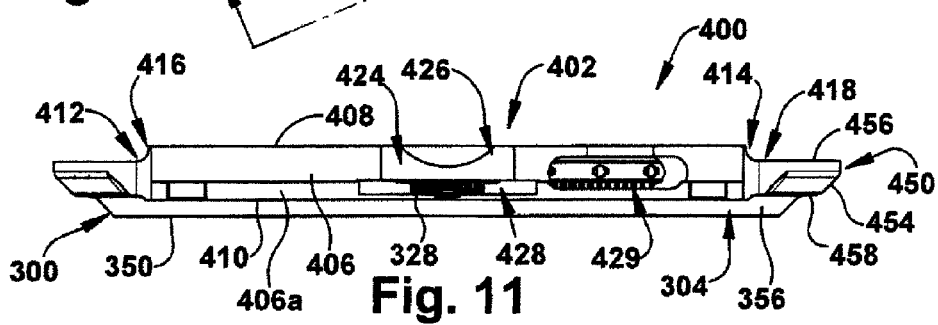
FIG. 11 is a schematic rear elevation view of the assembled combination of the rotary knife blade, blade housing, and blade-blade housing bearing structure of FIG. 10, as seen from a plane indicated by the line 11-11 in FIG. 10, with a blade housing plug removed from the blade housing.
Figure 12:
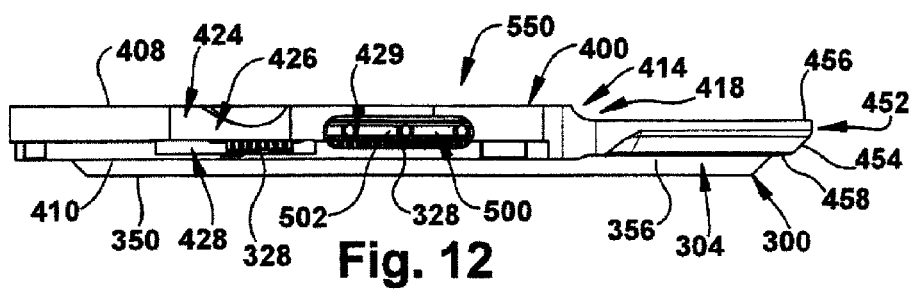
FIG. 12 is a schematic side elevation view of the assembled combination of the rotary knife blade, blade housing, and blade-blade housing bearing structure of FIG. 10, as seen from a plane indicated by the line 12-12 in FIG. 10, with a blade housing plug removed from the blade housing.

It should be appreciated that when the rotary knife blade 300 is rotated by the drive train 604 at a specific, desired RPM, the separator cage 508 also moves or translates in a circle along the annular gap G, although the rotational speed of the separator cage 508 within the gap G is less than the RPM of the rotary knife blade 300. Thus, when the power operated rotary knife 100 is in operation, the elongated rolling bearing strip 502 traverses through the annular passageway 504 forming a circle about the knife blade axis of rotation R. Similarly, when the power operated rotary knife 100 is in operation, the separator cage 508, due to its movement or translation along the annular gap G about the knife blade axis of rotation R, can be considered as forming a complete cylinder within the gap G. Additionally, when the rotary knife blade 300 is rotated, the plurality of ball bearings 506 both rotate with respect to the separator cage 506 and also move or translate along the annular passageway 504 about the knife blade axis of rotation R as the separator cage 508 moves or translates along the annular gap G. Upon complete insertion of the rolling bearing strip 502 into the gap G, the assembled blade-blade housing combination 550 (FIGS. 9 and 10) is then ready to be secured, as a unit, to the frame body 150 of the head assembly 111.

Rolling bearing strips of suitable configuration are manufactured by KMF of Germany and are available in the United States through International Customized Bearings, 200 Forsyth Dr., Step. E, Charlotte, N.C. 28237-5815.

Securing the Knife Blade 300 to the Blade Housing 400

The blade-blade housing bearing structure 500 is utilized to both secure the rotary knife blade 300 to the blade housing 400 and to rotatably support the blade 300 within the blade housing 400. To insert the elongated rolling bearing strip 502 of the blade-blade housing bearing structure 500 the passageway 504 formed between the radially aligned, opposing arcuate bearing faces 322, 464 of the blade bearing race 320 and the blade housing bearing race 460, the blade housing plug 430 is removed from the blade housing plug opening 429 of the blade housing 400. Then, the rolling bearing strip 502 is routed between the knife blade 300 and the blade housing 400 into the annular gap G and through the passageway 504. Next, the blade housing plug 430 is inserted in the blade housing plug opening 429 and the plug 430 is secured to the blade housing 400. The blade-blade housing combination 550 then ready to be secured to the arcuate mounting pedestal 152 of the frame body 150.

Figure 58:
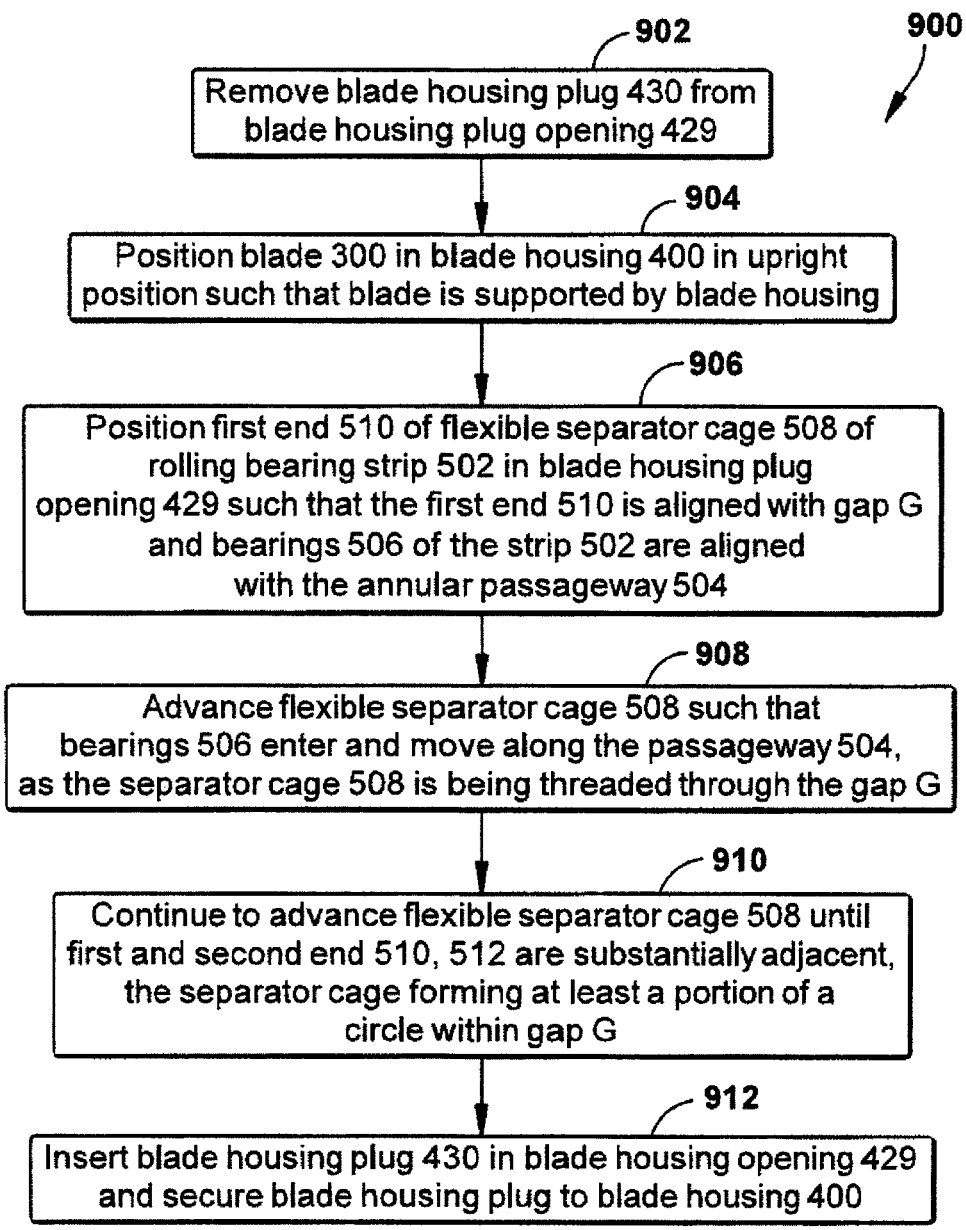
FIG. 58 is a is a schematic flow diagram for a method of securing and rotationally supporting the rotary knife blade with respect to the blade housing utilizing the blade-blade housing bearing structure of the power operated rotary knife of FIG. 1.

As can be seen in FIGS. 18-21 and in the flow diagram set forth in FIG. 58, a method of securing the rotary knife blade 300 to the blade housing 400 for rotation with respect to the blade housing 400 about the blade axis of rotation R is shown generally at 900 in FIG. 58. The method 900 includes the following steps. At step 902, remove the blade housing plug 430 from the blade housing plug opening 429. At step 904, position the rotary knife blade 300 in blade housing 400 in an upright position such that blade 300 is supported by blade housing 400. Specifically, the knife blade 300 is positioned in the blade housing 400 in an upright orientation such that the horizontal extending portion 342 of the outer wall 312 of the knife blade 300 and the bottom surface 345 of the knife blade set of gear teeth 330 are disposed on the respective first and second ledges 470, 472 of the blade housing 400. In this upright orientation, the blade housing bearing race 460 and the knife blade bearing race 320 are substantially radially aligned such that the annular passageway 504 is defined between the blade housing bearing race 460 and the knife blade bearing race 320.

Figure 18:
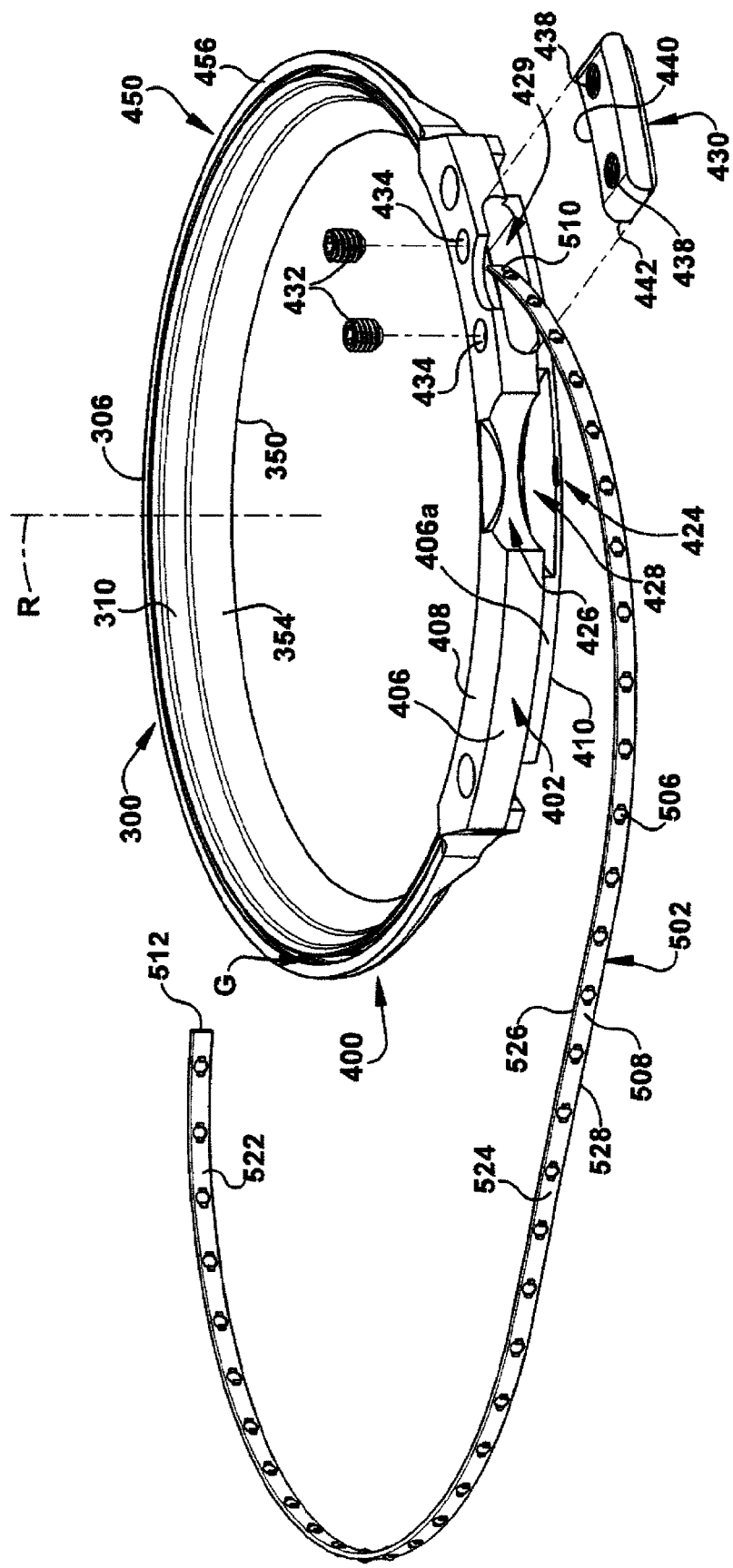
FIG. 18 is a schematic perspective view representation of a method of releasably securing the rotary knife blade to the blade housing utilizing the blade-blade housing bearing structure in the power operated rotary knife of FIG. 1, showing alignment of the elongated rolling bearing strip with an annular passageway defined between the rotary knife blade and the blade housing.
Figure 23:
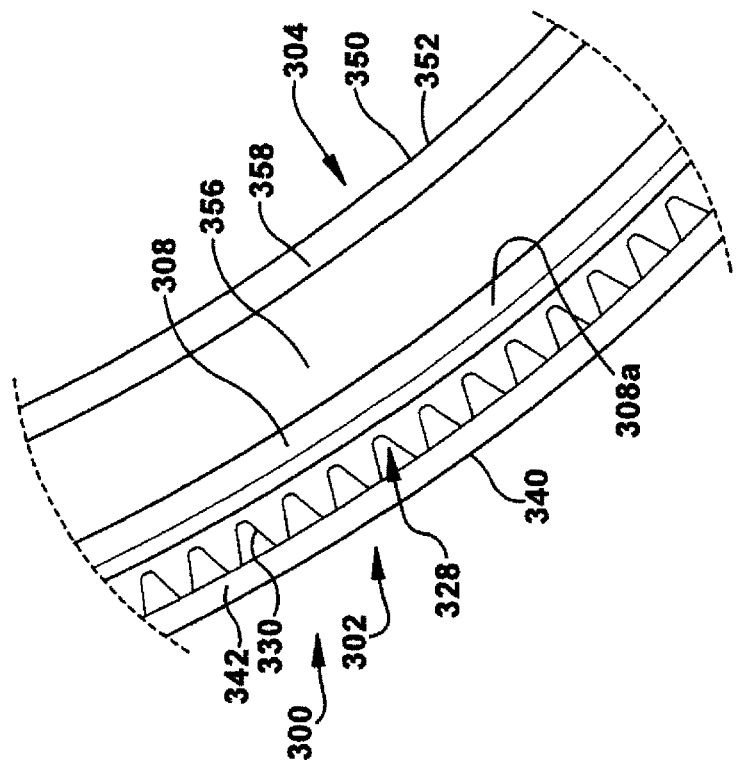
FIG. 23 is schematic enlarged bottom plan view of the portion of the annular rotary knife blade of FIG. 22.
Figure 22:
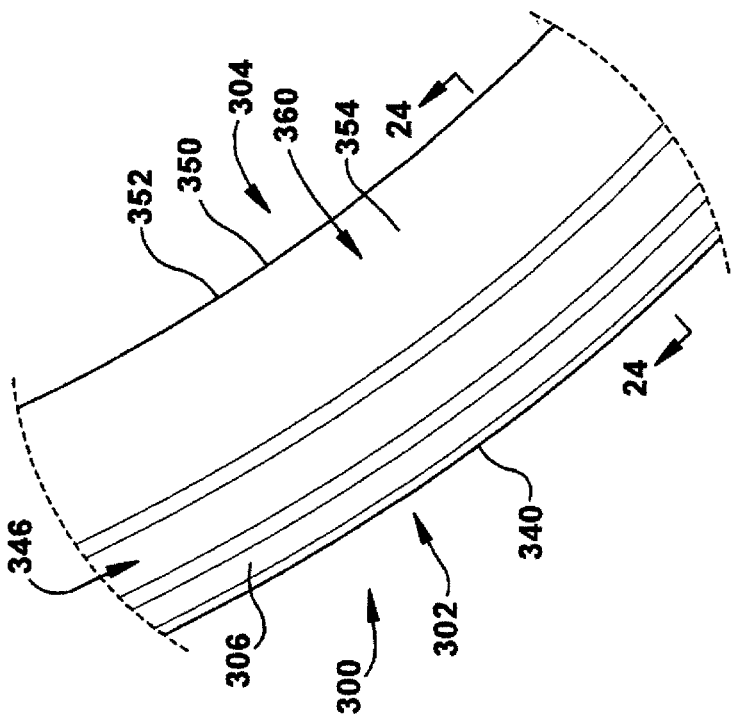
FIG. 22 is a schematic enlarged top plan view of a portion of the annular rotary knife blade of the power operated rotary knife of FIG. 1.

At step 906, as is shown schematically in FIG. 18, position the first end 510 of flexible separator cage 508 of rolling bearing strip 502 in blade housing plug opening 429 such that first end 510 is tangentially aligned with the gap G between the blade 300 and the blade housing 400 and the bearings 506 of the rolling bearing strip 502 are aligned with the annular passageway 504 between the opposing arcuate bearing faces 322, 464 of the blade 300 and blade housing 400. At step 908, advance the flexible separator cage 508 tangentially with respect to the gap G such that bearings 506 of the rolling bearing strip 502 enter and move along the passageway 504. That is, as is shown schematically in FIG. 19, the separator cage 508 is advanced such that the separator cage 508 is effectively threaded through the passageway 504 and the gap G. The separator cage 508 is oriented in an upright position such that the cage fits into the gap G between the knife blade 300 and the blade housing 400.

At step 910, continue to advance the flexible separator cage 508 until first and second ends 510, 512 of the separator cage 508 are substantially adjacent (FIG. 20), that is, the separator cage 508 forms at least a portion of a circle within the passageway 504 and the gap G (like the circle C formed by the separator cage 508 schematically shown in FIG. 2A). A longitudinal extent of the separator cage 508 of the elongated strip 502 along the strip longitudinal axis SLA is sufficient such that when the strip 502 is installed in the passageway 504, the first and second ends 510, 512 of the strip separator cage 508, if not in contact, are slightly spaced apart as shown, for example in FIGS. 2A and 14. That is, the upright strip cage 508 when installed in the passageway 504 forms at least a portion of a cylinder within the passageway 504 and the gap G. At step 912 and as is shown schematically in FIG. 21, insert the blade housing plug 430 in blade housing opening 429 and secure blade housing plug to blade housing 400 with the fasteners 432.

As the rotary knife blade 400 is rotated by the gear train 604, the elongated rolling bearing strip 502 will travel in a circular route or path of travel within the gap G, that is, the plurality of spaced apart ball bearings 506 will move in a circle though the annular passageway 504. However, because the individual bearings are also rotating within the separator cage 508 as the separator cage 508 moves in a circular route in the gap G, the rotational speed or angular velocity of the separator cage 508 is significantly less than the rotation speed or angular velocity of the rotary knife blade 300 with respect to the blade housing 400.

It should be appreciated that not all of the mating or coacting bearing surfaces of the rotary knife bearing assembly 552 including of the plurality of ball bearings 506 of the elongated rolling bearing strip 502, the rotary knife blade bearing race 320, the blade housing bearing race 460, and the blade housing plug bearing race portion 446, as described above, are in contact at any given time because there are necessarily running or operating clearances between the bearing strip rotary knife blade 300, the blade housing 400, and the blade housing plug 430 which allow the blade 300 to rotate relatively freely within the blade housing 400.

These running or operating clearances cause the rotary knife blade 300 to act somewhat akin to a teeter-totter within the blade housing 400, that is, as one region of the blade 300 is pivoted or moved upwardly within the blade housing 400 during a cutting or trimming operation, the diametrically opposite portion of the blade (180° away) is generally pivoted or moved downwardly within the blade housing. Accordingly, the specific mating bearing surfaces of the rotary blade bearing assembly 552 in contact at any specific location of the rotary knife blade 300, the blade housing 400, or the elongated bearing strip 502 will change and, at any given time, will be determined, at least in part, by the forces applied to the rotary knife blade 300 during use of the power operated rotary knife 100. Thus, for any specific portion or region of a bearing surface of the rotary blade bearing assembly 552, there may be periods of non-contact or intermittent contact with a mating bearing surface.

Removal of the rotary knife blade 300 from the blade housing 400 involves the reverse of the procedure discussed above. Namely, the blade housing plug 430 is removed from the blade housing 400. The rotary knife blade 300 is rotated with respect to the blade housing 400 until the adjacent ends 510, 512 of the separator cage 508 are visible within the blade housing plug opening 429. A small instrument, such as a small screwdriver, is used to contact and direct or pry one end of the separator cage 508, say, the first end 510 of the separator cage 508, tangentially away from the gap G. Rotation of the rotary knife blade 300 is continued until a sufficient length of the separator cage 508 is extending tangentially away from the gap G and through the blade housing plug opening 429 such that the end 510 of the separator cage 508 may be grasped by the fingers of the operator. The separator cage 508 is then pulled from the gap G. Once the cage 508 has been completely removed from the gap G between the rotary knife blade 300 and the blade housing 400, the blade housing 400 is turned upside down and the rotary knife blade 300 will fall out of the blade housing 400.

Cutting Profile of Blade-Blade Housing Combination 550

Figure 54:
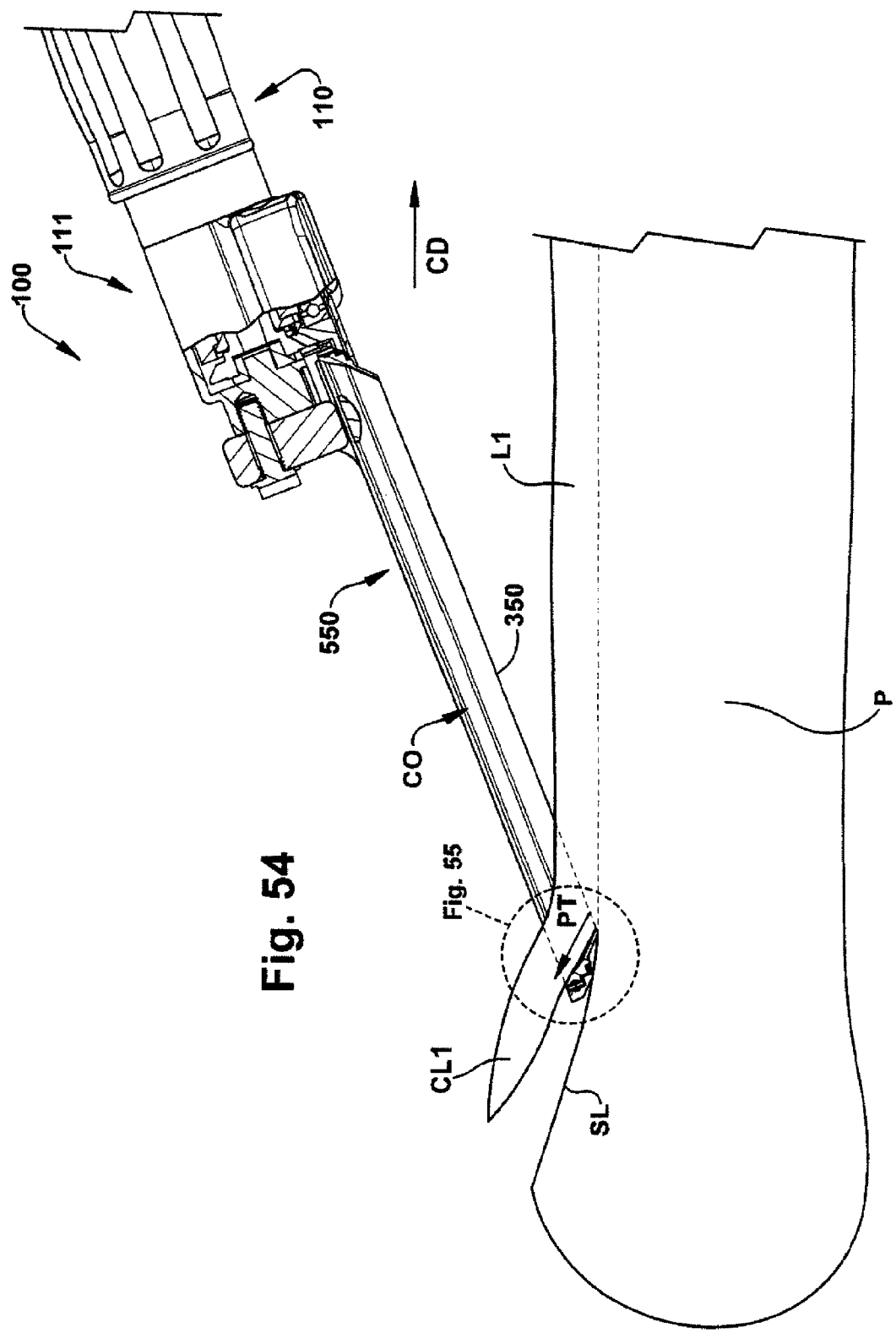
FIG. 54 is a schematic view, partly in side elevation and partly in section, depicting use of the power operated rotary knife of FIG. 1 for trimming a layer of material from a product utilizing the "flat blade" style rotary knife blade, shown, for example, in FIG. 24.
Figure 55:
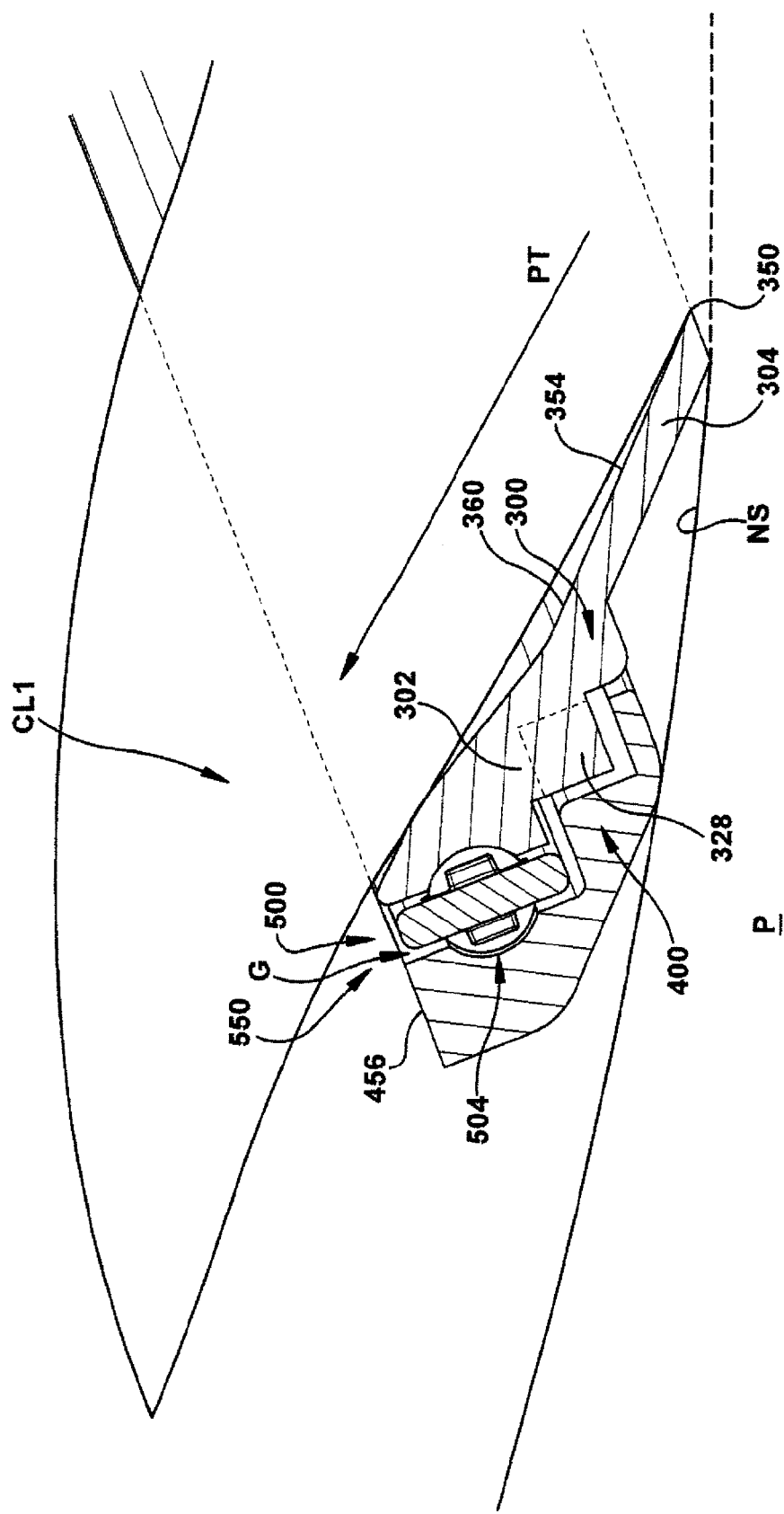
FIG. 55 is a schematic enlarged view, partly in side elevation and partly in section, depicting use of the power operated rotary knife of FIG. 1 for trimming a layer of material from a product utilizing the "flat blade" style rotary knife blade.

The friction or drag experienced by the operator as the power operated rotary knife 100 is manipulated by the operator to move through a product P, as schematically illustrated in FIGS. 54 and 55, is dependent, among other things, on the cross sectional shape or configuration of the blade-blade housing combination 550 in a cutting region CR of the assembled combination 550. As can best be seen in FIG. 3, the cutting region CR of the blade-blade housing combination 550 is approximately 240 of the entire 360° periphery of the combination. The cutting region CR excludes the approximately 120° of the periphery of the blade-blade housing combination 550 occupied by the mounting section 402 of the blade housing 400.

As can best be seen in FIGS. 54 and 55, the blade-blade housing combination 550 is configured and contoured to be as smooth and continuous as practical. As can best be seen in FIG. 54, a layer L1 of material is cut or trimmed from a product P being processed (for example, a layer of tissue, for example, a layer of meat or fat trimmed from an animal carcass) by moving the power operated rotary knife 100 in a cutting direction CD such that the rotating knife blade 300 and blade housing 400 move along and through the product P to cut or trim the layer of material L1. As the power operated rotary knife 100 is moved by the operator, the blade edge 350 cuts the layer L1 forming a cut portion CL1 of the layer L1. The cut portion CL moves along a cut or trimmed material path of travel PT through the cutting opening CO of the blade-blade housing combination 550 as the power operated rotary knife 100 advances through the product P.

A new outer surface layer NS (FIG. 55) formed as the layer L1 is cut away from the product P. The cut portion CL1 of the layer L1 slides along the inner wall 360 of the rotary knife blade 300, while new outer surface layer NS slides along the respective outer walls 356, 454 of the blade section 350 of the knife blade 300 and the blade support section 404 of the blade housing 400.

A smooth transition between the blade section outer wall 356 of the knife blade 300 and the blade support section outer wall 454 of the blade housing 400 is provided by the short, radially extending driven gear cap portion 466 of the blade housing 400 and the radially extending shoulder 308a of the lower end 308 of the rotary knife blade body 302. The close proximity of the radially extending end 467 of the driven gear cap portion 466 provides a labyrinth seal to impede ingress of foreign materials into the region of the knife blade driven gear 328 and the region of the blade-blade housing bearing structure 500. Finally, the blade-blade housing combination 550 in the cutting region CR is shaped to extent possible to reduce drag and friction experienced by the operator when manipulating the power operated rotary knife in performing cutting or trimming operations.

Gear Train 604

The drive mechanism 600 of the power operated rotary knife 100 includes certain components and assemblies internal to the power operated rotary knife 100 including the gear train 604 and the driven gear 328 of the rotary knife blade 300 and certain components and assemblies external to the power operated rotary knife 100 including the drive motor 800 and the flexible shaft drive assembly 700, which is releasably coupled to the knife 100, via the drive shaft latching assembly 275.

Within the power operated rotary knife 100, the drive mechanism 600 includes the gearbox 602 comprising the gear train 604. In one exemplary embodiment, the gear train 604 includes the pinion gear 610 and the drive gear 650. The drive gear 650, in turn, engages the driven gear 328 of the rotary knife blade 300 to rotate the knife blade 300. As noted previously, the gearbox drive gear 650, in one exemplary embodiment, is a double gear that includes an upper, vertically or axially oriented bevel gear 652 and a lower, horizontally or radially oriented spur gear 654. The drive gear upper bevel gear 652 engages and is rotatably driven by the pinion gear 610. The drive gear lower spur gear 654 defines a plurality of drive gear teeth 656 that are mating involute gear teeth that mesh with the involute gear teeth 332 of the rotary knife blade driven gear 328 to rotate the rotary knife blade 300. This gearing combination between the drive gear 650 and the rotary knife blade 300 defines a spur gear involute gear drive 658 (FIG. 8A) to rotate the rotary knife blade 300.

In the involute gear drive, the profiles of the rotary knife gear teeth 332 of the rotary knife blade 300 and the gear teeth 656 of the spur gear 654 of the drive gear 650 are involutes of a circle and contact between any pair of gear teeth occurs at a substantially single instantaneous point. Rotation of the drive gear 650 and the knife blade driven gear 328 causes the location of the contact point to move across the respective tooth surfaces. The motion across the respective gear tooth faces is a rolling type of contact, with substantially no sliding involved. The involute tooth form of rotary knife blade gear teeth 332 and the spur gear gear teeth 656 results in very little wear of the respective meshing gear teeth 332, 656 versus a gearing structure wherein the meshing gear teeth contact with a sliding motion. The path traced by the contact point is known as the line of action. A property of the involute tooth form is that if the gears are meshed properly, the line of action is straight and passes through the pitch point of the gears. Additionally, the involute gear drive 658 is also a spur gear drive which means that an axis of rotation DGR (shown in FIGS. 8 and 8A) of the drive gear 650 is substantially parallel to the axis of rotation R of the knife blade 300. Such a spur drive with parallel axes of rotation DGR, R is very efficient in transmitting driving forces. The spur drive gearing arrangement of the rotary knife blade gear teeth 332 and the spur gear drive teeth 656 also advantageously contributes to reducing the wear of the meshing gears 332, 656 compared with other more complex gearing arrangements.

Figure 37:
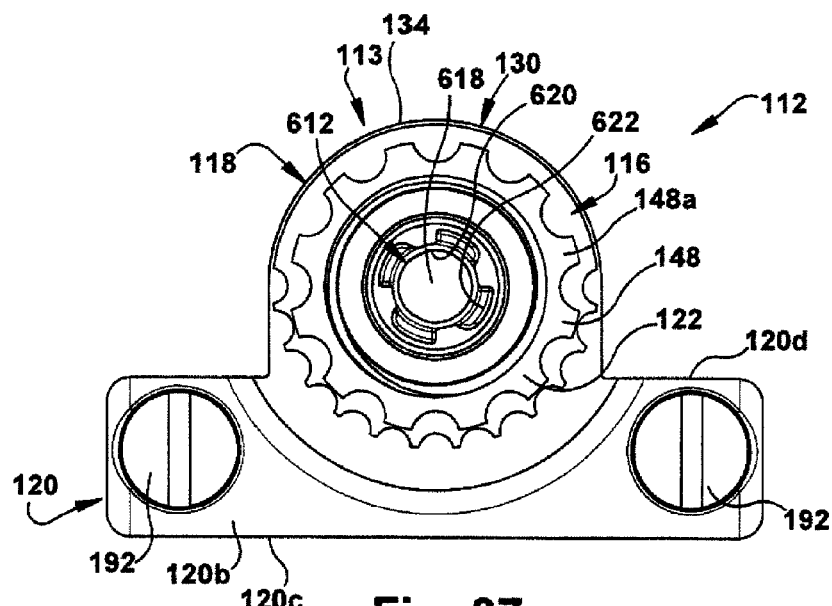
FIG. 37 is a schematic rear elevation view of the gearbox assembly of FIG. 33.
Figure 38:
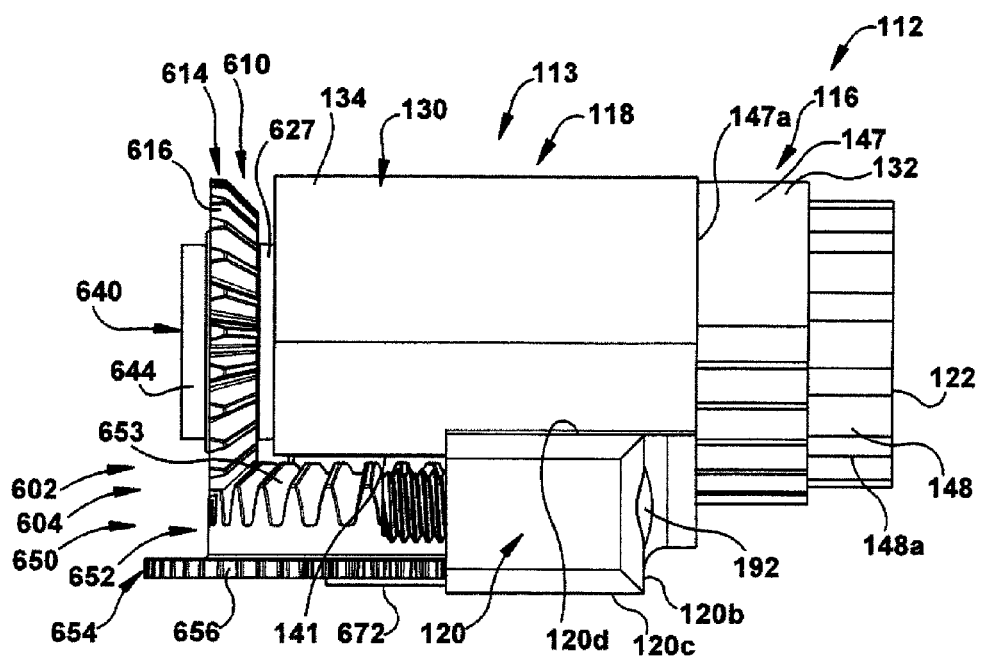
FIG. 38 is a schematic right side elevation view of the gearbox assembly of FIG. 33.

The pinion gear 610 comprises an input shaft 612 and a gear head 614 that extends radially outwardly from the input shaft 612 and defines a set of bevel gear teeth 616. The input shaft 612 extends in a rearward direction RW along the handle assembly longitudinal axis LA and includes a central opening 618 extending in a forward direction FW from a rearward end 629 (FIG. 41) to a forward end 628 of the input shaft 612, the central opening 618 terminating at the gear head 614. An inner surface 620 of the input shaft 612 defines a cross-shaped female socket or fitting 622 (FIGS. 37 and 40) which receives a mating male drive fitting 714 (FIG. 53) of the shaft drive assembly 700 to rotate the pinion gear 610 about an axis of rotation PGR which is substantially congruent with the handle assembly longitudinal axis LA and intersects the knife blade axis of rotation R.

The pinion gear 610 is supported for rotation about the pinion gear axis of rotation PGR (FIGS. 8 and 8A) by the bearing support assembly 630, which, in one exemplary embodiment, includes a larger sleeve bushing 632 and a smaller sleeve bushing 640 (FIG. 42). As can best be seen in FIG. 41, a forward facing surface 624 of the gear head 614 of the pinion gear 610 includes a central recess 626 which is substantially circular in cross section and is centered about the pinion gear axis of rotation PGR. The pinion gear central recess 626 receives a cylindrical reward portion 642 of the smaller sleeve bushing 640. The smaller sleeve bushing 640 functions as a thrust bearing and includes an enlarged annular head 644 provides a bearing surface for the pinion gear gear head 614 and limits axial travel of the pinion gear 610 in the forward direction FW, that is, travel of the pinion gear 610 along the pinion gear axis of rotation PGR, in the forward direction FW.

The sleeve bushing 640 is supported on a boss 158b (FIGS. 49 and 50) of the frame body 150. Specifically, the boss 158b extends rearwardly from an inner surface 158a of a forward wall 154a of a central cylindrical region 154 of the frame body 150. The boss 158b of the frame body central cylindrical region 154 includes a flat 158c that interfits with a flat 648 (FIG. 2C) formed in a central opening 646 of the sleeve bushing 640 to prevent rotation of the sleeve bushing 640 as the pinion gear 610 rotates about its axis of rotation PGR.

In one exemplary embodiment, the gear head 614 of the pinion gear 610 includes 25 bevel gear teeth and, at the forward facing surface 624, has an outside diameter of approximately 0.84 inch (measured across the gear from the tops of the gear teeth) and a root diameter of approximately 0.72 inch (measured across a base of the teeth). The bevel gear teeth 616 taper from a larger diameter at the forward facing surface 624 to a smaller diameter in away from the forward facing surface 624.

The larger sleeve bushing 632 of the pinion gear bearing support assembly 630 includes a central opening 634 that receives and rotatably supports the pinion gear input shaft 612. The larger sleeve bushing 632 includes an enlarged forward head 636 and a cylindrical rearward body 637. The cylindrical rearward body 637 of the larger sleeve bushing 632 is supported within a conforming cavity 129 (FIGS. 39 and 48) of the inverted U-shaped forward section 118 of the gearbox housing 113, while the enlarged forward head 636 of the sleeve bushing 632 fits within a conforming forward cavity 126 of the U-shaped forward section 118 of the gearbox housing 113.

A flat 638 (FIG. 41) of the enlarged forward head 636 of the larger sleeve bushing 632 interfits with a flat 128 of the U-shaped forward section 118 of the gearbox housing 113 to prevent rotation of the sleeve bushing 632 within the gearbox housing 113. The cylindrical body 639 of the larger sleeve bushing 632 defining the central opening 634 provides radial bearing support for the pinion gear 610. The enlarged head 636 of the sleeve bushing 632 also provides a thrust bearing surface for the rearward collar 627 of the gear head 614 to prevent axial movement of the pinion gear 610 in the rearward direction RW, that is, travel of the pinion gear 610 along the pinion gear axis of rotation PGR, in the rearward direction RW. Alternatively, instead of a pair of sleeve bushings 632, 640, the bearing support assembly 630 for the pinion gear 610 may comprise one or more roller or ball bearing assemblies or a combination of roller/ball bearing assemblies and sleeve bearings.

Figure 8A:
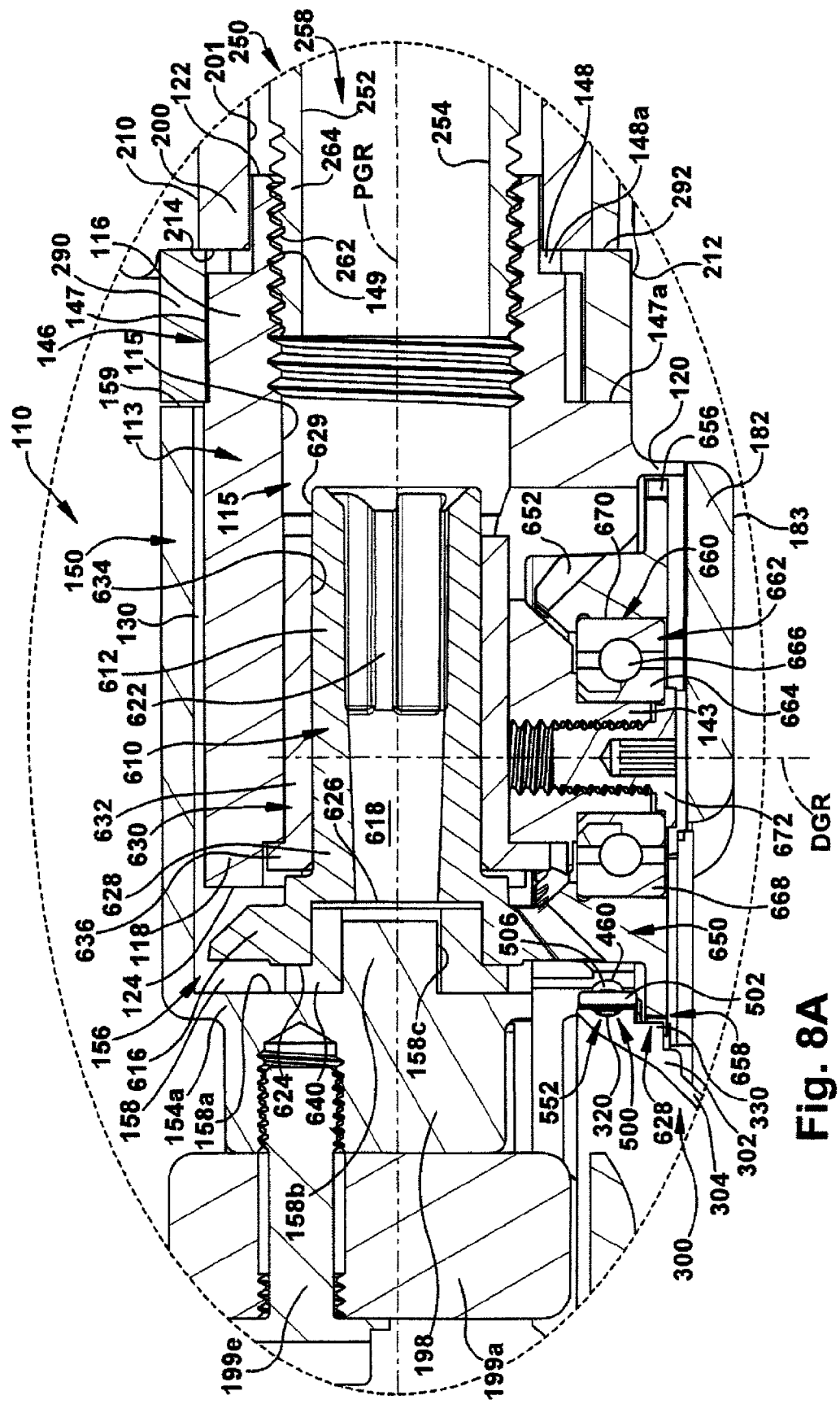
FIG. 8A is a schematic enlarged section view of a portion of the handle assembly shown in FIG. 8 that is within a dashed circle labeled FIG. 8A in FIG. 8.
Figure 9:
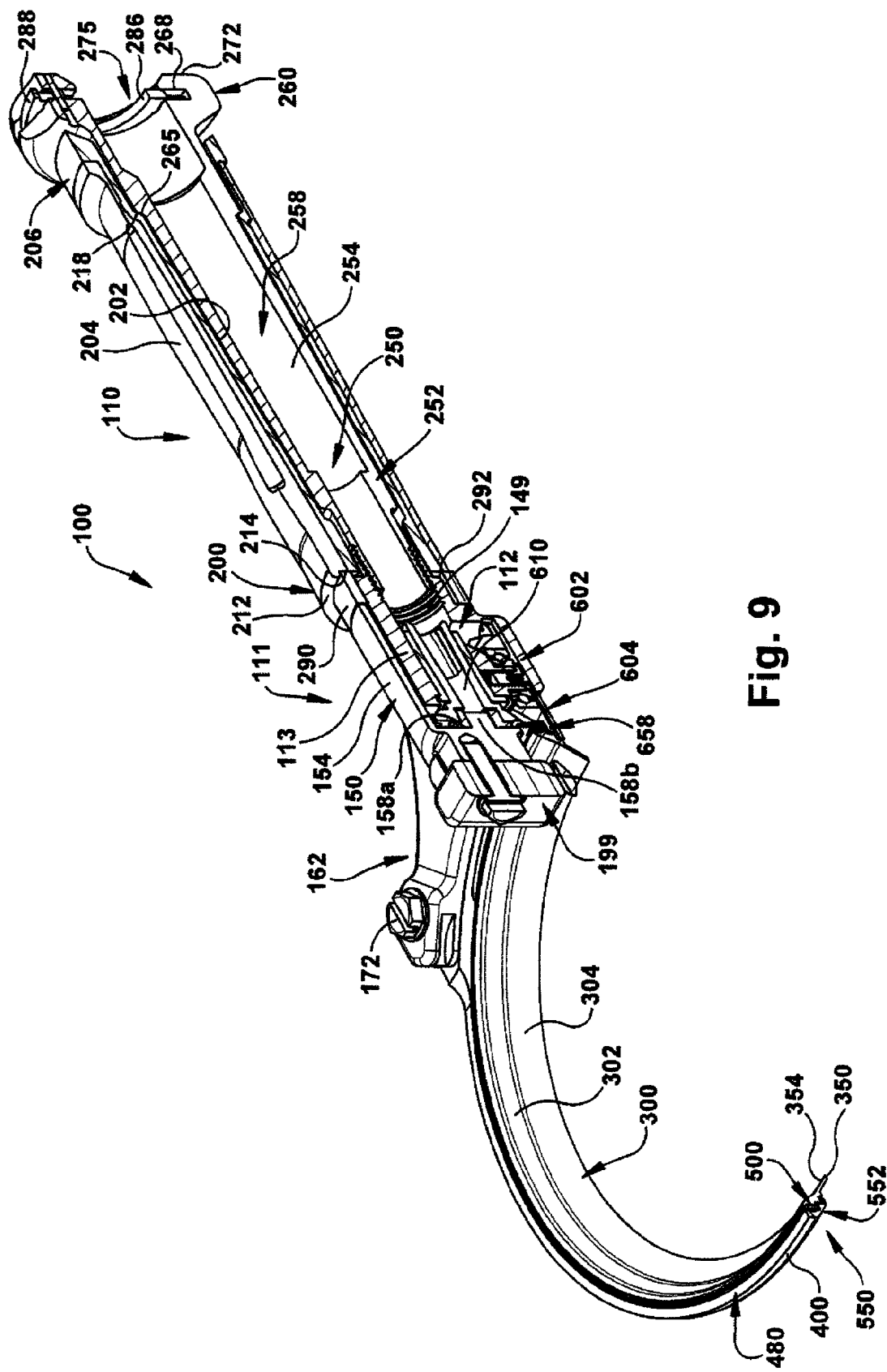
FIG. 9 is a schematic perspective section view along the longitudinal axis of the handle assembly of the power operated rotary knife of FIG. 1, as seen from a plane indicated by the line 8-8 in FIG. 3.

The drive gear 650, in one exemplary embodiment, is a double gear with axially aligned gears including the first bevel gear 652 and the second spur gear 654, both rotating about a drive gear axis of rotation DGR (FIGS. 8 and 8A). The drive gear axis of rotation DGR is substantially orthogonal to and intersects a pinion gear axis of rotation PGR. Further, the drive gear axis of rotation DGR is substantially parallel to the knife blade axis of rotation R. The first gear 652 is a bevel gear and includes a set of bevel gear teeth 653 that mesh with the set of bevel gear teeth 616 of the gear head 614 of the pinion gear 610. As the pinion gear 610 is rotated by the shaft drive assembly 700, the bevel gear teeth 616 of the pinion gear 610, in turn, engage the bevel gear teeth 653 of the first gear 652 to rotate the drive gear 650.

The second gear 654 comprises a spur gear including a set of involute gear teeth 656. The spur gear 654 engages and drives the driven gear 328 of the knife blade 300 to rotate the knife blade about its axis of rotation R. Because the spur gear 654 of the gearbox 602 and the driven gear 328 of the knife blade 300 have axes of rotation DGR, R that are parallel (that is, a spur gear drive) and because the gears 654, 328 comprise an involute gear drive 658, there is less wear of the respective gear teeth 656, 332 than in other gear drives wherein the axes of rotation are not parallel and wherein a non-involute gear drive is used. In one exemplary embodiment, the first gear 652 includes 28 bevel gear teeth and has an outside diameter of approximately 0.92 inch and an inside diameter of approximately 0.66 inch and the second gear 654 includes 58 spur gear teeth and has an outside diameter of approximately 1.25 inches and a root diameter of approximately 1.16 inches.

Figure 39:
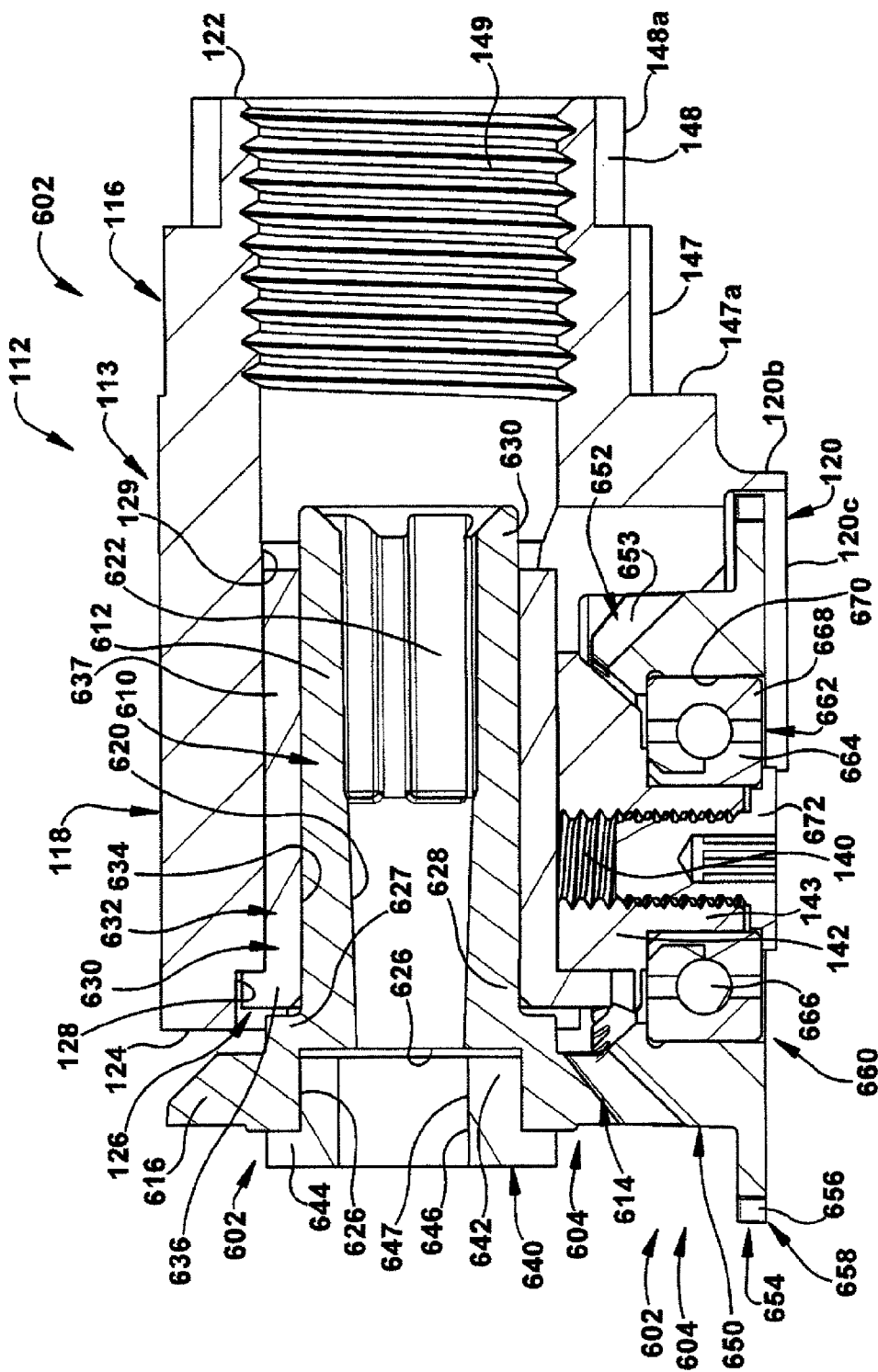
FIG. 39 is a schematic longitudinal section view of the gearbox assembly of FIG. 33, as seen from a plane indicated by the line 39-39 in FIG. 36.

The drive gear 650 is supported for rotation by the bearing support assembly 660 (FIGS. 39-43). The bearing support assembly 660, in one exemplary embodiment, comprises a ball bearing assembly 662 that supports the drive gear 650 for rotation about the drive gear rotational axis DGR. The drive gear bearing support assembly 660 is secured to a downwardly extending projection 142 (FIGS. 47 and 48) of the inverted U-shaped forward section 118 of the gearbox housing 113. As can be seen in FIG. 39, the ball bearing assembly 662 includes a plurality of ball bearings 666 trapped between an inner race 664 and an outer race 668. The outer race 668 is affixed to the drive gear 650 and is received in a central opening 670 of the drive gear 650. The inner race 664 is supported by the fastener 672. A threaded end portion of the fastener 672 and screws into a threaded opening 140 (FIGS. 41 and 47) defined in a stem 143 of the downwardly extending projection 142 of the inverted U-shaped forward section 118 of the gearbox housing 113. The fastener 672 secures the ball bearing assembly 662 to the gearbox housing 113. Alternatively, instead of a ball bearing assembly, the bearing support assembly 660 may comprise one or more sleeve bearings or bushings.

Gearbox Housing 113

As is best seen in FIG. 2C, and 33-44, the gearbox assembly 112 includes the gearbox housing 113 and the gearbox 602. As can best be seen in FIGS. 41-48, the gearbox housing 113 includes a generally cylindrical rearward section 116 (in the rearward direction RW away from the blade housing 400), an inverted U-shaped forward section 118 (in the forward direction FW toward the blade housing 400) and a generally rectangular base section 120 disposed axially below the forward section 118. The gearbox housing 113 includes the gearbox cavity or opening 114 which defines a throughbore 115 extending through the gearbox housing 113 from a rearward end 122 to a forward end 124. The throughbore 115 extends generally along the handle assembly longitudinal axis LA. The inverted U-shaped forward section 118 and the cylindrical rearward section 116 combine to define an upper surface 130 of the gearbox housing 113.

The gearbox housing 113 also includes a generally rectangular shaped base 120 which extends downwardly from the inverted U-shaped forward section 118, i.e., away from the upper surface 130. The rectangular base 120 includes a front wall 120a and a rear wall 120b, as well as a bottom wall 120c and an upper wall 120d, all of which are generally planar. As is best seen in FIGS. 47 and 48, extending radially inwardly into the front wall 120a of the rectangular base 120 are first and second arcuate recesses 120e, 120f. The first arcuate recess 120e is an upper recess, that is, the upper recess 120e is adjacent a bottom portion 141 of the inverted U-shaped forward section 118 and, as best seen in FIG. 43, is offset slightly below the upper wall 120d of the rectangular base 120. The second arcuate recess 120f is a lower recess and extends through the bottom wall 120c of the rectangular base 120.

The bottom portion 141 of the inverted U-shaped forward section 118 includes a downwardly extending projection 142 (FIG. 47). The downwardly extending projection 142 includes a cylindrical stem portion 143 and defines a threaded opening 140 extending through the projection 142. A central axis through the threaded opening 140 defines and is coincident with the axis of rotation DGR of the drive gear 650. The upper and lower arcuate recesses 120e, 120f are centered about the drive gear axis of rotation DGR and the central axis of the threaded opening 140.

The throughbore 115 of the gearbox housing 113 provides a receptacle for the pinion gear 610 and its associated bearing support assembly 630 while the upper and lower arcuate recesses 120e, 120f provide clearance for the drive gear 650 and its associate bearing support assembly 660. Specifically, with regard to the bearing support assembly 630, the cylindrical body 637 of the larger sleeve bushing 632 fits within the cylindrical cavity 129 of the inverted U-shaped forward section 118. The enlarged forward head 636 of the sleeve bushing 632 fits within the forward cavity 126 of the forward section 118. The cylindrical cavity 129 and the forward cavity 126 of the inverted U-shaped forward section 118 are both part of the throughbore 115.

With regard to the upper and lower arcuate recesses 120e, 120f, the upper recess 120e provides clearance for the first bevel gear 652 of the drive gear 650 as the drive gear 650 rotates about its axis of rotation DGR upon the first bevel gear 652 being driven by the pinion gear 610. The wider lower recess 120f provides clearance for the second spur gear 654 of the drive gear 650 as the spur gear 654 coats with the driven gear 328 to rotate the rotary knife blade 300 about its axis of rotation R. As can best be seen in FIGS. 39 and 40, the downwardly extending projection 142 and stem 143 provide seating surfaces for the ball bearing assembly 662, which supports the drive gear 650 for rotation within the rectangular base 120 of the gearbox housing 113. A cleaning port 136 (FIGS. 47 and 48) extends through the bottom portion 141 of inverted U-shaped forward section 118 and a portion of the base 120 of the gearbox housing 113 to allow cleaning fluid flow injected into the throughbore 115 of the gearbox housing 113 from the proximal end 122 of the gearbox housing 113 to flow into the upper and lower arcuate recesses 120e, 120f for purpose of cleaning the drive gear 650.

Figure 40:
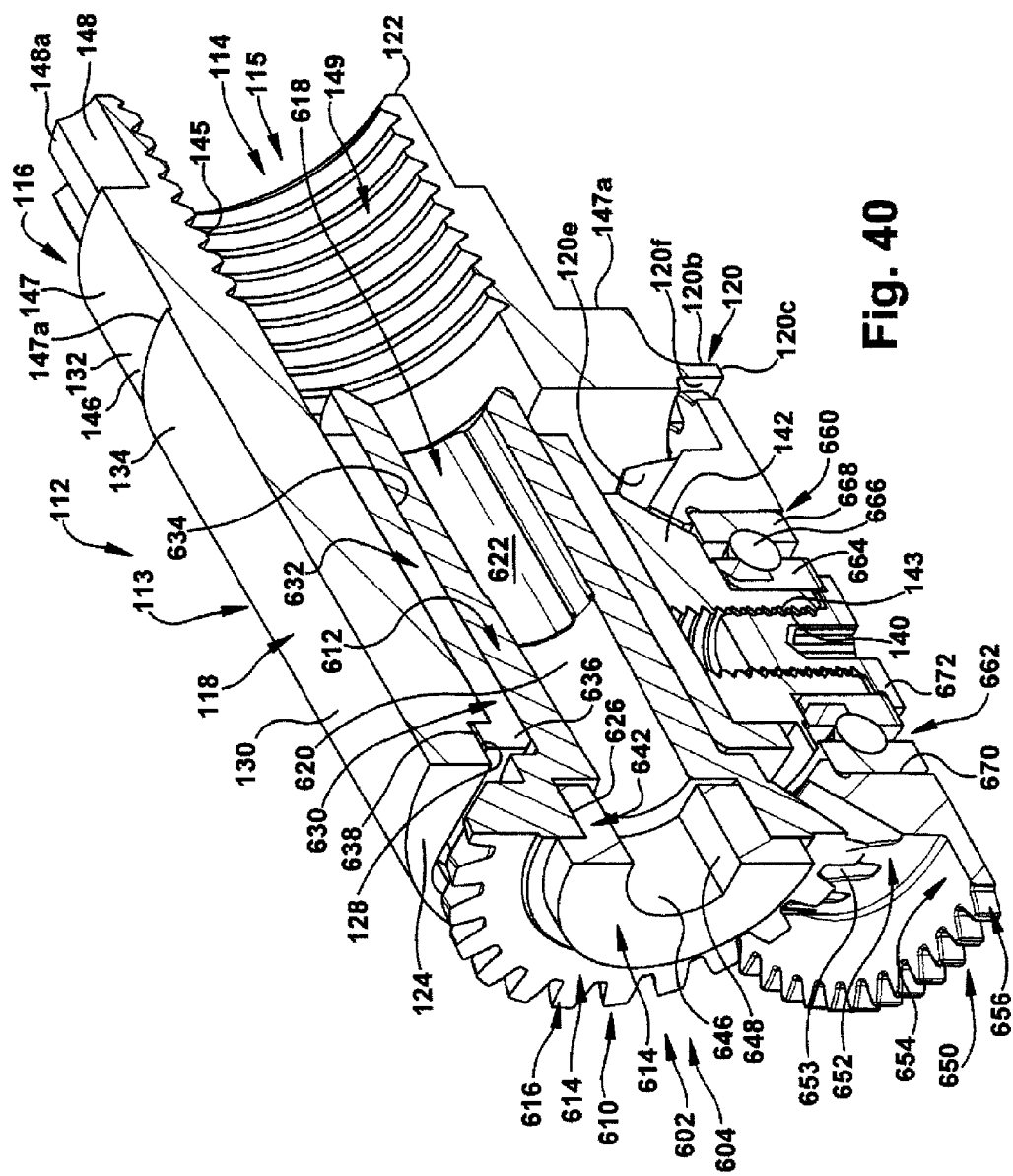
FIG. 40 is a schematic longitudinal perspective section view of the gearbox assembly of FIG. 33, as seen from a plane indicated by the line 39-39 in FIG. 36.

As can be seen in FIGS. 39 and 40, an inner surface 145 of the cylindrical rearward section 116 of the gearbox housing 113 defines a threaded region 149, adjacent the proximal end 122 of the gearbox housing 113. The threaded region 149 of the gearbox housing 113 receives a mating threaded portion 262 (FIG. 2B) of the elongated central core 252 of the hand piece retaining assembly 250 to secure the hand piece 200 to the gearbox housing 113. As seen in FIGS. 38-44, an outer surface 146 of the cylindrical rearward section 116 of the gearbox housing 113 defines a first portion 148 adjacent the proximal end 122 and a second larger diameter portion 147 disposed forward or in a forward direction FW of the first portion 148. The first portion 148 of the outer surface 146 of the cylindrical rearward portion 116 of the gearbox housing 113 includes a plurality of axially extending splines 148a. The plurality of splines 148a accept and interfit with four ribs 216 (FIG. 2B) formed on an inner surface 201 of a distal end portion 210 of the hand piece 200. The coacting plurality of splines 148a of the gearbox housing 113 and the four ribs 216 of the hand piece 200 allow the hand piece 200 to be oriented at any desired rotational position with respect to the gearbox housing 113.

The second larger diameter portion 147 of the outer surface 146 of the cylindrical rearward section 116 of the gearbox housing 113 is configured to receive a spacer ring 290 (FIG. 2B) of the hand piece retaining assembly 250. As can be seen in FIG. 8A, the spacer ring 290 abuts and bears against a stepped shoulder 147a defined between the cylindrical rearward section 116 and the inverted U-shaped forward section 118 of the gearbox housing 113. That is, an upper portion 134 of the inverted U-shaped forward section 118 is slightly radially above a corresponding upper portion 132 of the cylindrical rearward section 116 of the gearbox housing 113. A rear or proximal surface 292 (FIG. 2B) of the spacer ring 290 acts as a stop for an axially stepped collar 214 of the distal end portion 210 of the hand piece 200 when the hand piece 200 is secured to the gearbox housing 113 by the elongated central core 252 of the hand piece retaining assembly 250.

The second larger diameter portion 147 of the outer surface 146 also includes a plurality of splines (seen in FIGS. 41 and 46). The plurality of splines of the second portion 147 are used in connection with an optional thumb support (not shown) that may be used in place of the spacer ring 290. The thumb support provides an angled, outwardly extending support surface for the operator's thumb. The plurality of splines of the second portion 149 are utilized in connection with the optional thumb support to allow the operator to select a desired rotational orientation of the thumb support with respect to the gearbox housing 113 just as the plurality of splines 148a of the first portion 148 allow the operator to select a desired rotational orientation of the hand piece 200 with respect to the gearbox housing 113.

Frame Body 150

Also part of the head assembly 111 is the frame or frame body 150, best seen in FIGS. 45 and 49-52. The frame body 150 receives and removably supports both the gearbox assembly 112 and the blade-blade housing combination 550. In this way, the frame body 150 releasably and operatively couples the gearbox assembly 112 to the blade-blade housing combination 550 such that the gear train 604 of the gearbox assembly 112 operatively engages the driven gear 328 of the rotary knife blade 300 to rotate the knife blade 300 with respect to the blade housing 400 about the axis of rotation R.

The frame body 150 includes the arcuate mounting pedestal 152 disposed at a forward portion 151 (FIG. 2C) of the frame 150, the central cylindrical region 154, and a rectangular base 180 (FIG. 48) disposed below the central cylindrical region 154. The arcuate mounting pedestal 152 of the frame body defines the seating region 152a (FIGS. 22C and 51) to receive the mounting section 402 of the blade housing 400 and secure the blade-blade housing combination 550 to the frame body 150. The central cylindrical region 154 and the rectangular base 180 of the frame body 150 define a cavity 155 (FIGS. 45 and 49) which slidably receives the gearbox housing 113. The frame body cavity 155 is comprised of an upper socket 156 defined by the central cylindrical region 154 and a lower horizontally extending opening 190 defined by and extending through the central rectangular base 180.

Figure 49:
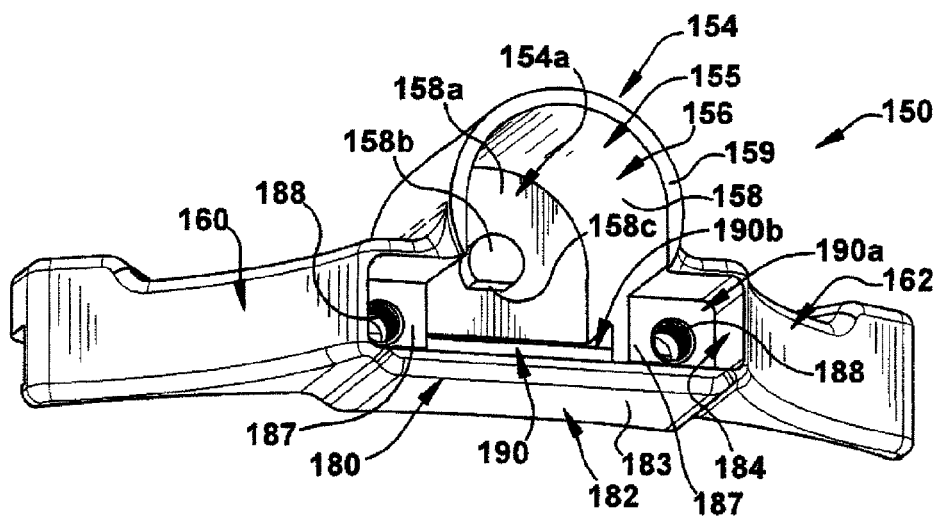
FIG. 49 is a schematic rear perspective view of the frame body of the head assembly of the power operated rotary knife of FIG. 1.
Figure 50:
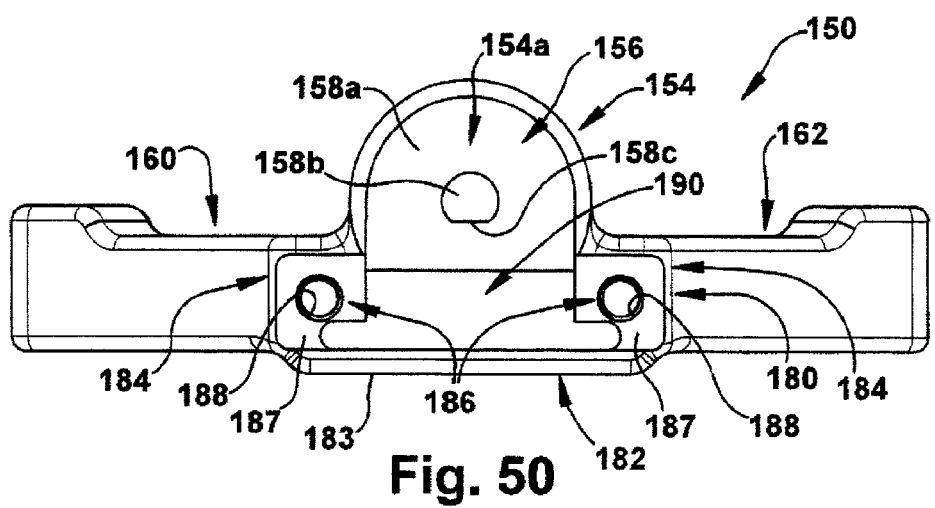
FIG. 50 is a schematic rear elevation view of the frame body of FIG. 49.
Figure 51:
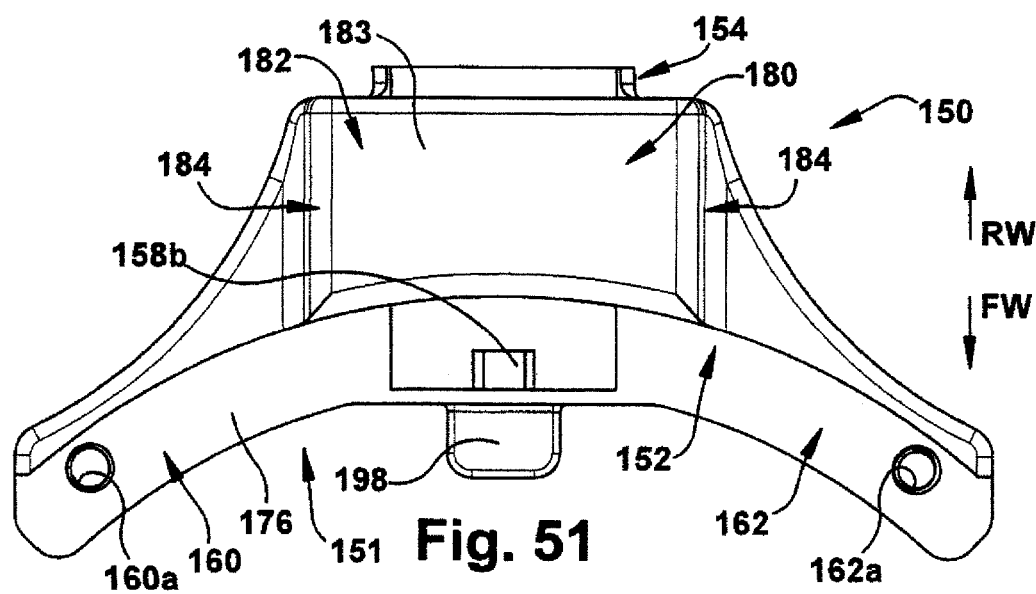
FIG. 51 is a schematic bottom plan view of the frame body of FIG. 49.
Figure 52:
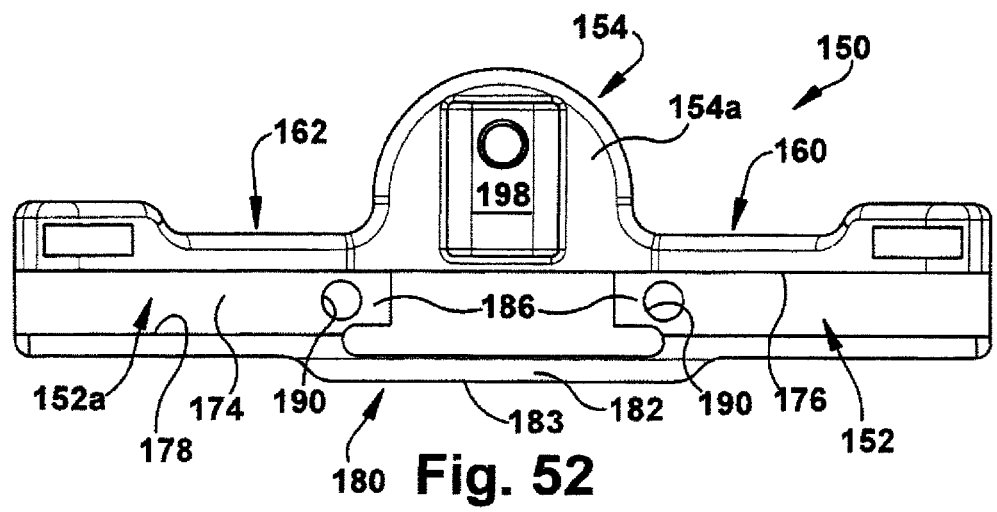
FIG. 52 is a schematic front elevation view of the frame body of FIG. 49.

The central rectangular base 180 of the frame body 150 includes a bottom wall 182 and a pair of side walls 184 that extend upwardly from the bottom wall 182. As is best seen in FIGS. 49 and 50, a pair of bosses 186 extends inwardly from the pair of side walls 184. Rearward facing surfaces 187 of the pair of bosses 186 each include a threaded opening 188. The lower horizontally extending opening 190 defined by the rectangular base 180 includes two parts: a generally rectangular portion 190a extending rearwardly from the pair of boss surfaces 187; and a forward portion 190b that extends through the rectangular base 180 to the seating region 152a of the frame body 150.

To secure the gearbox assembly 112 to the frame body 150, the gearbox assembly 112 is aligned with and moved toward a proximal end 157 of the frame body 150. As can best be seen in FIG. 45, the socket 156 defined by the central cylindrical region 154 of the frame body 150 is configured to slidably receive the inverted U-shaped forward section of the gearbox housing 113 and the rectangular portion 190a of the horizontally extending opening 190 of the rectangular base 180 is configured to slidably receive the rectangular base 120 of the gearbox housing 113. The upper surface 130 of the gearbox housing 113 is slidably received within the inner surface 158 of the central cylindrical region 154 of the frame body 150.

When the gearbox assembly 112 is fully inserted into the frame body 150, the front wall 120a of the base 120 of the gearbox housing 113 abuts the rearward facing surfaces 187 of the pair of bosses 186 of the rectangular base 180 of the frame body 150. Further, the horizontally extending openings 121 of the gearbox housing base 120 are aligned with the horizontally extending threaded openings 188 of the pair of bosses 186 of the frame body rectangular base 180. A pair of threaded fasteners 192 (FIG. 45) pass through the openings 121 of the gearbox housing base 120 and thread into the threaded openings 188 of the pair of bosses 186 of the frame body rectangular base 180 to releasably secure the gearbox assembly 112 to the frame body 150. The openings 121 of the gearbox housing base 180 are partially threaded to prevent the fasteners 192 from fall out of the openings 121 when the gearbox housing 113 is not coupled to the frame body 150.

The openings 121 of the gearbox housing base 120 include countersunk end portions 121a (FIG. 45) to receive the enlarged heads of the pair of threaded fasteners 192 such that the enlarged heads of the fasteners 192, when tightened into the frame body 150, are flush with the rear wall 120b of the base 120. The threaded fasteners 192 include narrow body portions relative to the enlarged heads and larger diameter threaded portions such that the fasteners 192 remain captured within their respective gearbox housing openings 121 when the gearbox housing 113 is not coupled to the frame body 150. Relative movement between the gearbox assembly 112 and the frame body 150 is constrained by the threaded interconnection of the gearbox housing 113 to the frame body 150 via the threaded fasteners 192 and the abutting surfaces of the rectangular base 120 of the gearbox housing 113 and the rectangular base 180 of the frame body 150.

Additionally, the frame body 150 releasably receives the blade-blade housing combination 550 and thereby operatively couples the blade-blade housing combination 550 to the gearbox assembly 112. As can best be seen in FIGS. 51 and 52, the pair of arcuate arms 160, 162 of the frame body 150 defines the arcuate mounting pedestal 152. The mounting pedestal 152, in turn, defines the seating region 152a that releasably receives the mounting section 402 of the blade housing 400. Specifically, the arcuate mounting pedestal 152 includes an inner wall 174, an upper wall 176 extending radially in the forward direction FW from an upper end of the inner wall 174, and a lower wall or ledge 178 extending radially in a forward direction FW from a lower end of the inner wall 174.

When the blade housing mounting section 402 is properly aligned and moved into engagement with the frame body arcuate mounting pedestal 152: 1) the outer wall 406 of the blade housing mounting section 402 bears against the mounting pedestal inner wall 174 of the frame body 150; 2) the first upper end 408 of the blade housing mounting section 402 bears against the mounting pedestal upper wall 176 of the frame body 150; and 3) a radially inwardly stepped portion 406a of the outer wall 406 of the blade housing mounting section 402 bears against an upper face and a forward face of the radially outwardly projecting mounting pedestal lower wall or ledge 178 of the frame body 150.

The respective threaded fasteners 170, 172 of the frame body 150 are threaded into the threaded openings 420a, 422a of the mounting inserts 420, 422 of the blade housing mounting section 402 to secure the combination blade-blade housing 550 to the frame body 150. Assuming that the gearbox assembly 112 is coupled to the frame body 150, when the blade-blade housing combination 550 is secured to the frame body 150, the second spur gear 654 of the drive gear 650 of the gearbox assembly 112 engages and meshes with the driven gear 328 of the rotary knife blade 300 of the blade-blade housing combination 550. Thus, when the gearbox assembly 112 and the blade-blade housing combination 550 are secured to the frame body 150, the gear train 604 of the gearbox assembly 112 is operatively engaged with the driven gear 328 of the rotary knife blade 300 to rotatably drive the blade 300 within the blade housing 400 about the blade axis of rotation R. Like the threaded fasteners 192 of the gearbox housing 113 that secure the gearbox housing 113 to the frame body 150, the threaded fasteners 170, 172 of the frame body 150 include narrow bodies and larger diameter threaded portions such that the fasteners remain captured in the partially threaded openings 160a, 162a of the arcuate arms 160, 162.

To remove the combination blade-blade housing 550 from the frame body 150, the pair of threaded fasteners 170, 172 of the frame body 150 are unthreaded from the threaded openings 420a, 420b of the blade housing mounting inserts 420, 422. Then, the blade-blade housing combination 550 is moved is the forward direction FW with respect to the frame body 150 to disengage the blade-blade housing combination 550 from the head assembly 111.

A forward wall 154a of the central cylindrical region 154 of the frame body 150 includes a projection 198 that supports a steeling assembly 199 (FIG. 2C). The steeling assembly 199 includes a support body 199a, spring biased actuator 199b, and a push rod 199c with a steeling member 199d affixed to a bottom of the push rod 199c. The steeling assembly support body 199a is affixed to the projection 198. When the actuator 199b is depressed by the operator, the push rod 199c moves downwardly and the steeling member 199d engages the blade edge 350 of the knife blade 300 to straighten the blade edge 350.

Hand Piece 200 and Hand Piece Retaining Assembly 250

The handle assembly 110 includes the hand piece 200 and the hand piece retaining assembly 250. As can be seen in FIG. 2B, the hand piece 200 includes the inner surface 201 and the outer gripping surface 204. The inner surface 201 of the hand piece 200 defines the axially extending central opening or throughbore 202. The outer gripping surface 204 of the hand piece 200 extends between an enlarged proximal end portion 206 and the distal end portion 210. A front face or wall 212 of the hand piece 200 includes an axially stepped collar 214 that is spaced rearwardly and serves an abutment surface for a spacer ring 290 of the hand piece retaining assembly 250. The inner surface 201 of the hand piece 200 defines the four ribs 216, as previously described, which permit the hand piece 200 to be oriented in any desired rotational position with respect to the gearbox housing 113. A slotted radial opening 220 in the front face 212 of the hand piece 200 receives an optional actuation lever (not shown). The optional actuation lever, if used, allows the operator to actuate the power operated rotary knife 100 by pivoting the lever toward the gripping surface 204 thereby engaging the drive mechanism 600 to rotatably drive the rotary knife blade 300.

The hand piece retaining assembly 250, best seen in FIGS. 2 and 2B, releasably secures the hand piece 200 to the gearbox housing 113. The hand piece retaining assembly 250 includes the elongated central core 252 which extends through the central opening 202 of the hand piece 200. The elongated core 252 threads into the threaded opening 149 (FIG. 48) at the proximal or rearward end 122 of the gearbox housing 113 to secure the hand piece 200 to the gearbox housing 113.

The hand piece retaining assembly 250 also includes the spacer ring 290 (FIG. 2B). When the hand piece 200 is being secured to the gearbox housing 113, the spacer ring 290 is positioned on the second cylindrical portion 147 (FIG. 48) of the outer surface 146 of the cylindrical rearward section 116 of the gearbox housing 113. The spacer ring 290 is positioned to abut the stepped shoulder 147a defined between the larger second portion 147 of the outer surface 146 of the cylindrical rearward portion 116 and the inverted U-shaped forward section 118 of the gearbox housing 113. When the hand piece 200 is secured to the gearbox housing 113 by the elongated central core 252, the spacer ring 290 is sandwiched between the hand piece 200 and the stepped shoulder 147a of the gearbox housing 113.

As can best be seen in FIGS. 2B and 8, the elongated central core 252 of the hand piece retaining assembly 250 includes an inner surface 254 and an outer surface 256 extending between a distal or forward reduced diameter end portion 264 and the enlarged proximal or rearward end portion 260. The inner surface 254 of the elongated central core 252 defines a throughbore 258 extending along the longitudinal axis LA of the handle assembly 110. The elongated central core 252 also includes a threaded portion 262 on the outer surface 256 at the forward reduced diameter end portion 264. The outer surface 256 of the elongated core 252 includes a radially outwardly stepped shoulder 265.

When the elongated central core 252 is inserted through the central throughbore 202 and the threaded portion 262 of the core 252 is threaded into the threaded opening 149 of the gearbox housing 113, the hand piece 200 is secured to the gearbox housing 113. Specifically, the hand piece 200 is prevented from moving in the forward axial direction FW along the handle assembly longitudinal axis LA by the spacer ring 290. The rear surface 292 of the spacer ring 290 acts as a stop for the axially stepped collar 214 of the distal end portion 210 of the hand piece 200 to prevent movement of the hand piece 200 in the forward direction FW. The hand piece 200 is prevented by moving in the rearward axial direction RW along the handle assembly longitudinal axis LA by the radially outwardly stepped shoulder 265 of the elongated central core 252.

As can be seen in FIG. 8, the stepped shoulder 265 of the elongated central core 252 bears against a corresponding inwardly stepped shoulder 218 of the hand piece 200 to prevent movement of the hand piece 200 in the rearward direction RW. As mentioned previously, the spacer ring 290 may be replaced by an optional operator thumb support. Additionally, a strap attachment bracket (not shown) may be disposed between the spacer ring 290 and the gearbox housing 113. The strap attachment bracket, if used, provides an attachment point for an optional operator wrist strap (not shown).

Drive Shaft Latching Assembly 275

The elongated central core 252 of the hand piece retaining assembly 250 includes the enlarged rearward or proximal end portion 260. The enlarged end portion 260 supports a drive shaft latching assembly 275 which engages a first coupling 710 (FIGS. 1 and 53) of an outer sheath 704 of the shaft drive assembly 700 to secure the outer sheath 704 of the shaft drive assembly 700 to the handle assembly 110 and thereby ensures operative engagement of a first male fitting 714 of the inner drive shaft 702 within the female socket 622 of the pinion gear input shaft 612. The inner surface 254 of the elongated central core 252 also includes an inwardly stepped shoulder 266 (FIG. 8) that provides a stop for a distal portion 711 of the first coupling 710 of the shaft drive assembly 700.

Figure 6:
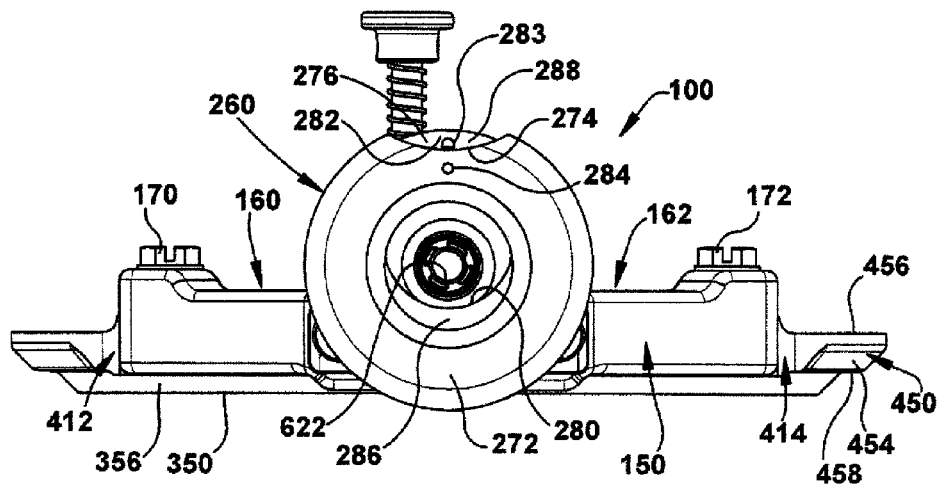
FIG. 6 is a schematic rear elevation view of the power operated rotary knife of FIG. 1.

As is best seen in FIG. 2B, the enlarged rearward end portion 260 of the elongated central core 252 of the hand piece retaining assembly 250 defines a generally U-shaped slot 268 that extends partially through the end portion 260 in a direction orthogonal to the longitudinal axis LA of the handle assembly 110. The rearward end portion 260 also defines a central opening 270 (FIG. 8) that is aligned with and part of the throughbore 258 of the elongated central core 252. The central opening 270 ends at the inwardly stepped shoulder 266. An end wall 272 of the rearward end portion 260 of the elongated central core 252 includes a peripheral cut-out 274. The peripheral cut-out 274 is best seen in FIGS. 2, 2B and 6.

Disposed in the U-shaped slot 268 of the elongated central core 252 is the drive shaft latching assembly 275 (best seen in schematic exploded view in FIG. 2B) that releasably latches or couples the shaft drive assembly 700 to the handle assembly 110. The drive shaft latching assembly 275 includes a flat latch 276 and a pair of biasing springs 278 inserted in the slot 268. The flat latch 276 of the drive shaft latching assembly 275 includes a central opening 280 that is substantially equal to the size of the opening 270 of the enlarged end portion 260 of the elongated central core 252.

The latch 276 is movable between two positions in a direction orthogonal to the longitudinal axis LA of the handle assembly 110: 1) a first, locking position wherein the opening 280 of the latch 276 is offset from the opening 270 defined by the enlarged end portion 260 of the elongated central core 252; and 2) a second release position wherein the opening 280 of the latch 276 is aligned with the opening 270 defined by the enlarged end portion 260 of the elongated central core 252. The biasing springs 278, which are trapped between peripheral recesses 281 in a bottom portion 282 of the latch 276 and the enlarged end portion 260 of the elongated central core 252, bias the latch 276 to the first, locking position.

When the latch 276 is in the first, locking position a lower portion 286 of the latch 276 adjacent the latch opening 280 extends into the opening 270 of the enlarged end portion 260 of the core 252. This can be seen schematically, for example in FIG. 6. Movement of the latch 276 with respect to the enlarged end portion 260 is limited by the engagement of a holding pin 284 extending through a radially extending channel 283 formed in the latch 276. The holding pin 284 bridges the U-shaped slot 268 of the enlarged end portion 260 and extends through the channel 283. The channel 283 constrains and limits an extent of the radial movement of the latch 276 with respect to the enlarged end portion 260 of the elongated central core 252.

Drive Mechanism 600

Figure 53:
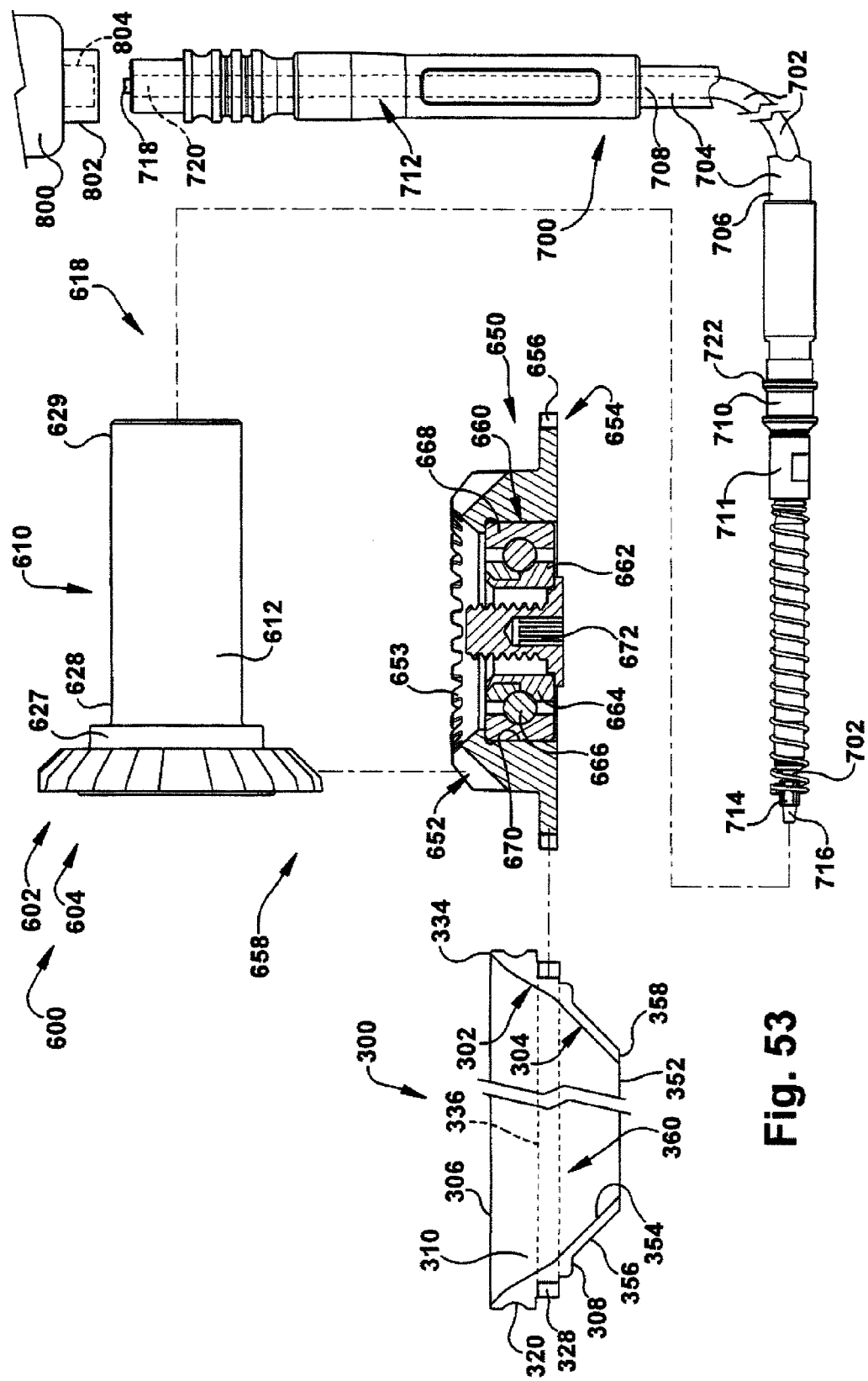
FIG. 53 is a schematic exploded side elevation view of the drive mechanism of the power operated rotary knife of FIG. 1 extending from a drive motor external to the power operated rotary knife to the rotary knife blade of the power operated rotary knife.

As can best be seen in the schematic depiction of FIG. 53, the knife blade 300 is rotatably driven in the blade housing 400 by the drive mechanism 600. Within the power operated rotary knife 100, the drive mechanism 600 includes the gearbox 602 supported by the gearbox housing 113. The gearbox 602, in turn, is driven by the flexible shaft drive assembly 700 and the drive motor 800 that are operatively coupled to the gearbox 602. The flexible shaft drive assembly 700 is coupled to the handle assembly 110 by the drive shaft latching assembly 275. A portion of the flexible shaft drive assembly 700 extends through the elongated central core 252 of the hand piece retaining assembly 250 and engages the pinion gear 610 to rotate the pinion gear about its axis of rotation PGR and thereby rotate the rotary knife blade 300 about its axis of rotation R.

As can best be seen in FIGS. 1 and 53, the drive mechanism 600 includes the flexible shaft drive assembly 700 and the drive motor 800. The shaft drive assembly 700 includes an inner drive shaft 702 and an outer sheath 704, the inner drive shaft 702 being rotatable with respect to the outer sheath 704. Affixed to one end 706 of the outer sheath 704 is the first coupling 710 that is adapted to be releasably secured to the enlarged rearward end portion 260 of the elongated central core 252 of the hand piece retaining assembly 250. Affixed to an opposite end 708 of the outer sheath 704 is a second coupling 712 that is adapted to be releasably secured to a mating coupling 802 of the drive motor 800.

When the first coupling 710 of the shaft drive assembly 700 is affixed to the hand piece 200, the first male drive fitting 714 disposed at one end 716 of the inner drive shaft 702 engages the female socket or fitting 622 of the pinion gear input shaft 612 to rotate the pinion gear 610 about the pinion gear axis of rotation PGR. The rotation of the pinion gear 610 rotates the drive gear 650 which, in turn, rotates the rotary knife blade 300 about it axis of rotation R. When the second coupling 712 of the shaft drive assembly 700 is received by and affixed to the drive motor coupling 802, a second drive fitting 718 disposed at an opposite end 720 of the inner drive shaft 702 engages a mating socket or fitting 804 (shown in dashed line in FIG. 53) of the drive motor 800. Engagement of the second drive fitting 718 of the inner drive shaft 702 and the drive motor fitting 804 provides for rotation of the inner drive shaft 702 by the drive motor 800.

In the first, locking position of the latch 276 of the drive shaft latching assembly 275, the lower portion 286 of the latch 276 extending into the opening 270 of the enlarged end portion 260 of the elongated central core 252 engages the first coupling 710 of the shaft drive assembly 700 to secure the shaft drive assembly 700 to the handle assembly 110 and insure the mating engagement of the first male drive coupling 714 of the drive shaft 702 to the female socket or fitting 622 of the pinion gear input shaft 612. In the second, release position, the latch 276 is moved radially such that the opening 280 of the latch 276 is aligned with and coextensive with the opening 270 of the enlarged end portion 260 of the elongated central core 252 thus allowing for removal of the first coupling 710 of the shaft drive assembly 700 from the hand piece 200.

The drive motor 800 provides the motive power for rotating the knife blade 300 with respect the blade housing 400 about the axis of rotation R via a drive transmission that includes the inner drive shaft 702 of the drive shaft assembly 700 and the gear train 604 of the gear box 602. The drive motor 800 may be an electric motor or a pneumatic motor.

Alternately, the shaft drive assembly 700 may be eliminated and the gear train 604 of the gearbox 602 may be directly driven by an air/pneumatic motor or an electric motor disposed in the throughbore 258 of the elongated central core 252 of the hand piece retaining assembly 250 or in the throughbore 202 of the hand piece 200, if a different hand piece retaining structure is used. A suitable air/pneumatic motor sized to fit within a hand piece of a power operated rotary knife is disclosed in U.S. non-provisional patent application Ser. No. 13/073,207, filed Mar. 28, 2011, entitled "Power Operated Rotary Knife With Disposable Blade Support Assembly", inventors Jeffrey Alan Whited, David Curtis Ross, Dennis R. Seguin, Jr., and Geoffrey D. Rapp. Non-provisional patent application Ser. No. 13/073,207 is incorporated herein in its entirety by reference.

Securing Shaft Drive Assembly 700 to Handle Assembly 110

To secure the shaft drive assembly 700 to the hand piece 200, the operator axially aligns the first coupling 710 of the drive shaft assembly 700 along the longitudinal axis LA of the handle assembly 110 adjacent the opening 270 defined by the enlarged end portion 260 of the elongated central core 252 of the hand piece retaining assembly 250. The operator positions his or her thumb on the portion 288 of the latch 276 accessible through the peripheral cut-out 274 of the enlarged end portion 260 and slides the latch 276 radially inwardly to the second, release position. When the latch 276 is in the release position, the operator moves a forward portion 711 (FIG. 53) of the first coupling 710 into the throughbore 258 of the elongated central core 252.

After the forward portion 711 of the first coupling 710 is a received in the elongated central core 252 of the hand piece retaining assembly 250, the operator then releases the latch 276 and continues to move the first coupling 710 further into the throughbore 258 of the central core 252 until the latch 276 (which is biased radially outwardly by the biasing springs 278) snap fits into a radial securement groove 722 formed in an outer surface of the first coupling 710 of the shaft drive assembly 700. When the latch 276 extends into the securement groove 722 of the first coupling 710, the first coupling 710 is secured to the handle assembly elongated central core 252 and the first male drive fitting 714 of the inner drive shaft 702 is in operative engagement with the female socket or fitting 622 of the pinion gear input shaft 612.

To release the shaft drive assembly 700 from the handle assembly elongated central core 252, the operator positions his or her thumb on the portion 288 of the latch 276 accessible through the peripheral cut-out 274 of the enlarged end portion 260 of the elongated central core 252 and slides the latch 276 radially inwardly to the second, release position. This action disengages the latch 276 from the securement groove 722 of the first coupling 710 of the drive shaft assembly 700. At the same time, the operator moves the first coupling 710 in the axial rearward direction RW out of the throughbore 258 of the elongated central core 252 and away from the handle assembly 110. This will result in the first male drive fitting 714 of the drive shaft 702 being disengaged from the female fitting 622 of the pinion gear input shaft 612.

Rotary Knife Blade Styles

As previously mentioned, depending on the cutting or trimming task to be performed, different sizes and styles of rotary knife blades may be utilized in the power operated rotary knife 100 of the present disclosure. Also, as previously mentioned, rotary knife blades in various diameters are typically offered ranging in size from around 1.2 inches in diameter to over 7 inches in diameter. Selection of a blade diameter will depend on the task or tasks being performed. Additionally, different styles or configurations of rotary knife blades are also offered. For example, the style of the rotary knife blade 300 schematically depicted in FIGS. 1-53 and discussed above is sometimes referred to as a "flat blade" style rotary knife blade. The term "flat" refers to the profile of the blade section 304 and, in particular, to a cutting angle CA (FIG. 24) of the blade section 304 with respect to a plane CEP that is congruent with a cutting edge 350 of the blade 300. The angle CA of the blade section 304 with respect to the cutting edge plane CEP is relatively large. As can be seen in FIG. 24, the cutting angle CA, that is, the angle between the blade section 304 and the plane CEP, as measured with respect to the blade section inner wall 354 is an obtuse angle, greater than 90°. This large, obtuse cutting angle CA is referred to as a "shallow" blade cutting profile. As can be seen in FIG. 55, the inner wall 360 is generally smooth, frustoconical shape. As the product P is being trimmed or cut by the flat blade 300, the cut material layer CL moves easily along the inner wall 360 the flat blade 300. The flat blade 300 is particularly useful for trimming thicker layers of material from a product, e.g., trimming a thicker layer of fat or meat tissue from a piece of meat, as the power operated rotary knife 100 is moved over the product in a sweeping motion. This is true because even thicker layers of cut or trimmed material will flow with minimal drag or friction over the inner wall 360 of the flat blade 300.

Figure 56:
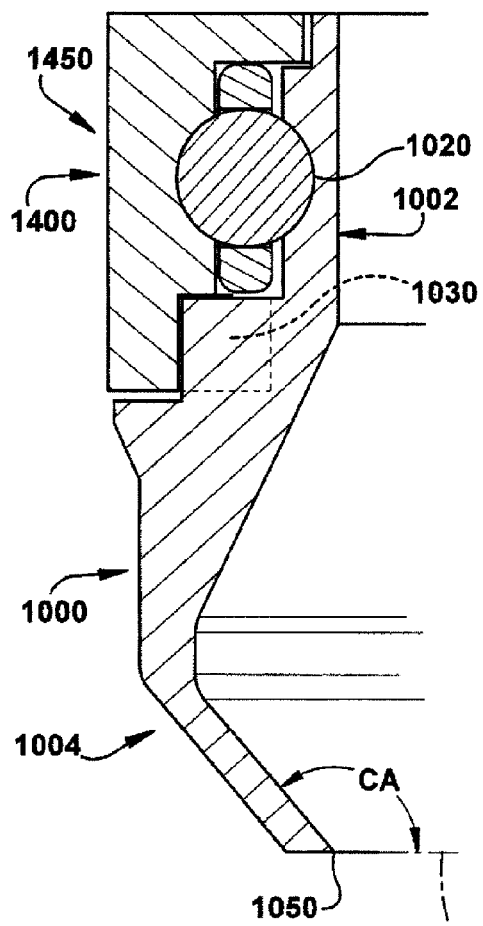
FIG. 56 is a schematic section view of a "hook blade" style rotary knife blade and associated blade housing adapted to be used in the power operated rotary knife of FIG. 1.

Another blade profile is shown in the "hook blade" style rotary knife blade which is schematically depicted at 1000 in FIG. 56. Here the cutting angle CA with respect to the plane CEP defined by the cutting edge 1050, may be about the same or slightly larger or smaller than the cutting angle CA of the rotary knife blade 300 (see FIG. 24). However, the inner profile of the hook blade 1000 is less planar and more V-shaped that the inner profile of the flat blade 300. That is, as the inner surface of the blade curves radially inwardly as one moves from the blade section 1004 to the body section 1002. This inward curvature of the inner surface of the hook blade 1000 results in a less smooth and more curved path of travel for cut or trimmed material, as compared with the flat blade 300. Thus, the hook blade 1000 is particularly useful for trimming relatively thin layers of material from a product, for example, trimming a thin layer of fat or meat tissue from a relatively planar, large piece of meat, as the power operated rotary knife 100 is moved over the product in a sweeping motion. For trimming thicker layers of material from a product, the hook blade 1000 would not be as efficient because the curved path of travel of the cut or trimmed material layer would result in the power operated rotary knife 100 experiencing more drag and resistance during cutting or trimming. Thus, more effort would be required by the operator to move and manipulate the power operated rotary knife 100 to make the desired cuts or trims.

As can also be seen, the shape of the rotary knife blade body 1002 is also different than the body 302 of the flat rotary knife blade 300. Accordingly, the shape of a blade support section 1450 of a blade housing 1400 is also modified accordingly from the shape of the blade support section 450 of the blade housing 400 when used in the power operated rotary knife 100. That is, the shape of a particular rotary knife blade selected to be used in the power operated rotary knife 100 will sometimes require modification of the associated blade housing for the power operated rotary knife 100. However, the blade-blade housing bearing structure 500 and gear train 604, as discussed above, are utilized to support and drive the blade 1000. Additionally, as discussed above, the driven gear 1030 of the knife blade 1000 is spaced axially below the bearing race 1020.

Figure 57:
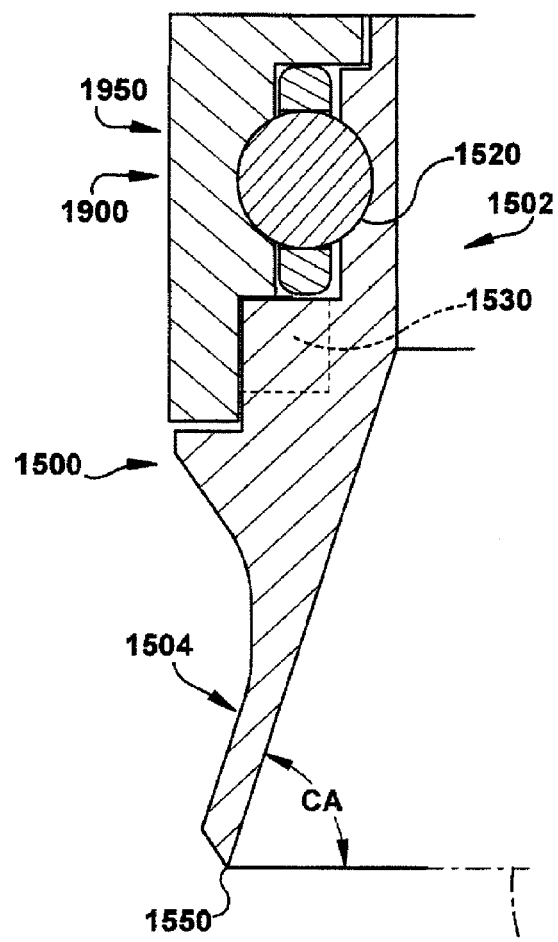
FIG. 57 is a schematic section view of a "straight blade" style rotary knife blade and associated blade housing adapted to be used in the power operated rotary knife of FIG. 1.

A more aggressive blade profile is shown in the "straight blade" style rotary knife blade which is schematically depicted at 1500 in FIG. 57. The cutting angle CA is smaller than the cutting angles of the rotary knife blades 300 and 1000. Indeed, the cutting angle CA of the knife blade 1500 is an acute angle of less than 90° with respect to the plane CEP defined by the cutting edge 1550. The cutting angle CA of the straight blade 1500 is very "steep" and more aggressive than the flat blade 300 or the hook blade 1000. A straight blade is particularly useful when make deep or plunge cuts into a product, i.e., making a deep cut into a meat product for the purpose of removing connective tissue/gristle adjacent a bone.

As can also be seen, the shape of the knife blade body 1502 is also different than the body 302 of the flat rotary knife blade 300. Accordingly, the shape of a blade support section 1950 of a blade housing 1900 is also modified accordingly from the shape of the blade support section 450 of the blade housing 400 when used in the power operated rotary knife 100. However, the blade-blade housing bearing structure 500 and gear train 604, as discussed above, are utilized to support and drive the blade 1000. Additionally, as discussed above, the driven gear 1530 of the knife blade 1500 is spaced axially below the bearing race 1520.

Other rotary knife blades styles, configurations, and sizes exist and may also be used with the power operated rotary knife 100. The blade-blade housing structure 500 of the present disclosure and the other features, characteristics and attributes, as described above, of the power operated rotary knife 100 may be used with a variety of rotary knife blades styles, configurations, and sizes and corresponding blade housings. The examples recited above are typical blade styles (flat, hook, and straight), but numerous other blade styles and combination of blade styles may be utilized, with an appropriate blade housing, in the power operated rotary knife 100 of the present disclosure, as would be understood by one of skill in the art. It is the intent of the present application to cover all such rotary knife blade styles and sizes, together with the corresponding blade housings, that may be used in the power operated rotary knife 100.

Second Exemplary Embodiment

Elongated Rolling Bearing Strip 2502

A second exemplary embodiment of a blade-blade housing bearing structure 2500 comprises an elongated rolling bearing strip, as shown generally at 2502 in FIGS. 59-71. The elongated rolling bearing strip 2502 of the present disclosure is suitable for use in the power operated rotary knife 100 in place of elongated rolling bearing strip 502 of the blade-blade housing bearing structure 500. Unlike the rolling bearing strip 502, the rolling bearing strip 2502 includes interlocking ends or end portions 2562 which allows the rolling bearing strip to be configured in a locked condition within the annular bearing passageway 504 defined by the opposing, facing bearing surfaces 319, 459 of the rotary knife blade 300 and blade housing 400. When in a locked condition (FIGS. 67-71), the elongated rolling bearing strip 2502 defines an annular, continuous rolling bearing ring 2560 within the bearing passageway or bearing region 504. Except for the interlocking end portions 2562, the elongated rolling bearing strip is similar in structure and function to the elongated rolling bearing strip 502 previously described.

The rolling bearing strip 2502 comprises an elongated, flexible separator cage 2508 and a plurality of spaced apart rolling bearings 2506, such as a plurality of ball bearings. The separator cage 2508, in one exemplary embodiment, comprises an elongated polymer strip 2520 defining a plurality of spaced apart, rolling bearing receiving pockets 2530, similar in structure and function to the pockets 530 of the elongated polymer strip 520 of the separator cage 508 of the rolling bearing strip 502. Each of the plurality of pockets 2530 of the separator cage 2508 is defined by an opening 2532, for receiving a rolling bearing 2506, and a pair of support arms 2534, 2536, like the support arms 534, 536 of the separator cage 508, which secure and rotationally support a rolling bearing, such as a ball bearing 2506 within the opening 2532. Extending portions of the support arms 2534, 2536 of the support arms 2534, 2536 extend radially away from a first inner surface 2522 of the separator cage 2508 and radially away from a second outer surface 2524 of the separator cage, as described with respect to the rolling bearing strip 502. The separator cage 2508 includes a first upper surface 2526 and a second lower surface 2528, as described with respect to the separator cage 508 of the rolling bearing strip 502.

Figure 76:
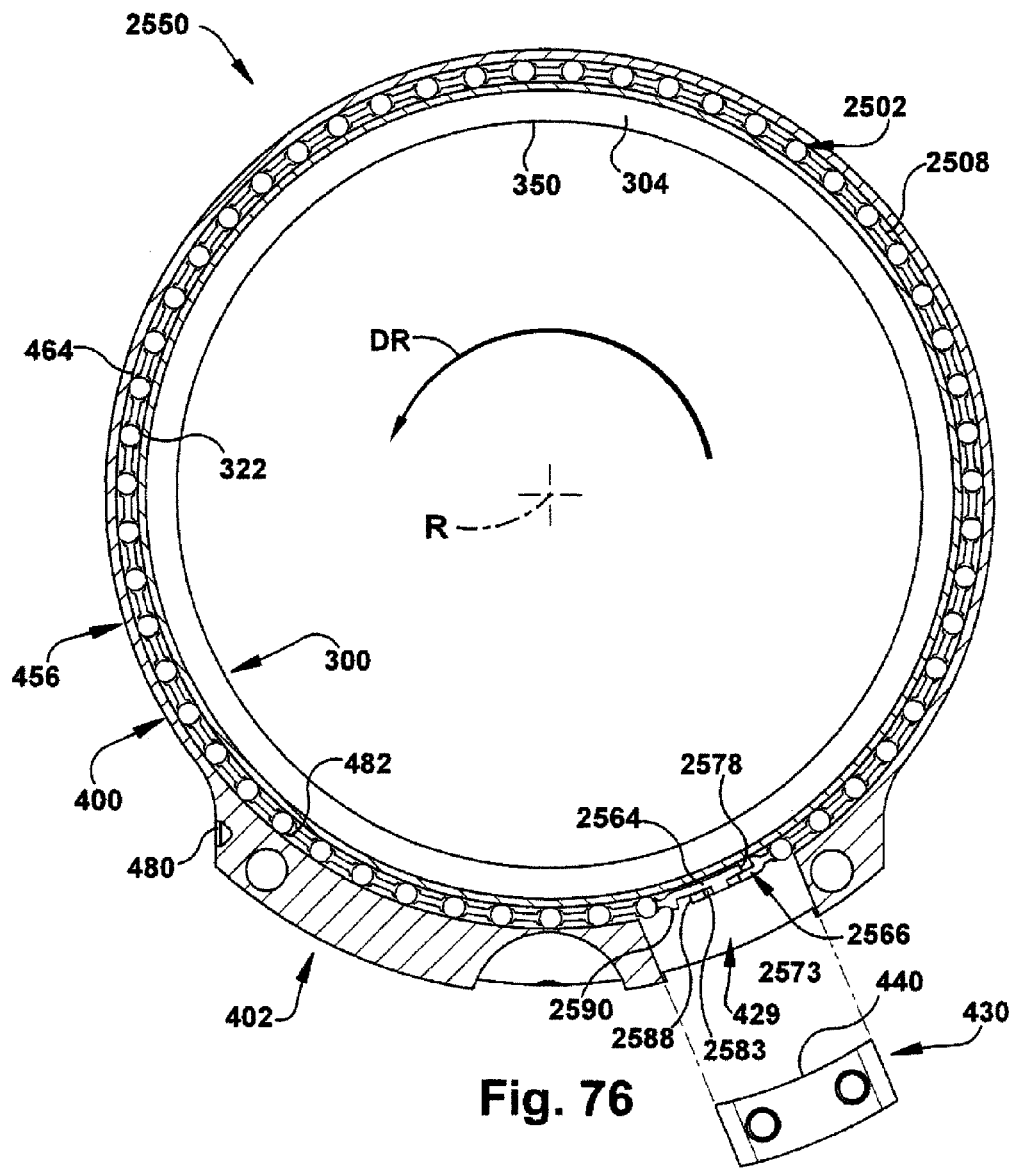
FIG. 76 is a schematic section view representation of a method of releasably securing the rotary knife blade to the blade housing utilizing the blade-blade housing bearing structure of the power operated rotary knife of FIG. 1 and the elongated rolling bearing strip of FIG. 59, showing interlocking of first and second end portion of the rolling bearing strip to form an annular, continuous bearing ring within the annular bearing passageway between the knife blade and the blade housing

With the exception of the blade housing plug 430 shown as not being inserted into the blade housing plug opening 429 and affixed to the blade housing 400, an assembled combination of the rotary knife blade 300, the blade housing 400 and the blade-blade housing bearing structure 2500 is shown generally at 2550 in FIG. 76. Except for differences between the elongated rolling bearing strip 2502 and the elongated rolling bearing strip 502, the assembled combination 2550 is substantially identical in structure and function to the assembled combination 550 of the power operated rotary knife 100.

Advantageously, the rolling bearing strip 2504 includes interlocking end portions 2546 of the separator cage 2508, which, when locked or coupled together, as described below, result in the annular, continuous rolling bearing ring 2560 within the passageway 504. The locked condition of the rolling bearing strip 2502 is accomplished by the coupling or locking of a first end or end portion 2564 and an intermitting second end or end portion 2566 of the separator cage 2508 when the rolling bearing strip 2502 is inserted in the annular passageway 504 to secure and support the rotary knife blade 300 for rotation with respect to the blade housing 400. In one exemplary embodiment, the interlocking end portions 2546 includes projecting member 2572 of the first end portion 2564 that fits into a receiving member 2582 of the second end portion 2566, when the rolling bearing strip is inserted and assembled in the annular passageway 504. In one exemplary embodiment, the first end portion projecting member 2572 comprises a projecting tab 2573, while the second end portion receiving member 2582 comprises a slot or oval-shaped opening 2583.

As was the case with separator cage 508 of the rolling bearing strip 504, the separator cage 2508 of the rolling bearing strip 2502 is not configured to be or desired to be a bearing member or provide bearing surfaces with respect to the rotary knife blade 300 and the blade housing 400. The plurality of rolling bearings 2506 are designed to provide rolling bearing support between the bearing surface 319 of the rotary knife blade 300 and the bearing surface 459 of the blade housing 400. The separator cage 2508 rides in the annular passageway 504 and is configured not to bear against or contact the rotary knife blade 300, the rotary knife blade bearing surface 319, the blade housing 400, or the blade housing bearing surface 459. As such the first and second end portions 2564, 2566 are narrower in width than the remainder of the separator cage 2508 such that, when the end portions 2546, 2566 are in the locked condition, contact with rotary knife blade 300 and the blade housing 400 is totally avoided or reduced to rare, incidental contact.

Advantageously, when inserted into the annular passageway 504, the annular, continuous rolling bearing ring 2560 defined by the rolling bearing strip 2502 of the present disclosure, provides significant advantages over a rolling bearing strip having either of the following configurations: 1) ends that are spaced apart (e.g., the configuration shown in FIGS. 14 and 20); or 2) ends that are overlapping. First, with respect to a rolling bearing strip with spaced apart ends, any gap between ends of the rolling bearing strip may serve as an undesirable collection region for debris, such as small fragments of fat, gristle, and meat, particles of bone, etc., which are generated during meat cutting or trimming operations and move into the blade-blade housing bearing region, that is, the annular passageway 504. Debris in the bearing region 504 will tend to collect in any circumferential gap between the rolling bearing strip ends. Such trapped debris will undesirably increase heat in the blade-blade housing bearing region 504 and may lead to unwanted "cooking" of the debris. Advantageously, the elongated rolling bearing strip 2502, when inserted and in a locked condition in the annular passageway 504, there is no gap between the end portions 2464, 2566 in which debris are prone to be collected.

Figure 69:
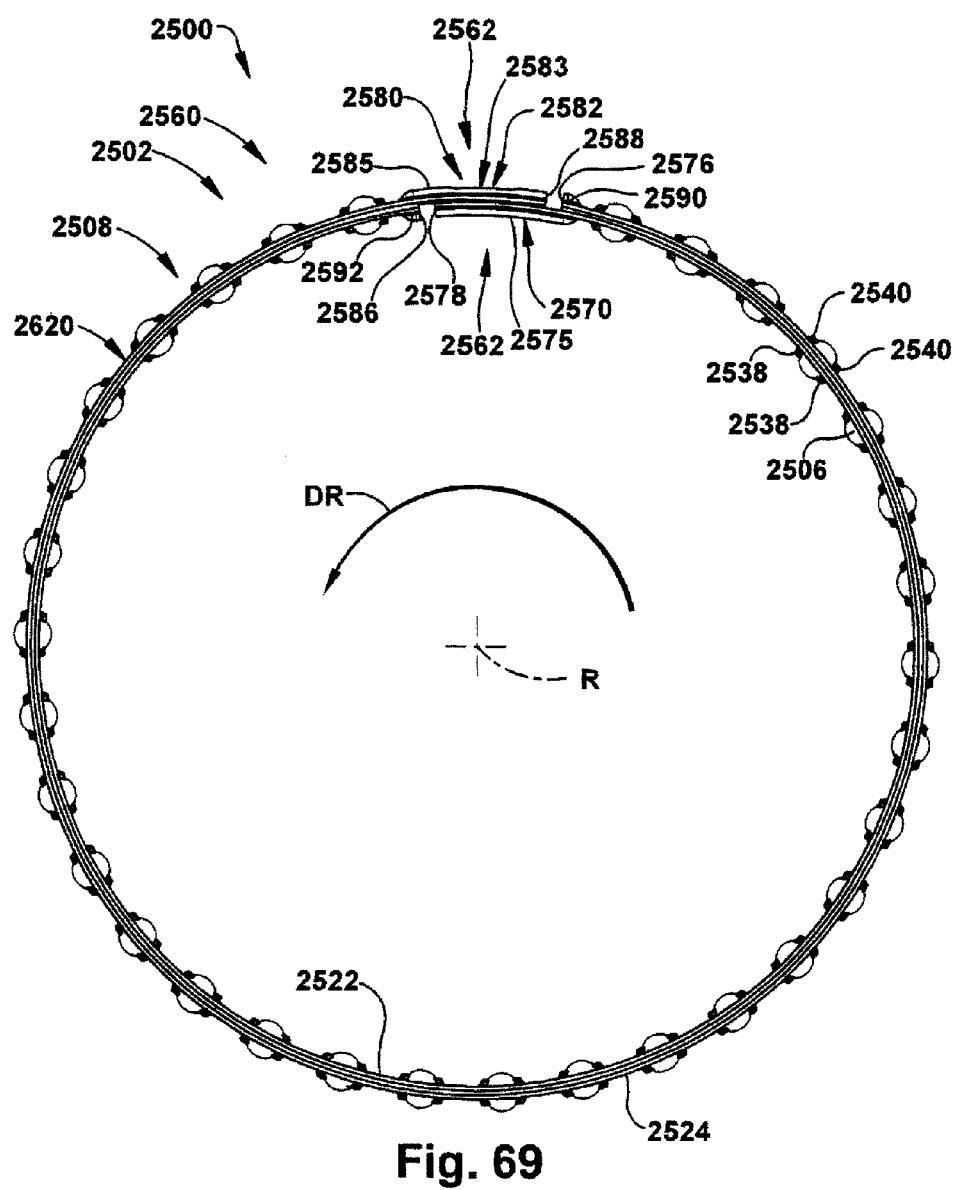
FIG. 69 is a schematic front elevation view of the elongated rolling bearing strip of FIG. 59 depicted in a locked or continuous condition.
Figure 75:
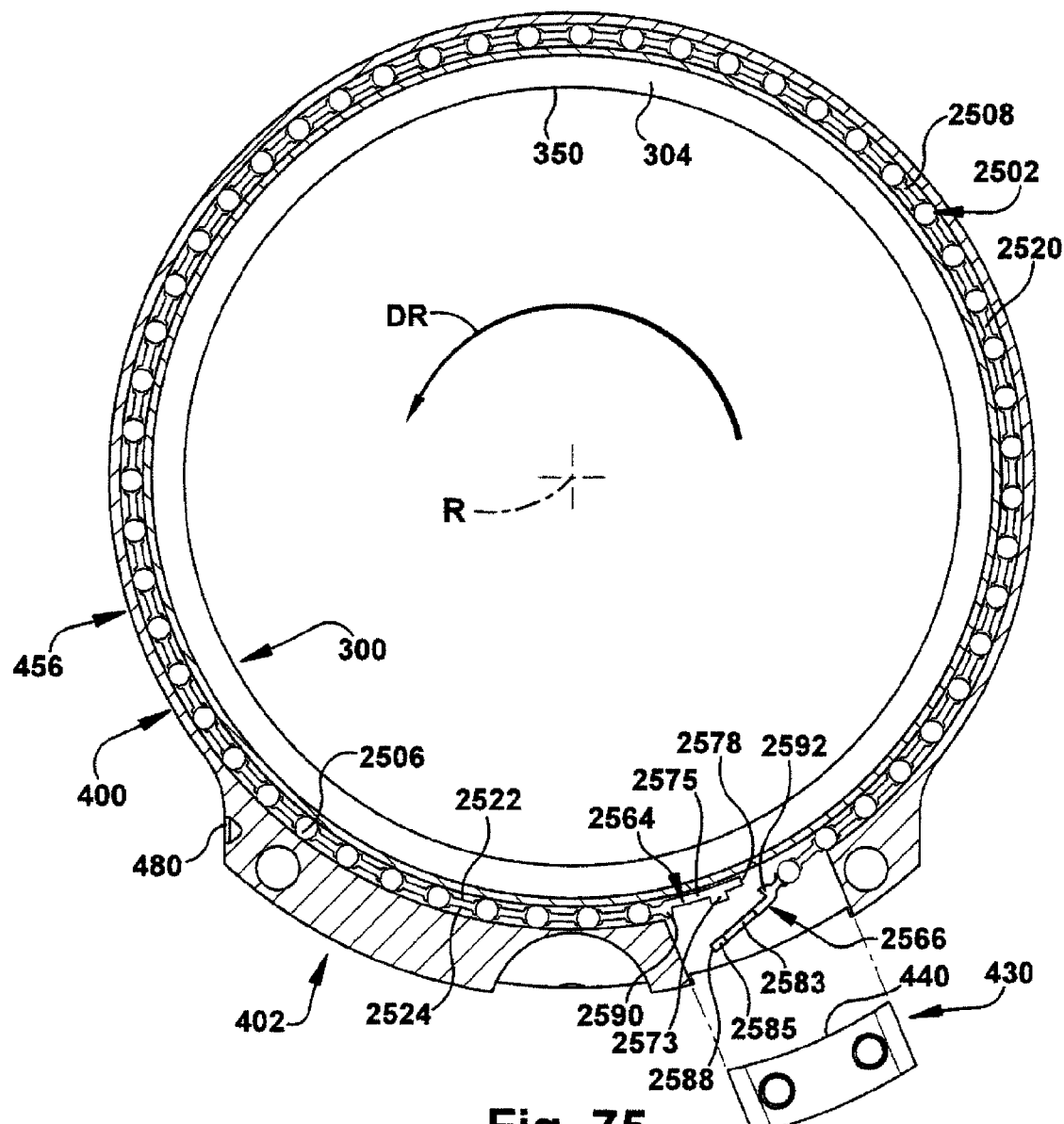
FIG. 75 is a schematic section view representation of a method of releasably securing the rotary knife blade to the blade housing utilizing the blade-blade housing bearing structure of the power operated rotary knife of FIG. 1 and the elongated rolling bearing strip of FIG. 59, showing completion of insertion of the elongated rolling bearing strip into the annular bearing passageway between the knife blade and the blade housing.

Second, with respect to a rolling bearing strip with overlapping ends, the elongated rolling bearing strip 2502 again has a significant advantage. As explained previously, when the rotary knife blade 300 is driven by the drive mechanism 600 to rotate with respect to the blade housing 400, the rolling bearing strip 2502 rotates within the annular passageway 504 in the same direction as the rotary knife blade 300, albeit at a lower rotational speed than the rotary knife blade 300. In a situation where the rolling bearing strip has overlapping ends, one end is necessarily a "leading end" with respect to the rotational direction of the rolling bearing strip and the rotary knife blade 300. As the rolling bearing strip rotates, the leading end will encounter debris within bearing region 504 and debris will tend to accumulate or collect on the leading end of the rolling bearing strip. Such accumulated debris will again undesirably increase heat in the blade-blade housing bearing region 504. Advantageously, the separator cage 2508 includes a ledge 2586 and projecting quarter-sphere configuration 2592 adjacent the second end portion 2566 with functions as a taper to minimize debris collected on a leading or distal end 2578 of the first end portion 2564 as the rolling bearing strip 2502 rotates in its direction of rotation DR (FIGS. 69 and 75-76).

A third situation wherein the ends of a rolling bearing strip are in contact, but not overlapping, while possible theoretically, is not realistic from a manufacturing perspective. Manufacturing tolerances and variation in terms of both the circumferential length of the rolling bearing strip and a circumferential length of the annular passageway 504 will result in a situation where either there is a gap between the ends of the rolling bearing strip or there is an overlap of the ends of the rolling being strip. Advantageously, the rolling bearing strip 2502 is configured such that the receiving member 2582 of the separator cage 2508, which in one exemplary embodiment is a slot 2583 passing through a wall 2580 of the second end portion, has a longitudinal extent or circumferential length that is greater than a corresponding longitudinal extent or circumferential length of the projecting member 2572. In this way, manufacturing variations in the longitudinal extent or circumferential length of the separator cage 2508 are advantageously accounted for because the slot 2583 has a greater circumferential length than the projecting member 2572 which interfits into the slot 2583 to achieve the locked condition. Thus, if the circumferential length of the separator cage 2508 is slightly greater or slightly less than a desired nominal value, the projecting member 2572 will still fit within the slot 2583.

Figure 72:
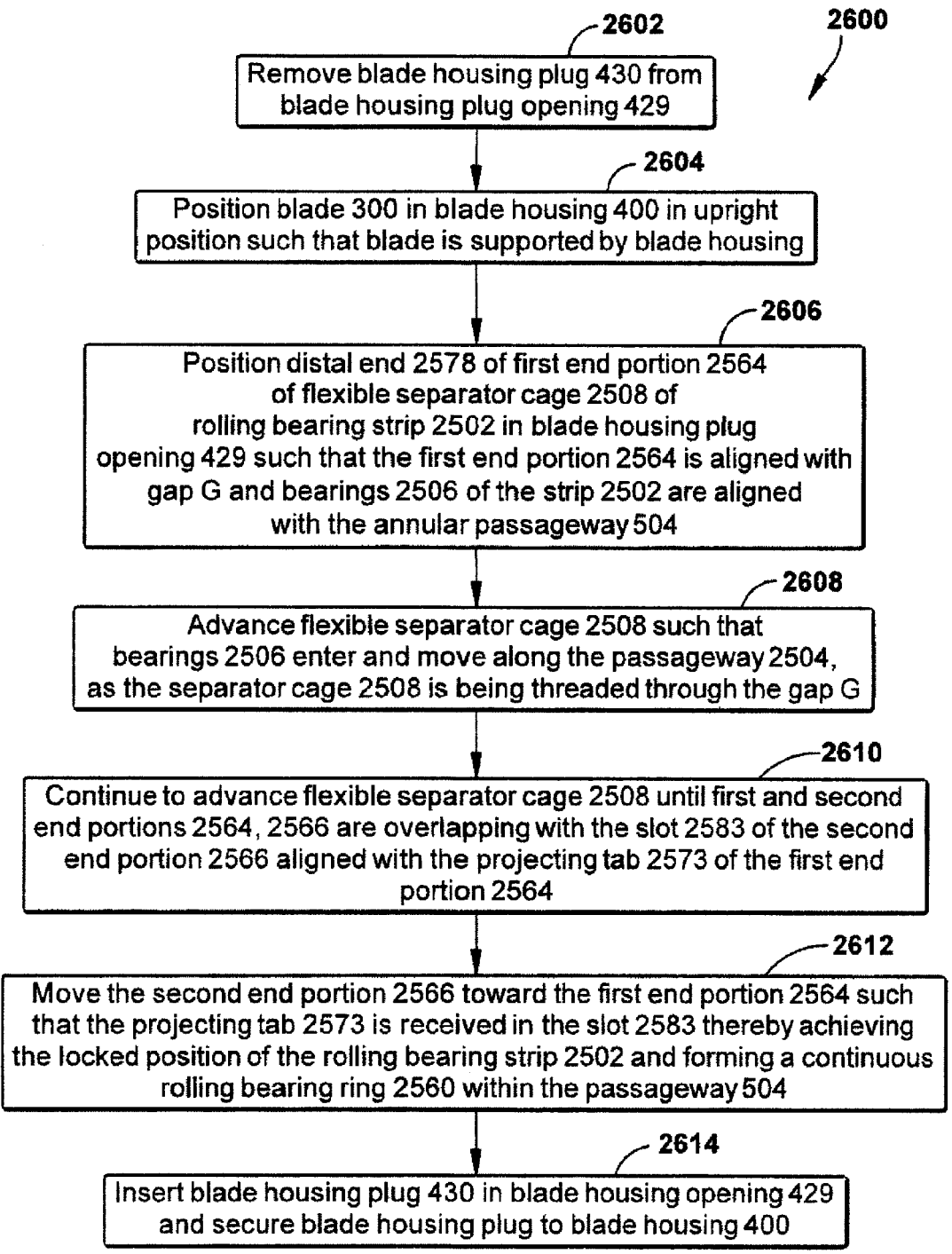
FIG. 72 is a schematic flow diagram for a method of securing and rotationally supporting the rotary knife blade with respect to the blade housing utilizing the blade-blade housing bearing structure of the power operated rotary knife of FIG. 1 and the elongated rolling bearing strip of FIG. 59.
Figure 73:
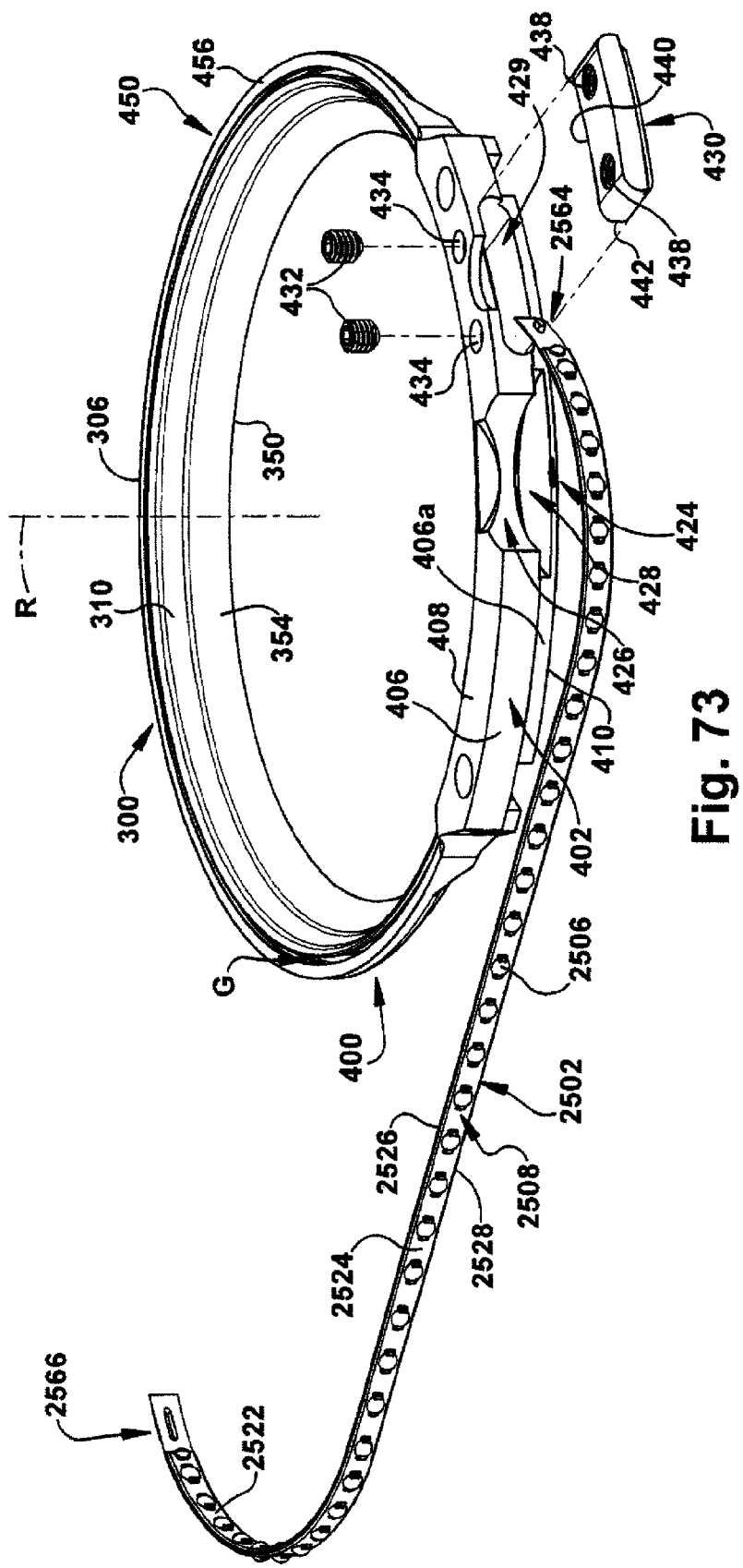
FIG. 73 is a schematic perspective view representation of a method of releasably securing the rotary knife blade to the blade housing utilizing the blade-blade housing bearing structure of the power operated rotary knife of FIG. 1 and the elongated rolling bearing strip of FIG. 59, showing alignment of the elongated rolling bearing strip with an annular bearing passageway defined between the rotary knife blade and the blade housing.
Figure 74:
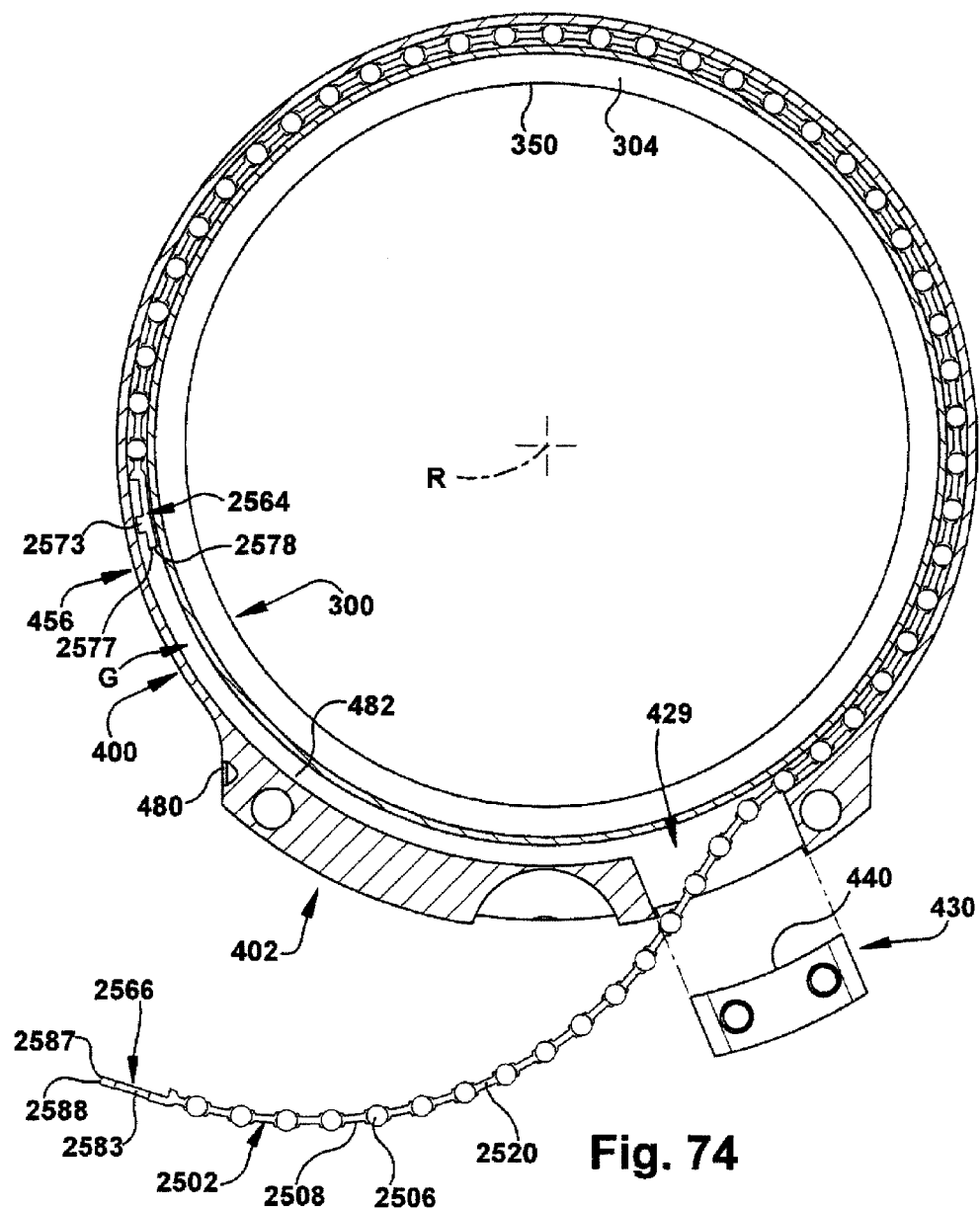
FIG. 74 is a schematic section view representation of a method of releasably securing the rotary knife blade to the blade housing utilizing the blade-blade housing bearing structure of the power operated rotary knife of FIG. 1 and the elongated rolling bearing strip of FIG. 59, showing partial insertion of the elongated rolling bearing strip into the annular bearing passageway between the rotary knife blade and the blade housing.

A flat, unlocked condition of the rolling bearing strip 2502 is schematically depicted in FIGS. 59-62. In FIGS. 63-66, the rolling bearing strip 2502 is schematically shown in an annular, unlocked condition. In FIGS. 67-71, the rolling bearing strip 2502 is schematically depicted in the annular, locked condition within the annular bearing passageway 504. FIG. 72 is schematic flow diagram for a method of securing and rotationally supporting the rotary knife blade 300 with respect to the blade housing 400 utilizing the rolling bearing strip 2502 of the present disclosure. FIGS. 73-76 depict schematic perspective and section views showing various stages of the method of releasably securing the rotary knife blade 300 to the blade housing 400 utilizing the rolling bearing strip 2502. More specifically, the method includes the steps of inserting the rolling bearing strip 2502 into the annular passageway 504 and locking the first and second end portions 2564, 2566 to achieve the locked condition of the rolling bearing strip 2502. In FIG. 76, the rolling bearing strip 2502 is schematically depicted in the locked condition in the passageway 504, while FIGS. 73-75 schematically depict insertion of the rolling bearing strip 2502 into the annular passageway 504 of the blade-blade housing bearing structure 2500.

As can be seen in Figures, the rolling bearing strip 2502 includes a longitudinally extending center line BSCL (FIGS. 59, 61 and 62) that substantially extends through a center of the separator cage 2508 and substantially extends through centers of each of the plurality of ball bearings 2506. When the rolling bearing strip 2502 is in an unlocked, flat condition, as shown schematically in FIGS. 59-62, the central line RSCL is substantially congruent with a longitudinal axis BSLA of the strip 2502. When the rolling bearing strip 2502 is in the annular condition, as shown schematically in FIGS. 63-71, the longitudinal axis BSLA essentially becomes an annular axis BSAA of the rolling bearing strip 2502.

End Portions 2564, 2566 of the Rolling Bearing Strip 2502

The interlocking end portions 2562 of the separator cage 2508 of the rolling bearing strip 2502 comprise the first end portion 2564 and the second end portion 2566. The first end portion 2564, as explained previously, includes a projecting member 2572 that, in one exemplary embodiment, comprises a projecting tab 2573. The projecting tab 2573 extends transversely from a planar first side 2571 (FIG. 62A) of a wall 2570 of the first end portion 2564. As can best be seen in FIG. 71, the planar first side 2571 is substantially parallel to and congruent with the center line BSCL, the annular axis BSAA, and the longitudinal axis BSLA of the rolling bearing strip 2502. In one exemplary embodiment, the projecting tab 2573 is substantially oval-shaped in axial cross section and, in axial direction, extends along the center line BSCL of the rolling bearing strip 2502 and, in radial direction, extends orthogonally with respect to the planar, first side 2571 and is substantially orthogonal with respect to the center line BSCL of the rolling bearing strip 2502.

Figure 62A:
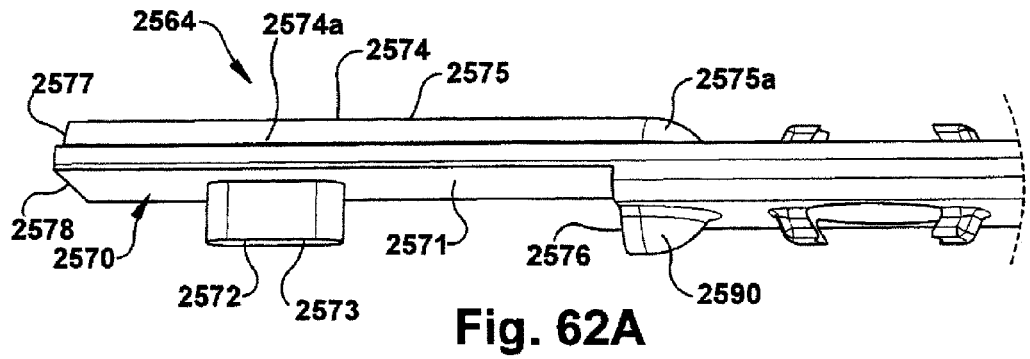
FIG. 62A is a schematic enlarged perspective view of a portion of the elongated rolling bearing strip of FIG. 59 that is within a dashed circle labeled FIG. 62A in FIG. 62.
Figure 62B:
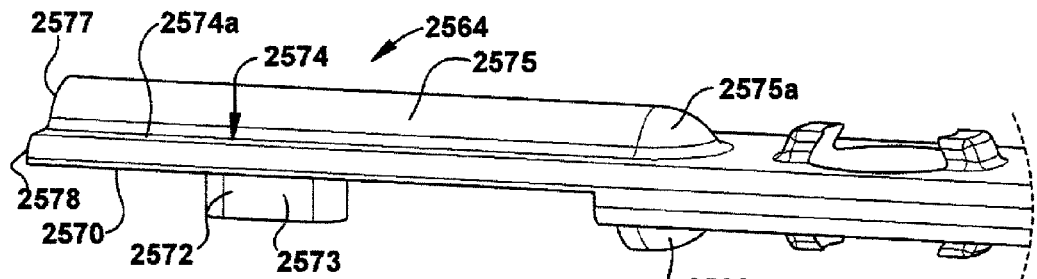
FIG. 62B is a schematic enlarged perspective view of the portion of the elongated rolling bearing strip of FIG. 62A.

As can best be seen in FIG. 62B, an opposite, second side 2574 of the first end portion wall 2570 defines a raised, circumferentially extending bead 2575 which extends radially outwardly from a planar portion 2574*a* of the second side 2774 of the wall 2570. An outer surface of the bead 2575 is substantially arcuate-shaped in radial cross section. A proximal end of the bead 2575 terminates in a quarter-sphere 2575*a*. A substantially planar distal end 2577 of the wall 2570 defines a distal or terminal end 2578 of the first end portion 2564.

The first end portion 2564 also includes a ledge 2576 extending transversely away from the planar first side 2571 of the wall 2570. The ledge 2576 defines a front face of a quarter-sphere 2590 protecting radially away from the outer surface 2524 of the separator cage 2508. The quarter-sphere 2590 extending from the ledge 2576 is substantially radially aligned with the quarter-sphere 2575*a* of the bead 2575, that is, both are approximately an equal axial distance away from the terminal end 2578 of the first end portion 2564.

A radius of the quarter-sphere 2590 with respect to the rolling bearing strip center line BSCL is labeled as FEQSR (first end quarter-sphere radius). Advantageously, the quarter-sphere radius FEQSR is less than the radius of the ball bearings of the plurality of ball bearings 2506 in order to mitigate any inadvertent contact between the quarter-sphere 2590 and the bearing surface 459 of the blade housing 400. Similarly, a radius of the bead 2575 with respect to the rolling bearing strip center line BSCL is labeled as FEBR (first end bead radius). Advantageously, the bead radius FEBR is less than the radius of the ball bearings of the plurality of ball bearings 2506 in order to mitigate any inadvertent contact between the bead 2575 and the bearing surface 319 of the rotary knife blade 300. Finally, an outer radial surface diameter FEROSD (FIG. 71) of the first end portion 2564, as defined by the quarter-sphere radius FEQSR of the quarter-sphere 2590 plus the bead radius FEBR of the bead 2575, is less than a diameter of the ball bearings of the plurality of ball bearings 2506 in order to mitigate any inadvertent contact between the bead 2575 and the bearing surface 319 of the rotary knife blade 300 or the quarter-sphere 2590 and the bearing surface 459 of the blade housing 400.

The second end portion 2566, as explained previously, includes a receiving member 2582 that, in one exemplary embodiment, comprises a slot 2583. The slot 2583, in one exemplary embodiment, extends transversely from a wall 2580 (FIGS. 62C & 62D) of the second end portion 2566. Specifically, the slot 2583 extends from a planar first side 2571 of a wall 2580 through an opposite, second side 2584 of the wall 2580. As can best be seen in FIG. 71, the planar first side 2581 is substantially parallel to and congruent with the center line BSCL, the annular axis BSAA, and the longitudinal axis BSLA of the rolling bearing strip 2502. In one exemplary embodiment, the slot 2583 is substantially oval-shaped in axial cross section and, in axial direction, extends along the center line BSCL of the rolling bearing strip 2502 and, in radial direction, extends orthogonally through the wall 2580 and is substantially orthogonal with respect to the center line BSCL of the rolling bearing strip 2502.

Figure 62C:
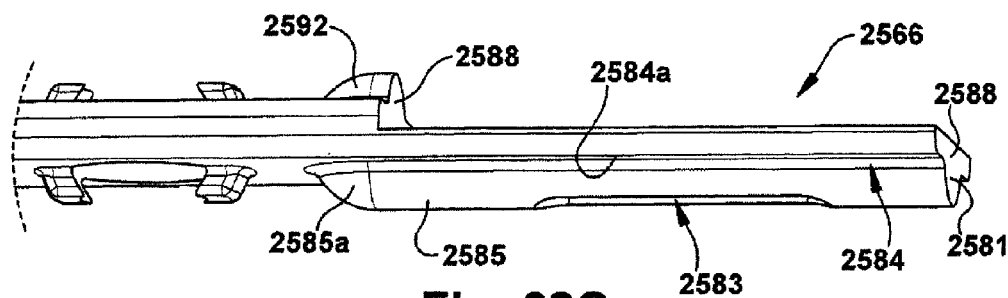
FIG. 62C is a schematic enlarged top plan view of a portion of the elongated rolling bearing strip of FIG. 59 that is within a dashed circle labeled FIG. 62C in FIG. 62.
Figure 62D:
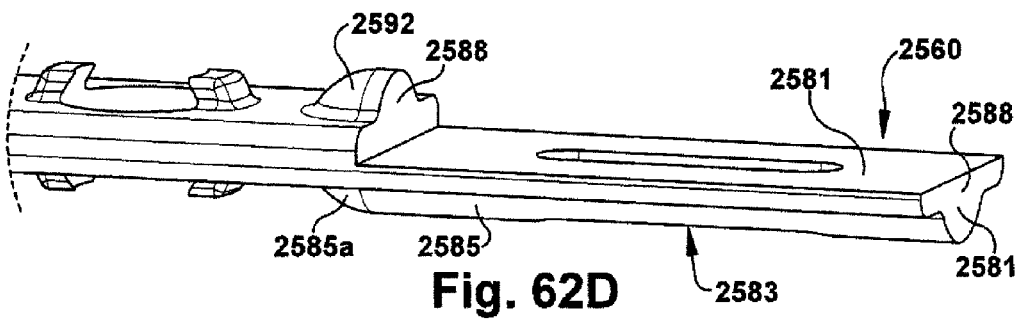
FIG. 62D is a schematic enlarged perspective view of the portion of the elongated rolling bearing strip of FIG. 62C.
Figure 63:
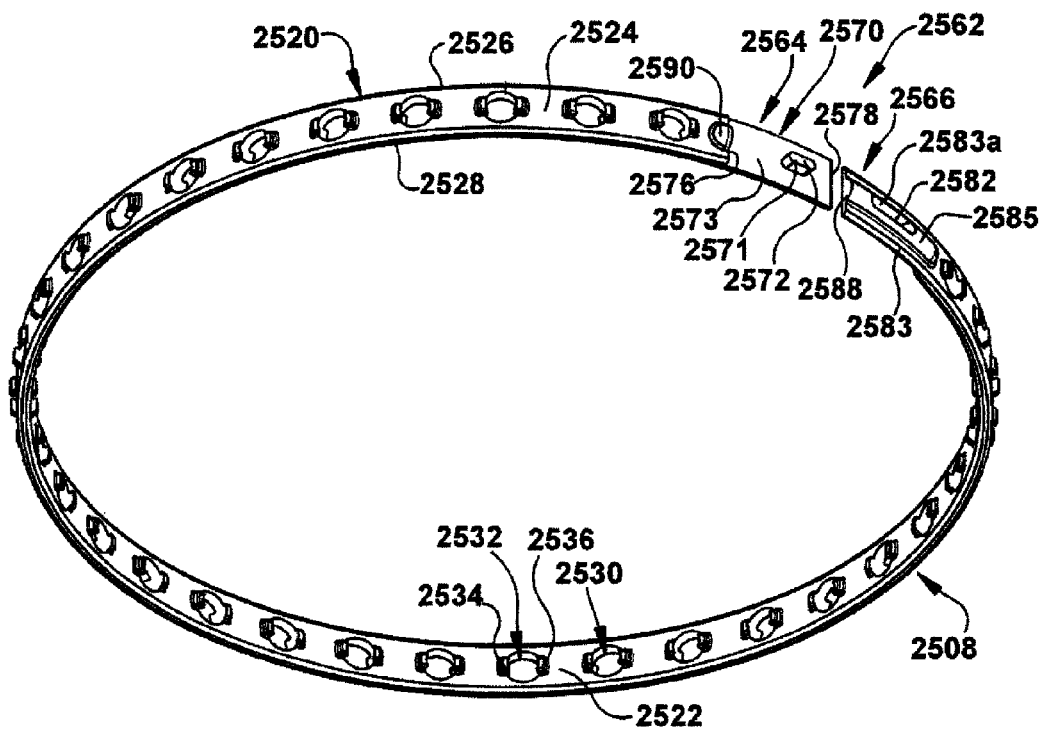
FIG. 63 is a schematic perspective view of the elongated rolling bearing strip of FIG. 59 depicted in an annular, unlocked condition, with the plurality of rolling bearings removed.
Figure 64:
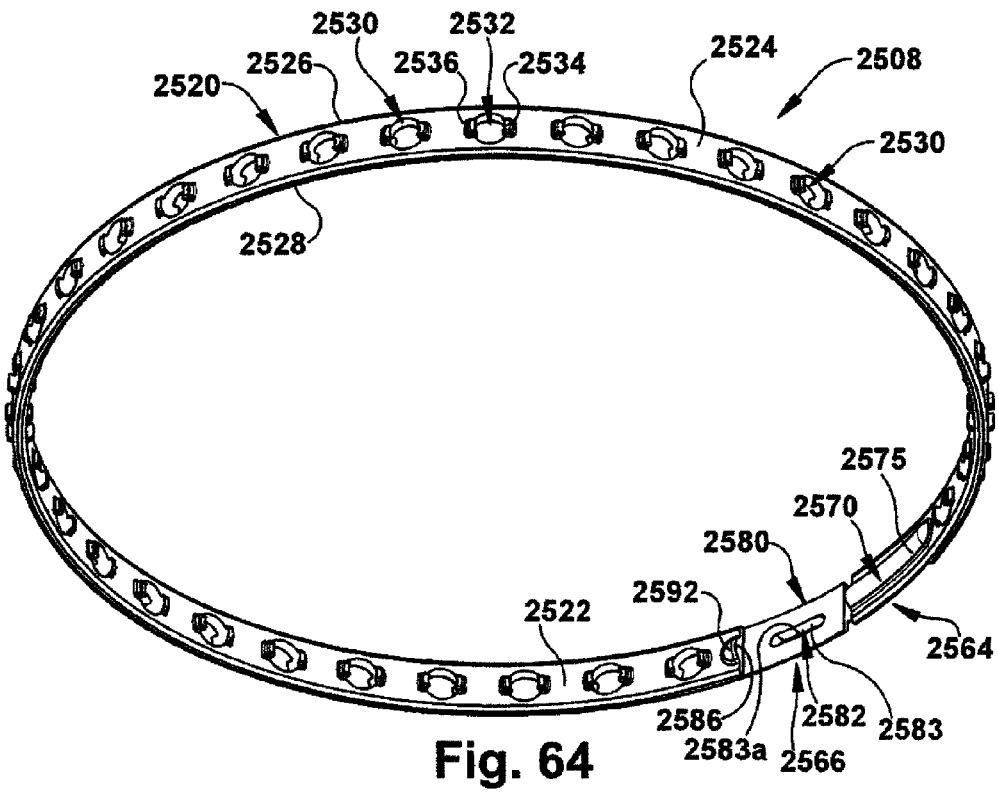
FIG. 64 is another schematic perspective view of the elongated rolling bearing strip of FIG. 59 depicted in an annular, unlocked condition, with the plurality of rolling bearings removed.
Figure 65:
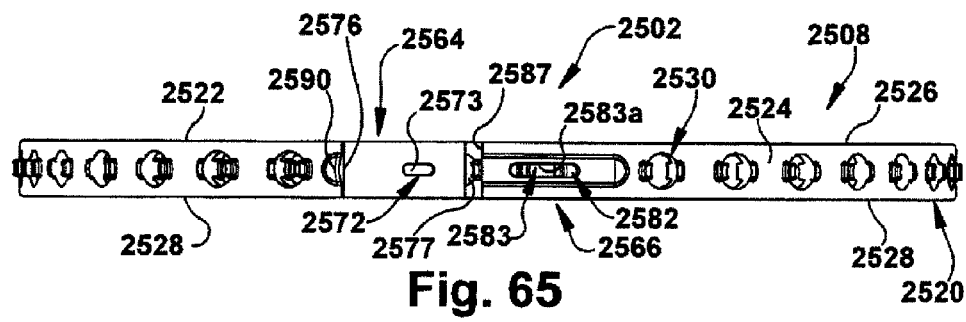
FIG. 65 is a schematic front elevation view of the elongated rolling bearing strip of FIG. 59 depicted in an annular, unlocked condition, with the plurality of rolling bearings removed.
Figure 66:
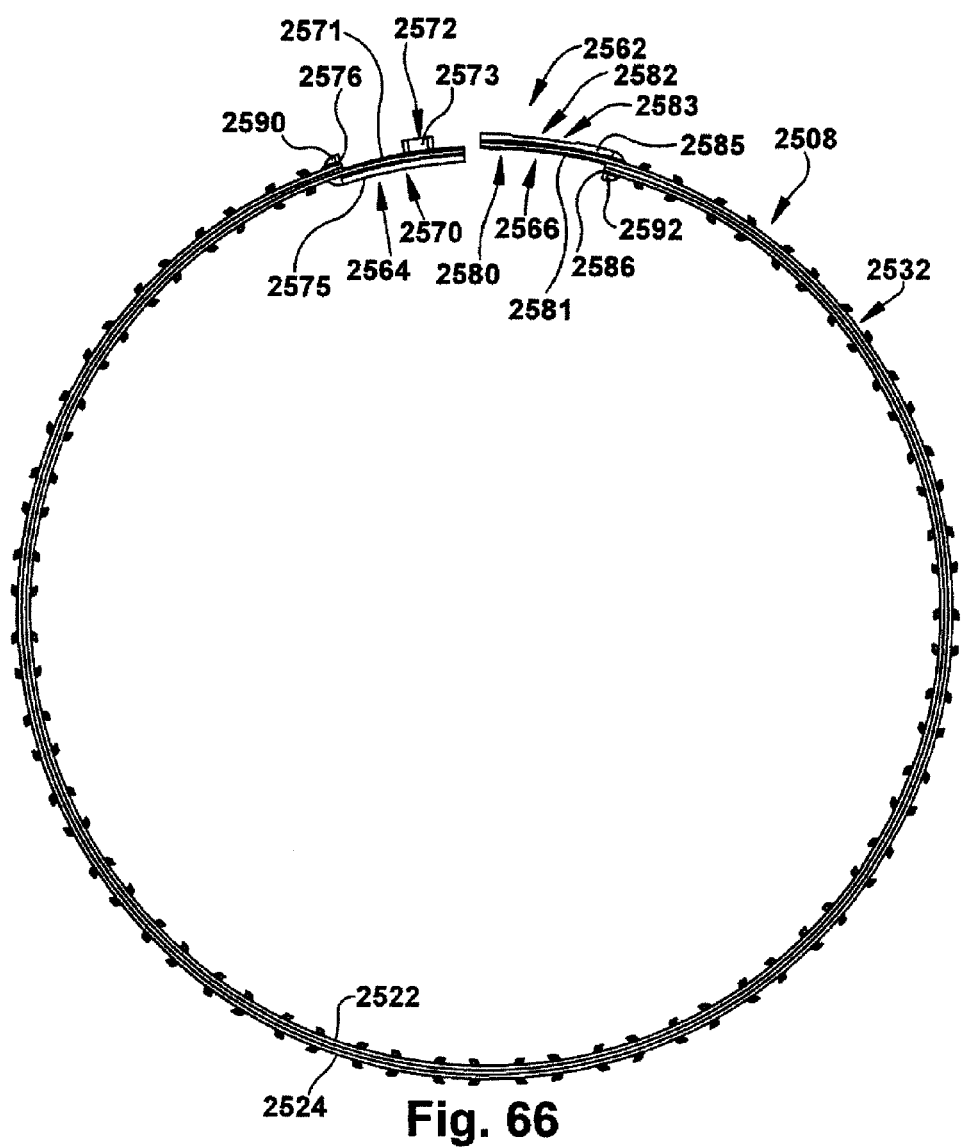
FIG. 66 is a schematic top plan view of the elongated rolling bearing strip of FIG. 59 depicted in an annular, unlocked condition, with the plurality of rolling bearings removed.
Figure 67:
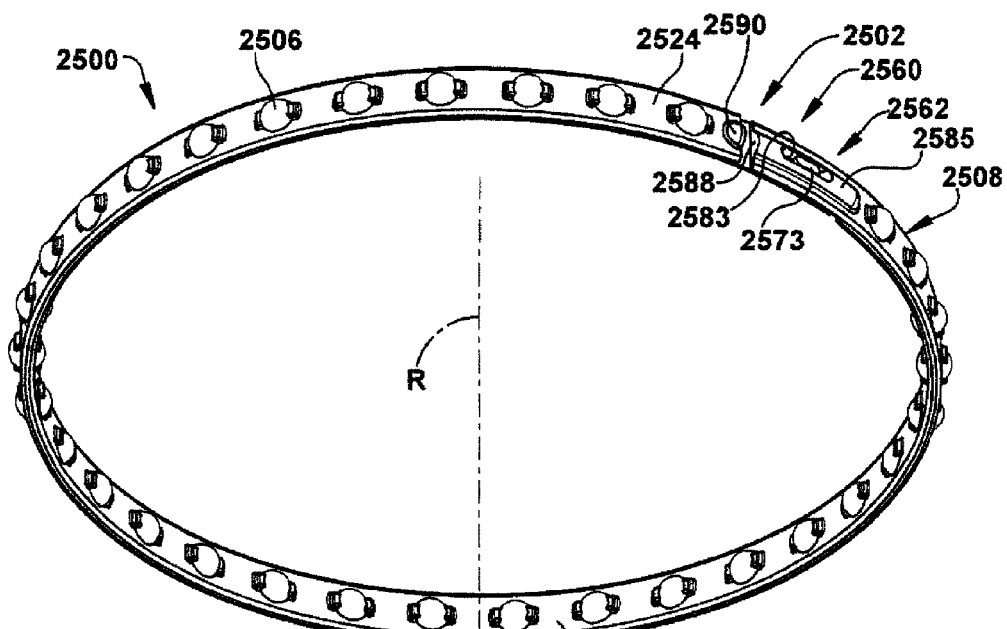
FIG. 67 is a schematic perspective view of the elongated rolling bearing strip of FIG. 59 depicted in a locked or continuous condition.
Figure 68:
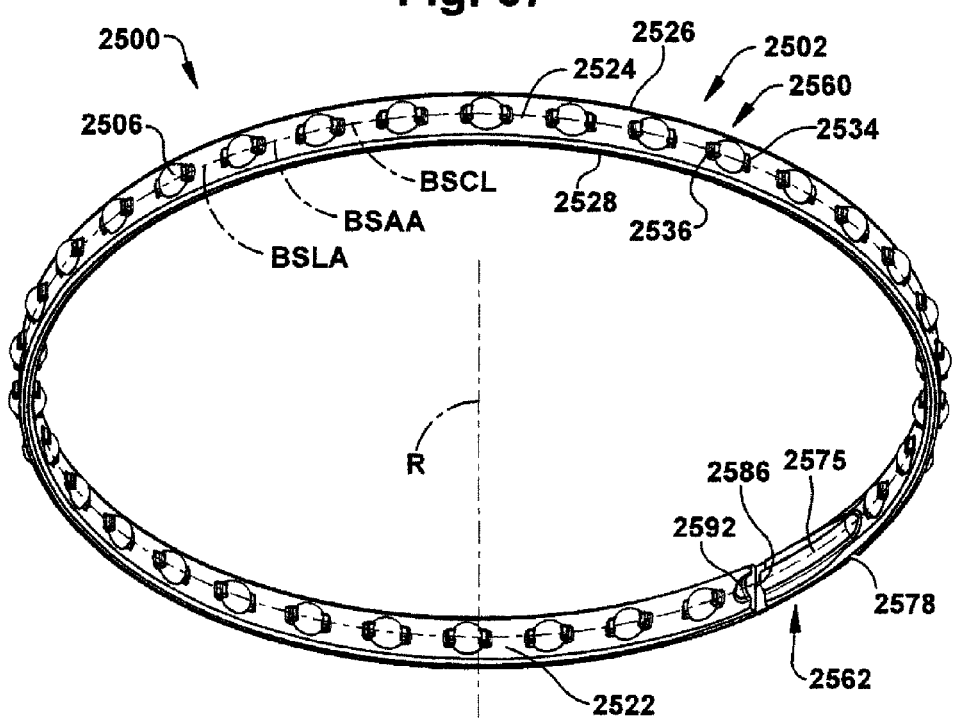
FIG. 68 is another schematic perspective view of the elongated rolling bearing strip of FIG. 59 depicted in a locked or continuous condition.

As can best be seen in FIG. 62C, the opposite, second side 2584 of the second end portion wall 2580 defines a raised, circumferentially extending bead 2585 which extends radially outwardly from a planar portion 2584*a* of the second side 2784 of the wall 2580. An outer surface of the bead 2585 is substantially arcuate-shaped in radial cross section. A proximal end of the bead 2585 terminates in a quarter-sphere 2585*a*. A substantially planar distal end 2587 of the wall 2580 defines a distal or terminal end 2588 of the second end portion 2566.

The second end portion 2566 also includes a ledge 2586 extending transversely away from the planar first side 2581 of the wall 2580. The ledge 2586 defines a front face of a quarter-sphere 2592 protecting radially away from the inner surface 2522 of the separator cage 2508. The quarter-sphere 2592 extending from the ledge 2586 is substantially radially aligned with the quarter-sphere 2585*a* of the bead 2585, that is, both are approximately an equal axial distance away from the terminal end 2588 of the second end portion 2566.

A radius of the quarter-sphere 2592 with respect to the rolling bearing strip center line BSCL is labeled as SEQSR (second end quarter-sphere radius). Advantageously, the quarter-sphere radius SEQSR is less than the radius of the ball bearings of the plurality of ball bearings 2506 in order to mitigate any inadvertent contact between the quarter-sphere 2592 and the bearing surface 319 of the rotary knife blade 300. Similarly, a radius of the bead 2585 with respect to the rolling bearing strip center line BSCL is labeled as SEBR (second end bead radius). Advantageously, the bead radius SEBR is less than the radius of the ball bearings of the plurality of ball bearings 2506 in order to mitigate any inadvertent contact between the bead 2585 and the bearing surface 459 of the blade housing 400. Finally, an outer radial surface diameter SEROSD (FIG. 71) of the second end portion 2566, as defined by the quarter-sphere radius SEQSR of the quarter-sphere 2592 plus the bead radius SEBR of the bead 2585, is less than a diameter of the ball bearings of the plurality of ball bearings 2506 in order to mitigate any inadvertent contact between the quarter-sphere 2592 and the bearing surface 319 of the rotary knife blade 300 or the bead 2585 and the bearing surface 459 of the blade housing 400.

As previously mentioned and as can best be seen schematically in FIG. 71, an axial extent or circumferential length of the slot 2583 along the rolling bearing strip annular axis RSAA exceeds an axial extent or circumferential length of the projecting tab 2573 to allow interlocking of the first and second end portions 2564, 2566 by full insertion of the projecting tab 2573 of the first end portion 2564 into the receiving slot 2583 of the second end portion 2566 even if an axial length of the separator cage 2508 is at either end of the manufacturing tolerance range for the permissible axial length of the separator cage 2508. Also, the extra length of the slot 2583 as compared to the projecting tab 2573 advantageously allows for expansion and contraction of the axial length of the separator cage 2508 within the annular passageway 504 that necessarily occurs as the rolling bearing strip 2508 beats up and cools down during periods of use and non-use of the power operated rotary knife 100 without loss of the locked condition of the rolling bearing strip 2502. As can also best be seen schematically in FIG. 71, a radial extent of the projecting tab 2573 (extending radially outwardly from the center line BSCL) is equal to or slightly less than a radial depth of the slot 2583 such that no portion of the projecting tab 2573 extends outwardly beyond a radial outer surface of the bead 2585 of the second end portion wall 2580.

As can best be seen in FIG. 71, the quarter-sphere 2590 of the first end portion 2564 is axially aligned with and essentially continues the bead 2585 of the second end portion 2566 so as to minimize ingress of debris between the first and second end portions 2564, 2566 during rotation of the rolling bearing strip 2502 within the annular bearing passageway 504 during operation of the power operated rotary knife 100. Similarly, the quarter-sphere 2592 of the second end portion 2566 is axially aligned with and essentially continues the bead 2575 of the first end portion 2564 so as to minimize ingress of debris between the first and second end portions 2564, 2566 during rotation of the rolling bearing strip 2502 within the annular bearing passageway 504 during operation of the power operated rotary knife 100. When in a locked condition within the annular bearing passageway 504, the rolling bearing strip appears as shown in FIGS. 69, 71 and 76. As can be seen, the planar, first side 2571 of the wall 2570 of the first end portion 2564 is in opposing, facing relationship with the planar, first side 2581 of the wall 2580 of the second end portion 2566. This planar surface contact between the opposing sides 2571, 2581 minimizes ingress of debris between the first and second end portions 2564, 2566.

Suitable ball bearings 2506 for the rolling bearing strip 2502 may be purchased from McMaster-Carr Supply Co., 200 Aurora Industrial Pkwy., Aurora, Ohio 44202-8087 (www.mcmaster.com). The specific size of the ball bearings 2506 utilized in the rolling bearing strip 2502 will, of course, depend on various factors, including, but not limited to, the size of the power operated rotary knife 100, the diameter of the annular passageway 504 and desired width the gap G. In one exemplary embodiment of the rolling bearing strip 2502, suitable stainless steel ball bearings having a diameter of 2 mm. may be purchased from McMaster-Carr Supply Co., as Part No. 1598K18.

It is desired that the separator cage 2508 of the rolling bearing strip 2502 be flexible, durable, be able to tolerate a high temperature operating conditions, and have a low coefficient of thermal expansion. The separator cage 2508 may be comprised, for example, of a plastic composition and may be fabricated for example, by extruding, molding or other plastic fabricating techniques, as would be understood by those of skill in the art. Alternately, the separator cage 2508 may be fabricated of a metal or metal alloys and may be formed into a desired configuration, for example, by machining a strip of metal or by forming/shaping a metal strip of appropriate configuration by forming, casting, forging, extrusion, metal injection molding, and/or electrical discharge machining or another suitable process or combination of metal forming processes.

Method of Inserting and Locking Rolling Bearing Strip 2502

As can be seen in FIGS. 73-76 and in the flow diagram set forth in FIG. 72, a method of inserting and locking the rolling bearing strip 2502 within the annular bearing passageway 504 for the purpose of securing the rotary knife blade 300 to the blade housing 400 for rotation with respect to the blade housing 400 about the blade axis of rotation R, is shown generally at 2600 in FIG. 72. The method 2600 includes the following steps. At step 2602, remove the blade housing plug 430 from the blade housing plug opening 429. At step 2604, position the rotary knife blade 300 in blade housing 400 in an upright position such that blade 300 is supported by blade housing 400. Specifically, the knife blade 300 is positioned in the blade housing 400 in an upright orientation such that the horizontal extending portion 342 of the outer wall 312 of the knife blade 300 and the bottom surface 345 of the knife blade set of gear teeth 330 are disposed on the respective first and second ledges 470, 472 of the blade housing 400. In this upright orientation, the blade housing bearing race 460 and the knife blade bearing race 320 are substantially radially aligned such that the annular passageway 504 is defined between the blade housing bearing race 460 and the knife blade bearing race 320.

At step 2606, as is shown schematically in FIG. 73, position the first end portion 2564 of flexible separator cage 2508 of rolling bearing strip 2502 in blade housing plug opening 429 such that first end portion 2510 is tangentially aligned with the gap G between the blade 300 and the blade housing 400 and the bearings 2506 of the rolling bearing strip 2502 are aligned with the annular passageway 504 between the opposing arcuate bearing faces 322, 464 of the blade 300 and blade housing 400. At step 2608, advance the flexible separator cage 2508 tangentially with respect to the gap G such that bearings 2506 of the rolling bearing strip 2502 enter and move along the passageway 504. That is, as is shown schematically in FIG. 74, the separator cage 2508 is advanced such that the separator cage 508 is effectively threaded through the passageway 504 and the gap G. The separator cage 508 is oriented in an upright position such that the cage fits into the gap G between the knife blade 300 and the blade housing 400.

At step 2610, continue to advance the flexible separator cage 2508 until first and second end portions 2564, 2566 of the separator cage 2508 are overlapping with the slot 2583 of the second end portion 2566 radially aligned with the projecting tab 2573 of the first end portion 2564 with respect to the rotary knife blade axis of rotation R, as seen in FIG. 75. At step 2612 and as shown schematically in FIG. 76, move the second end portion 2566 toward the first end portion 2546 such that the projecting tab 2573 is received in the slot 2583 thereby achieving the locked position of the rolling bearing strip 2502 and forming a continuous rolling bearing ring 2560 within the passageway 504. At step 2614, insert the blade housing plug 430 in blade housing opening 429 and secure blade housing plug to blade housing 400 with the fasteners 432.

Depending on where the interlocking end portions 2562 of the rolling bearing strip 2502 are circumferentially positioned within the annular bearing passageway 2502, removal of the rotary knife blade 300 from the blade housing 400 will either involve: a) pulling on a portion of the separator cage 2508 radially outwardly from annular passageway 504 thereby causing the separator cage to sever and then removing the rolling bearing strip 2502 from the annular passageway 504; or b) pulling on a portion of the separator cage 2508 radially outwardly from the annular passageway 504 thereby causing the interlocked first and second end portions 2564, 2566 of the separator cage 2508 to become circumferentially separated (moved to an unlocked condition) within the annular passageway 504 and then removing the rolling bearing strip 2502 from the annular passageway 504.

First, the blade housing plug 430 is removed from the blade housing plug opening 429 of the blade housing 400. Then, a small, hook-end instrument, i.e., a small, flat-head screwdriver with the distal end bent into a right angled configuration (not shown), may be used to hook and remove the rolling bearing strip 2502 from the annular passageway 504. The instrument is inserted into the blade housing plug opening 429 and the hooked-end of the instrument is manipulated to hook behind the inner surface 2522 of the separator cage 2508. The instrument is then pulled in a direction away from the annular passageway 504 generally parallel to the rotational plane RP of the rotary knife blade 300. Depending on where the interlocking end portions 2562 are positioned within the annular passageway 504 with respect to the portion of the separator cage 2508 which is hooked by the instrument, pulling the instrument away from the passageway 502 will result in either: a) severing the separator cage 2508 at some point other than the interlocking end portions 2562; or b) result in uncoupling and circumferential separation of the first and second end portions 2564, 2566. In either event, after severing or uncoupling, the rolling bearing strip 2502 may then pulled from the annular passageway 504. Once the rolling bearing strip 2502 has been completely removed from the annular passageway 504, the blade housing 400 may be turned upside down and the rotary knife blade 300 will fall out of the blade housing 400.

Second Exemplary Embodiment

Blade Housing 3400

Figure 79:
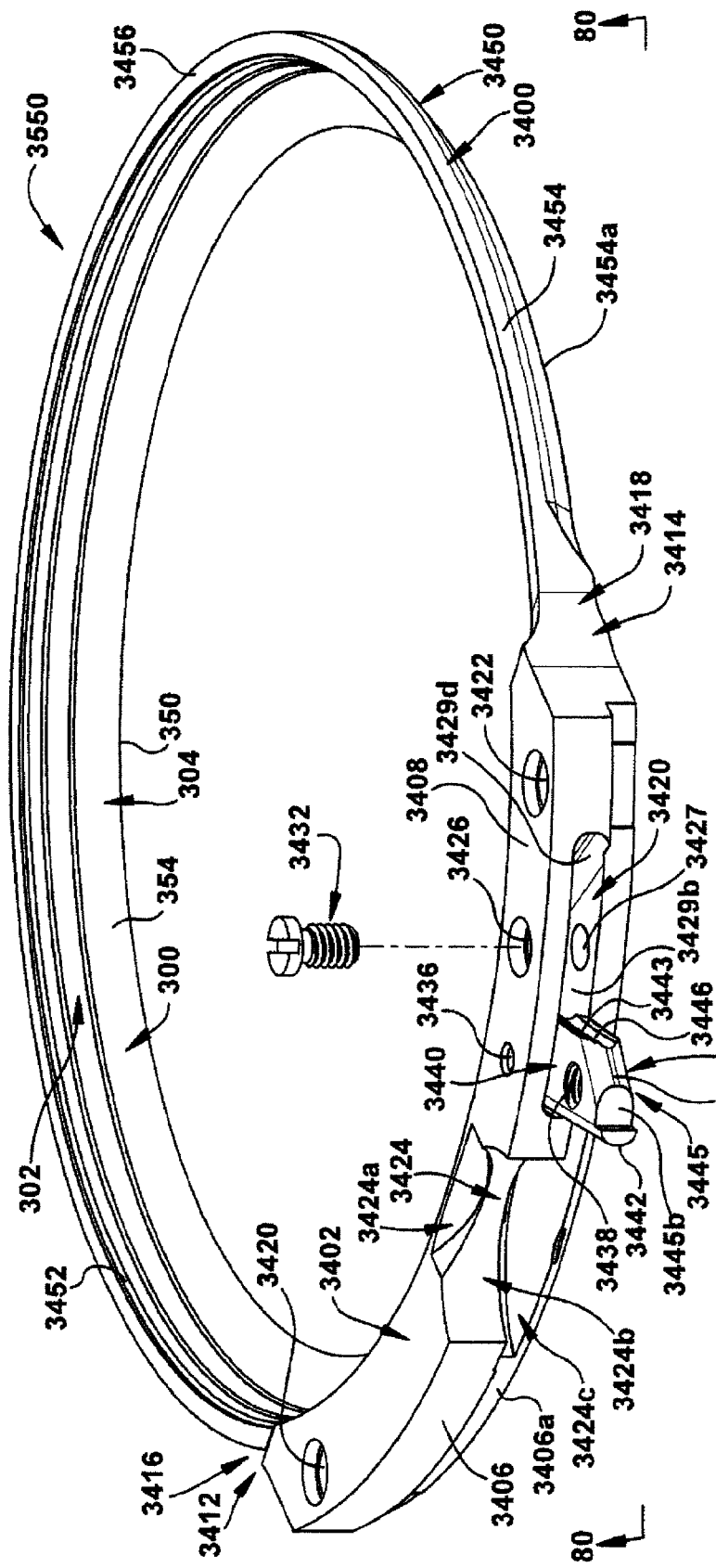
FIG. 79 is a schematic perspective view of the blade housing of FIG. 77 with the blade housing plug shown in an open position, the blade housing shown in an assembled combination of a rotary knife blade and blade-blade housing bearing structure of the power operated rotary knife of FIG. 1.
Figure 80:
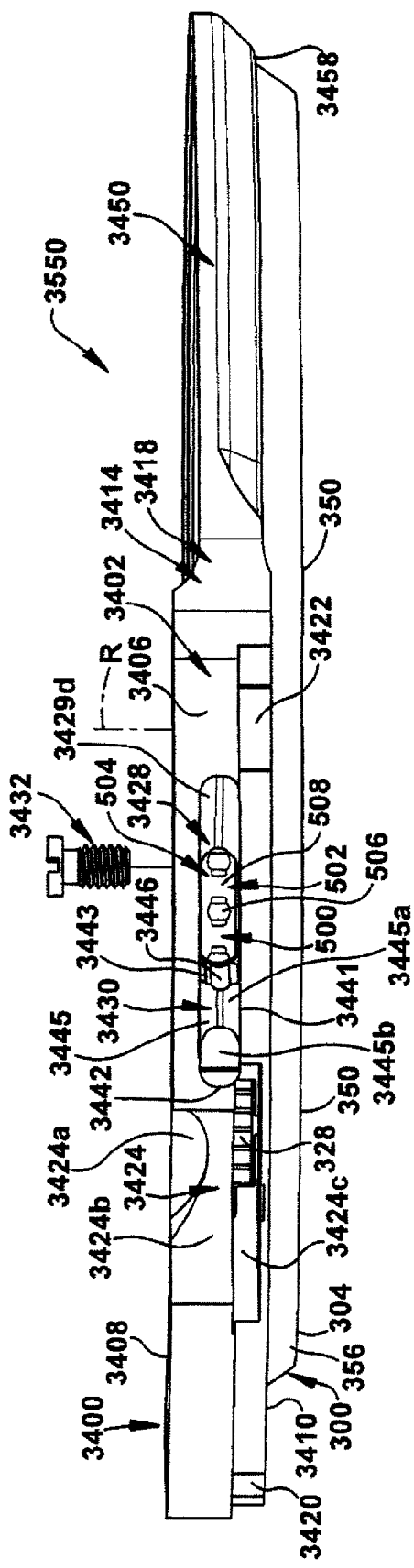
FIG. 80 is a schematic front elevation view of the blade housing of FIG. 77, as seen from a plane indicated by the line 80-80 in FIG. 79 with the blade housing plug shown in the open position, the blade housing shown in an assembled combination of a rotary knife blade and blade-blade housing bearing structure of the power operated rotary knife of FIG. 1.
Figure 81:
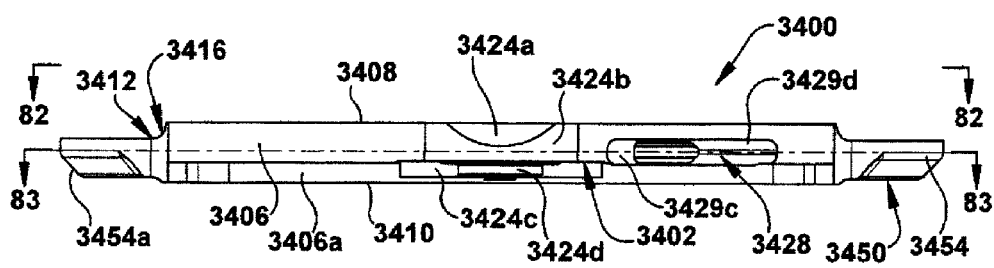
FIG. 81 is a schematic front elevation view of the blade housing of FIG. 77, with the blade housing plug removed.

A second exemplary embodiment of a blade housing of the present disclosure is schematically shown at 3400 in FIGS. 77-84. The blade housing 3400 is configured to be used in the power operated rotary knife 100 and, accordingly, has a configuration and function similar to the blade housing 400, discussed previously. Advantageously, the blade housing 3400 includes a blade housing plug 3430 that is hinged to a mounting section 3402 of the blade housing 3400, instead of being removable like the blade housing plug 430 of the blade housing 400 The pivotal connection or coupling between the blade housing plug 3430 and the blade housing 3400 avoids the necessity of removing of the blade housing plug 3430 from the blade housing 3400 during insertion or removal of the rolling bearing strip 502 of the blade-blade housing bearing structure 500. Instead, the blade housing plug 3430 pivots between a closed position (FIGS. 77, 78 and 83A) and an open position (FIGS. 79, 80 and 83B). The hinged connection between the blade housing plug 3430 and the blade housing 3400 mitigates the potential problem of losing or misplacing the blade housing plug 430 during replacement of the rolling bearing strip 502. Recall, that in the blade housing 400, the blade housing plug 430 must be removed from the blade housing plug opening 429 for insertion or removal of the rolling bearing strip 502 from the annular passageway 504.

Additionally, because the blade housing plug 3430 is hinged to the blade housing 3400, only a single fastener or screw 3432 is required to secure the blade housing plug 3430 with respect to the blade housing 3400, as opposed to a pair of screws 432 used to secure the blade housing plug 430 to the blade housing 400. Moreover, when the bearing surface 3459 of the blade housing 3400 is formed by, for example, machining an inner wall 3452 of a blade support section 3450 of the blade housing 3400 to form a bearing surface 3459 (similar to the bearing surface 459 of the blade housing 400), the blade housing plug 3430 is maintained in the closed position with respect to the blade housing 3400. Thus, an inner wall 3443 of the blade housing plug 3430 is machined simultaneously with the inner wall 3452 of the blade housing blade support section 3450. This insures that the configuration and alignment of a bearing surface 3446 formed in the inner wall 3443 of the blade housing plug 3430 is essentially identical to the configuration and alignment of the bearing surface 3459 of the blade housing blade support section 3450.

As was the case with the blade housing 400, the blade housing 3400, in one exemplary embodiment, is a one-piece, continuous annular structure. The blade housing 3400 includes the mounting section 3402 and the blade support section 3450. As was the case with the blade housing 400, in the blade housing 3400, the blade support section 3450 extends around the entire 360 degrees (360°) circumference of the blade housing 3400. The mounting section 3402 extends radially outwardly from the blade support section 3450 and subtends an angle of approximately 120°.

Figure 82:
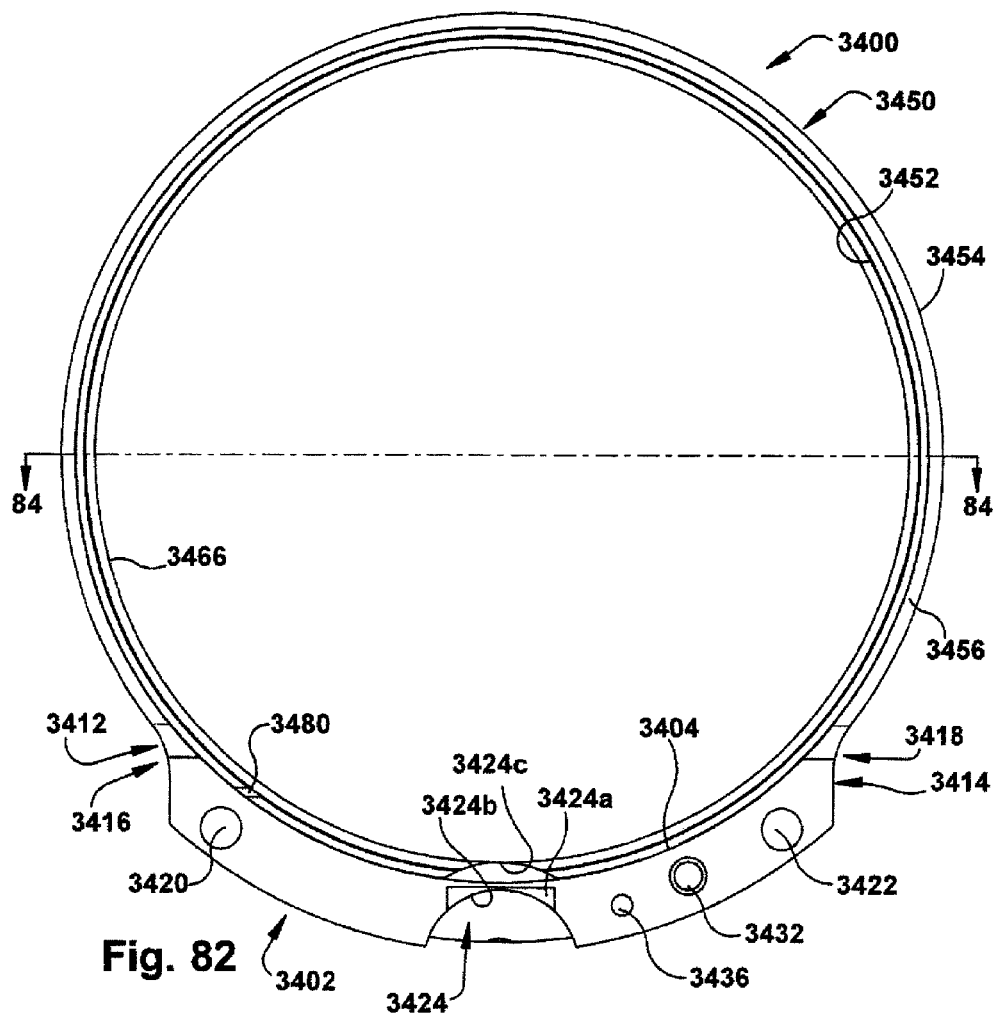
FIG. 82 is a schematic top plan view of the blade housing of FIG. 77, as seen from a plane indicated by the line 82-82 in FIG. 81.
Figure 84:
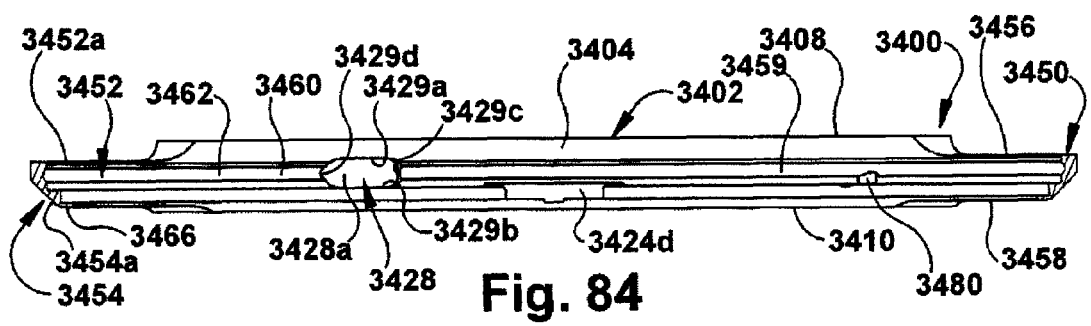
FIG. 84 is a schematic vertical sectional view of the blade housing of FIG. 77, as seen from a plane indicated by the line 84-84 in FIG. 82.

As can be seen in FIGS. 82 and 84, the mounting section 3402 is both axially thicker and radially wider than the blade support section 3450. The blade housing mounting section 3402 includes an inner wall 3404 and a radially spaced apart outer wall 3406 and a first upper end 3408 and an axially spaced apart second lower end 3410. At forward ends 3412, 3414 of the mounting section 3402, there are tapered regions 3416, 3418 that transition between the upper end 3408, lower end 3410 and outer wall 3406 of the mounting section 3402 and the corresponding upper end 3456, lower end 3458 and outer wall 3454 of the blade support section 3450.

The outer wall 3406 of the blade housing mounting section 3402 includes a radially inwardly stepped portion 3406*a*, similar in structure and function to the inwardly stepped portion 406*a* of the outer wall 406 of the mounting section 402 of the blade housing 400. The blade housing mounting section 3402 further includes two mounting inserts 3420, 3422 (FIG. 77), like the mounting inserts 420, 422 of the blade housing 400, that extend between the upper and lower ends 3408, 3410 of the mounting section 3402. The blade housing mounting section 3402 is received in the seating region 152*a* defined by the arcuate mounting pedestal 152 of the frame body 150 and is secured to the frame body 150 by a pair of threaded fasteners 170, 172 (FIG. 2C).

The mounting section 3402 also includes a gearing recess and opening 3424 (FIGS. 77, 81 and 82) that extends radially between the inner and outer walls 3404, 3406. The gearing recess 3424 includes an upper clearance recess 3424*a* of the recess and opening 3424 that provides clearance for the gear head 614 of the pinion gear 610 of the gear train 604 when the assembled combination 3550 of the rotary knife blade 300, the blade housing 3400 and the blade-blade housing bearing structure 500 are affixed to the gearbox assembly 112 by the frame body 150 to complete the head assembly 111. The gearing recess and opening 3424 further includes a central clearance recess 3424*b* that provides clearance for the axially oriented bevel gear 652 of drive gear 650 of the gear train 604. The gearing recess and opening 3424 also includes a lower recess and opening 3424*c*. The lower recess and opening 3424*c* includes an opening 3424*d* (FIG. 84) that extends through the inner wall 3404 of the blade housing mounting section 3402. The lower recess and opening 3424*c* provides clearance for the spur gear 654 of the drive gear 650 of the gear train 604 and the opening 3424*d* permits the interface or meshing of the spur gear 654 and the driven gear 328 of the rotary knife blade 300 to rotate the knife blade 300 with respect to the blade housing 3400.

The blade housing mounting section 3402 includes a cleaning port 3480 (FIGS. 82, 83, 83A and 83B) for injecting cleaning fluid for cleaning the blade housing 3400, the knife blade 300 and the rolling bearing strip 502 of the blade-blade housing bearing structure 500 during a cleaning process. In one exemplary embodiment, the cleaning port 3480 includes an entry opening in the outer wall 3406 of the mounting section 3402 and extends through to exit opening in the inner wall 3404 of the mounting section 402.

The mounting section 3402 of the blade housing 3400 includes a blade housing plug opening 3428 extends between the inner and outer walls 3404, 3406 of the blade housing mounting section 3402. As can best be seen in FIGS. 81, 83, 83A, 83B and 84, the blade housing plug opening 3428 is an opening defined by generally parallel top and bottom walls 3429*a*, 3429*b*, a radially extending L-shaped left side wall 3429*c*, and an angled right side wall 3429*d*. The angled right side wall 3429*d* of the blade housing plug opening 3428 includes an angled portion 3445*a* that is closed to the inner wall 3404 of the blade housing mounting section 3402 and a stepped portion 3445*b* that is closer to the outer wall 3406 of the blade housing mounting section 3402. The blade housing plug opening 3428 generally decreases in cross section in moving from the outer wall 3406 to the inner wall 3404. Advantageously, the blade housing plug 3430 is pivotally hinged to the mounting section 3402 of the blade housing 3400 by a hinge pin 3436 that extends through a vertically extending aperture 3439 in the blade housing plug 3430 and an aligned aperture 3425 in the mounting section 3402. The aligned aperture 3425 extends from the upper end 3408 of the mounting section 3402 to the blade housing plug opening 3428 and receives the hinge pin 3436.

As can best be seen in FIGS. 81, 82, 83 and 84, the blade support section 3450 of the blade housing 3400 includes an inner wall 3452 and the radially spaced apart outer wall 3454 and a first upper end 3456 and an axially spaced second lower end 3458. The blade support section 3450 extends about the entire 360° circumference of the blade housing 3400. The blade support section 3450 in a region of the mounting section 3402 is continuous with and forms a portion of the inner wall 3404 of the mounting section 3402, as explained with respect to the blade housing 400. A substantially vertical portion 3452*a* (FIG. 84) of the blade support section inner wall 3452 adjacent the first upper end 3456 defines the blade housing bearing surface 3459. In one exemplary embodiment of the power operated rotary knife 100, the blade housing bearing surface 3459 comprises a bearing race 3460 that extends radially inwardly into the inner wall 3452. The bearing race 3460 is axially spaced from the upper end 3456 of the blade support section 3450. In one exemplary embodiment, a central portion 3462 of the blade housing bearing race 3460 defines a generally concave bearing surface, and, more specifically, a generally arcuate bearing face 3464.

Blade Housing Plug 3430

Figure 83:
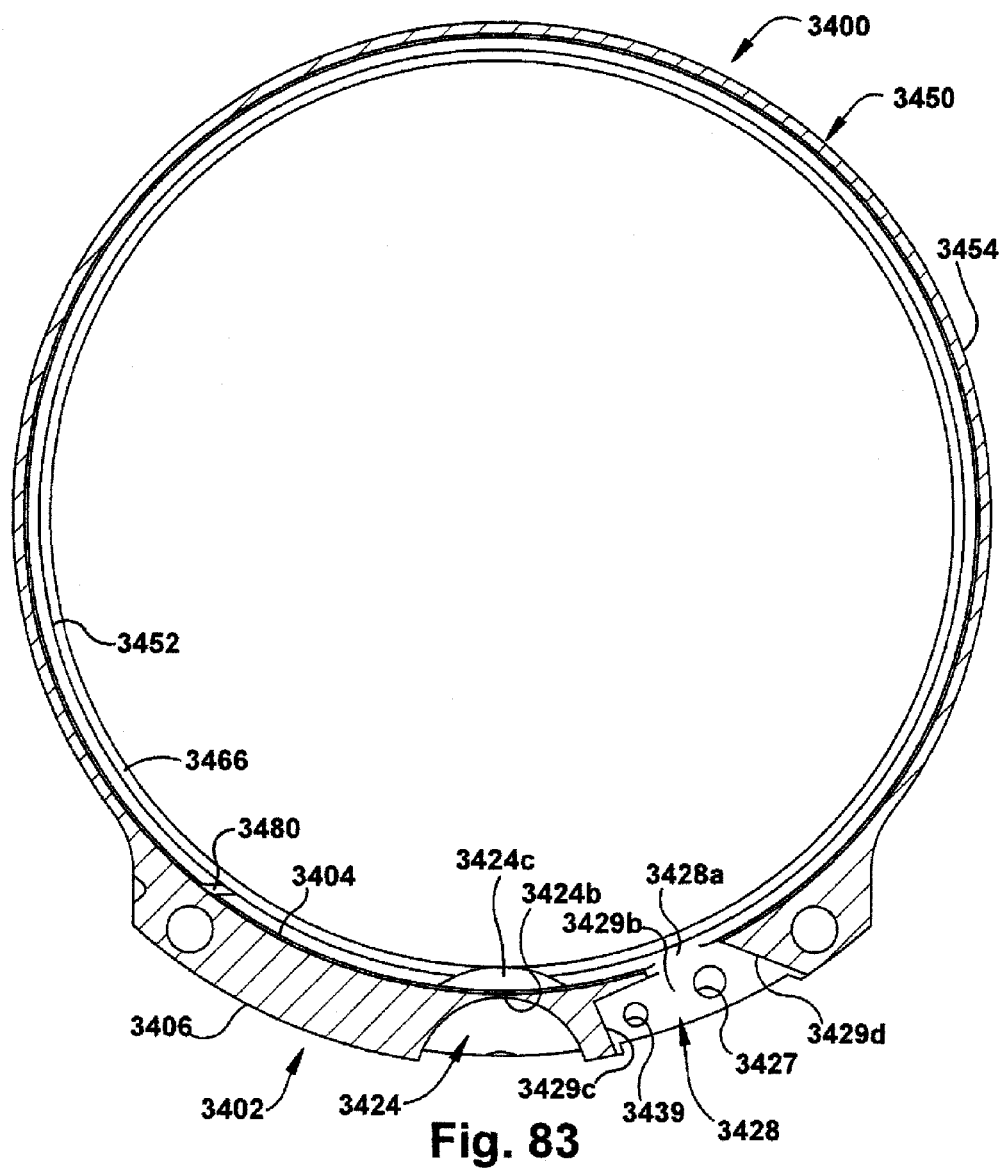
FIG. 83 is a schematic horizontal sectional view of the blade housing of FIG. 77, as seen from a plane indicated by the line 83-83 in FIG. 81.
Figure 83A:
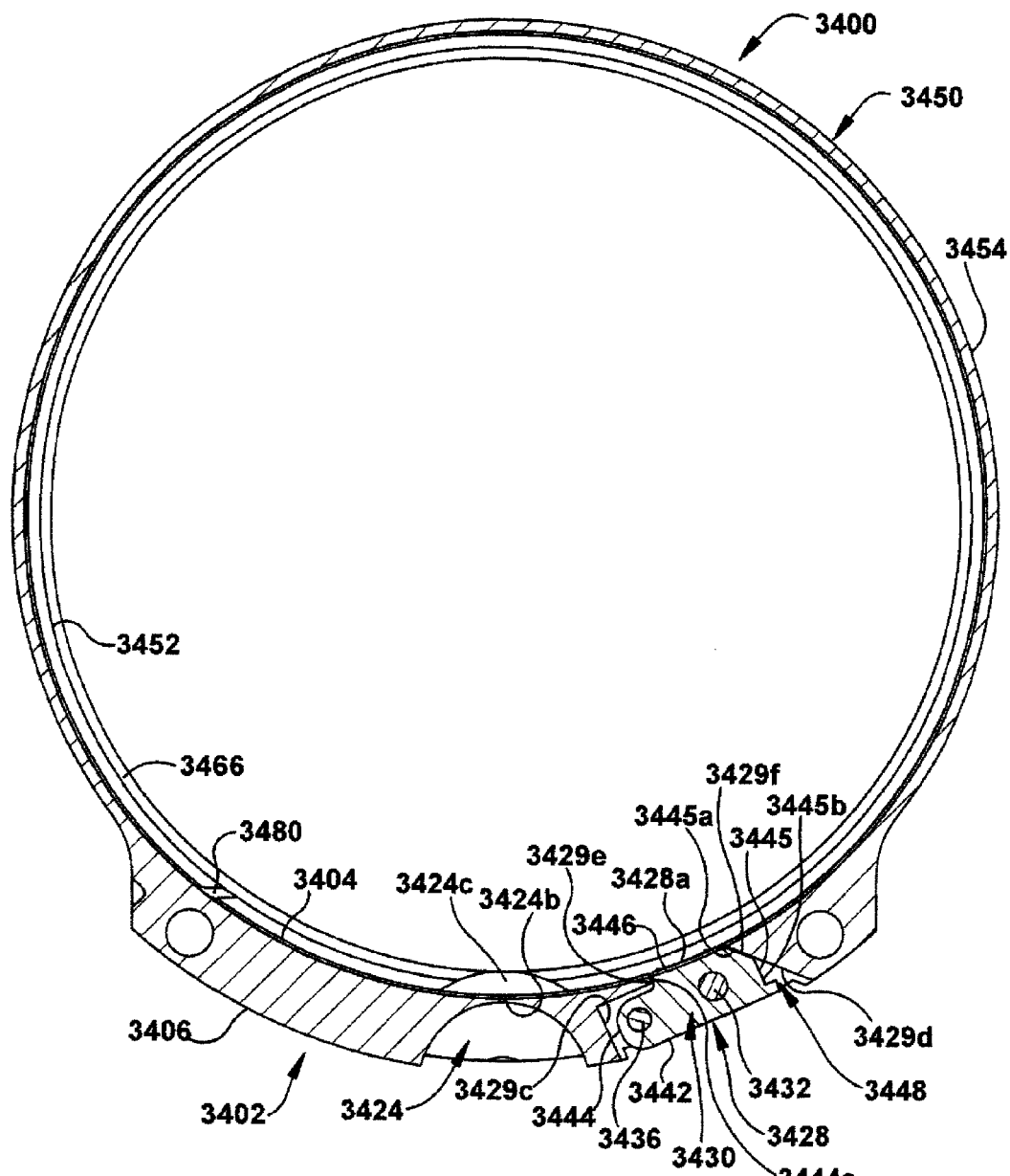
FIG. 83A is a schematic horizontal section view of the blade housing of FIG. 77, with the blade housing plug in the closed position.
Figure 83B:
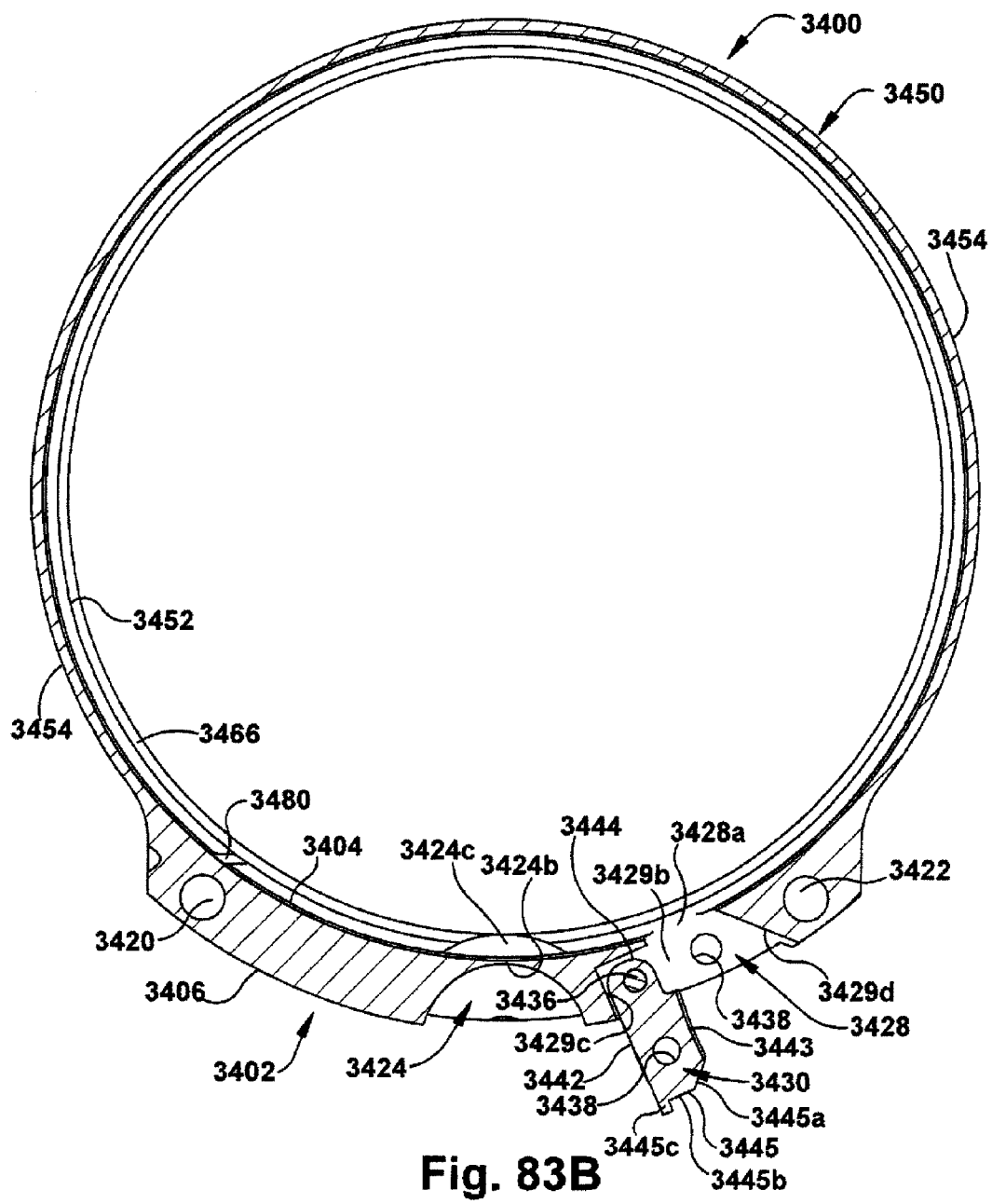
FIG. 83B is a schematic horizontal section view of the blade housing of FIG. 77, with the blade housing plug in the open position.

The blade housing plug 3430 pivots between an open position (FIGS. 79, 80 and 83B) and a closed position (FIGS. 77, 78 and 83A). In the open position of the blade housing plug 3430, an inner wall opening portion 3428*a* of the blade housing plug opening 3428 that intersects and is flush with the inner wall 3404 of the blade housing mounting section 3404 is accessible from the outer wall 3406 of the mounting section 3404. Access to the inner portion 3428*a* of the blade housing plug opening 3428 provides access to the annular passageway 504 of the blade-blade housing bearing structure 500 and allows insertion and removal of the rolling bearing strip 502 (or the rolling bearing strip 2502 of the blade-blade housing bearing structure 2500) into and from the annular passageway 504, as described previously. In the closed position of the blade housing plug 3430, the radial inner wall 3443 of the blade housing plug 3430 blocks and seals the inner wall opening 3428*a* defined by the blade housing plug opening 3428. In other words, the blade housing plug inner wall 3443 conforms to, continues and seals the radial inner wall 3404 of the mounting section 3402 of the blade housing 3400 when the blade housing plug 3430 is in the closed position.

Figure 85:
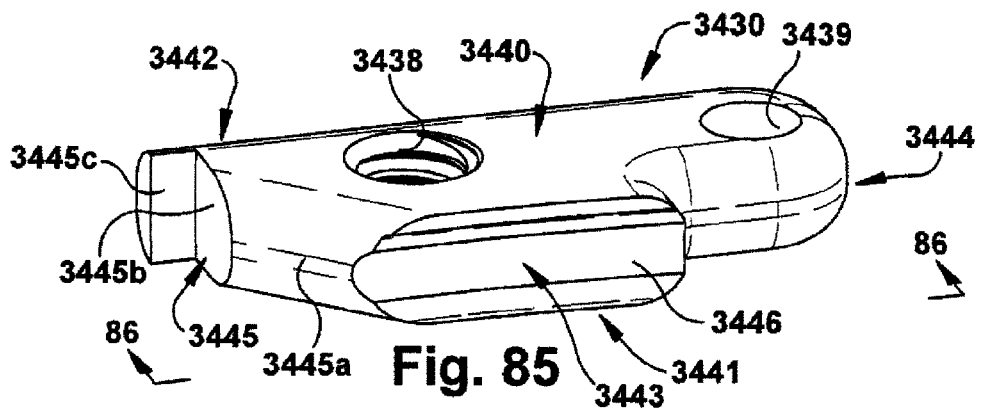
FIG. 85 is a schematic rear perspective view of the blade housing plug of the blade housing of FIG. 77.
Figure 86:
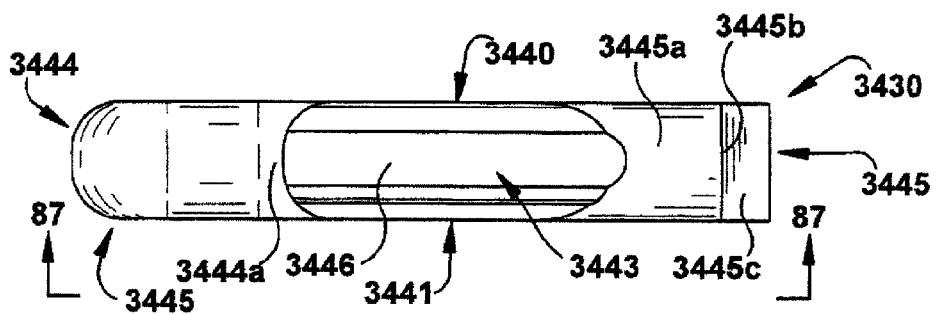
FIG. 86 is a schematic back elevation view of the blade housing plug of FIG. 85.
Figure 87:
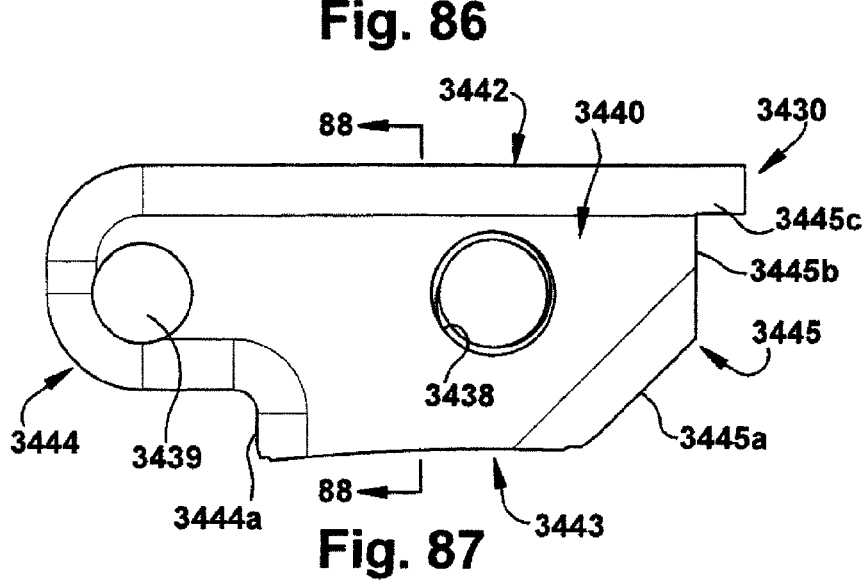
FIG. 87 is a schematic top elevation view of the blade housing plug of FIG. 85, as seen from a plane indicated by the line 87-87 in FIG. 86.
Figure 88:
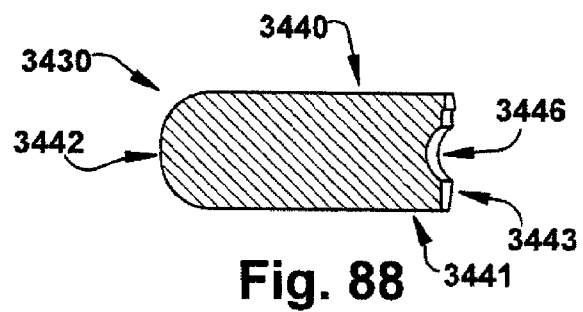
FIG. 88 is a schematic vertical section view of the blade housing plug of FIG. 85, as seen from a plane indicated by the line 88-88 in FIG. 87.

Additionally, a bearing surface portion 3446 (FIGS. 85, 86 and 88) of the inner wall 3443 of the blade housing plug 3440 defines a bearing surface that and continues the bearing surface 3459 of the blade support section 3450 of the blade housing 3400, just as the portion 446 of the radial inner wall 447 of the blade housing plug 430 defined a bearing surface and continued the bearing surface 459 of the blade support section 450 of the blade housing 400. Thus, when the blade housing plug 3430 is in the closed position (FIG. 83A) in the blade housing plug opening 3428 of the blade housing mounting section 3402, the blade housing bearing race 3460 is substantially continuous about the entire 360° circumference of the blade support section 3450.

The blade housing plug 3430 is maintained in the closed position within the blade housing plug opening 3428 by a single fastener which in one exemplary embodiment is a threaded fastener or screw 3432 that passes through a threaded opening 3438 extending vertically or axially through the blade housing plug 3430. The threaded fastener 3432 also passes through first and second axially aligned upper and lower clearance openings 3426, 3427 in the mounting section 3402 of the blade housing 3400. The upper clearance opening 3426 extends from the upper end 3408 of the mounting section 3402 to the blade housing plug opening 3428, while the lower clearance opening 3427 extends from the blade housing plug opening 3428 through the lower end 3410 of the mounting section. The upper clearance opening 3426 is countersunk such that when the threaded fastener 3432 is inserted through the aligned openings 3438, 3426, 3427, an upper end of the threaded fastener 3432 is substantially flush with the upper end 3408 of the mounting section 3402. When the threaded fastener 3432 is removed from the blade housing 3400 and the blade housing plug 3430, the blade housing plug is free to pivot about the hinge pin 3436.

As can best be seen in FIG. 83A, the blade housing plug 3430 is configured such that, when in the closed position, the plug 3430 occupies most of the blade housing plug opening 3428. There is a generally V-shaped cavity 3448 extending between the blade housing plug 3430 and the angled right side wall 3429*d* defining the blade housing plug opening 3428. The V-shaped cavity 3448 advantageously allows insertion of a small instrument such as the working end of a small screwdriver (not shown) to pivot the blade housing plug 3420 from the closed position to the open position after the threaded fastener or screw 3432 has been removed from the blade housing 3400 and the blade housing plug 3430.

As can best be seen in FIGS. 85-88, the blade housing plug 3430 is defined by generally parallel upper and lower surfaces 3440, 3441 and an outer wall 3442 and the inner wall 3443. As is best seen in FIG. 78, when the blade housing plug 3430 is in the closed position, the upper and lower surfaces 3440, 3441 are parallel to and in close proximity to the top and bottom walls 3429*a*, 3429*b*, respectively, defining the blade housing plug opening 3428. As is best seen in FIG. 83A, when the blade housing plug 3430 is in the closed position, the blade housing plug inner wall 3443 continues and is flush with the radial inner wall 3404 of the mounting section 3402 in the region of the inner portion 3428*a* of the blade housing plug opening 3428. As can best be seen in FIG. 87, the inner wall 3443 of the blade housing plug is slightly arcuate to conform to a radius of curvature of the inner wall 3404 of the mounting section 3402 and the inner wall 3452 of the blade support section 3450 of the blade housing 3400. The blade housing plug inner wall 3443 also defines the bearing surface portion 3446, as discussed previously, that is aligned with and continues the bearing race 3460 of the blade support section 3450 of the blade housing 3400.

As can be seen in FIG. 83A, the blade housing plug 3430 also includes a left side wall 3444 and a right side wall 3445. When the blade housing plug 3430 is in the closed position, an inner portion 3444*a* of the left side wall 3444 of the blade housing plug 3430 abuts against a corresponding inner portion 3429*e* of the L-shaped left side wall 3429*c* defining the blade housing plug opening 3428. Similarly, the right side wall 3445 of the blade housing plug 3430 includes an inner angled portion 3445*a* that abuts an inner portion 3429*f* of the angled right side wall 3429d defining the blade housing plug opening 3428. The stepped portion 3445b of the right side wall 3445 is spaced from an outer portion of the angled right side wall 3429d thereby forming the V-shaped cavity 3448 discussed previously. The V-shaped cavity 3448 facilitates insertion of a small tool to pry the blade housing plug 3430 from the closed position to the open position after the threaded fastener 3432 has been removed from the blade housing mounting section 3402. The stepped portion 3445b of the right side wall 3445 includes a peripherally extending outer ledge 3445c (FIGS. 83B, 85, 86 and 87) that extends the outer wall 3442 of the blade housing plug 3430 and provides a convenient surface for prying the blade housing plug 3430 to the open position with the working end of a small screwdriver or the like.

Advantageously, the close fit between the respective facing or opposing walls defining the blade housing plug opening 3428 and the walls defining the blade housing plug 3430 and the close fit between the inner wall 3443 of the blade housing plug 3430 and the inner wall opening 3428a of the blade housing plug opening 3428 effectively provides a seal between the blade housing plug 3430 and the blade housing plug opening 3428. This seal between the blade housing plug 3430 and the blade housing walls defining the blade housing plug opening 3428 impedes the ingress of pieces of meat, bone and other debris which may work their way into the blade housing plug opening 3428 from an exterior of the blade housing 3400 from moving through the blade housing plug opening 3428 and into the blade-blade housing bearing structure 500 and/or the driven gear 328 of the rotary knife blade 300. Additionally, as explained previously with respect to the blade housing 400 and the rotary knife blade 300, the combination of the knife blade radial projection 348 and a driven gear projection or cap 3466 (FIG. 84) defining a portion of the lower end 3458 of the blade support section 3450 form a type of labyrinth seal that inhibits ingress of debris into the regions of the driven gear 328 and the bearing race 320 of the rotary knife blade 300.

As used herein, terms of orientation and/or direction such as front, rear, forward, rearward, distal, proximal, distally, proximally, upper, lower, inward, outward, inwardly, outwardly, horizontal, horizontally, vertical, vertically, axial, radial, longitudinal, axially, radially, longitudinally, etc., are provided for convenience purposes and relate generally to the orientation shown in the Figures and/or discussed in the Detailed Description. Such orientation/direction terms are not intended to limit the scope of the present disclosure, this application, and/or the invention or inventions described therein, and/or any of the claims appended hereto. Further, as used herein, the terms comprise, comprises, and comprising are taken to specify the presence of stated features, elements, integers, steps or components, but do not preclude the presence or addition of one or more other features, elements, integers, steps or components.

What have been described above are examples of the present disclosure/invention. It is, of course, not possible to describe every conceivable combination of components, assemblies, or methodologies for purposes of describing the present disclosure/invention, but one of ordinary skill in the art will recognize that many further combinations and permutations of the present disclosure/invention are possible. Accordingly, the present disclosure/invention is intended to embrace all such alterations, modifications, and variations that fall within the spirit and scope of the appended claims.

What is claimed is:

1. A rolling bearing strip for a power operated rotary knife providing bearing support for rotation of a rotary knife blade with respect to a blade housing, the rolling bearing strip comprising:
   a plurality of rolling bearings disposed in spaced apart relation; and
   a flexible separator cage for positioning the plurality of rolling bearings, the flexible separator cage including first and second ends, the first end of the separator cage including a projecting member and the second end of the separator cage including a receiving member, the first end projecting member and the second end receiving member being in opposed facing relationship and the first end projecting member extending into the second end receiving member, the first and second ends secured to form a continuous ring.

2. The rolling bearing strip of claim 1 wherein the first end projecting member interfits into the second end receiving member to secure the first and second ends.

3. The rolling bearing strip of claim 1 wherein the first end includes a wall defining the projecting member and the second end includes a wall defining the receiving member.

4. The rolling bearing strip of claim 3 wherein the projecting member comprises a projecting tab extending transversely from the wall of the first end and the second end receiving member comprises a slot extending radially into the wall of the second end.

5. The rolling bearing strip of claim 3 wherein respective facing, overlapping portions of the wall of the first end and the wall of the second end are substantially planar.

6. The rolling bearing strip of claim 4 wherein the first end projecting tab extends substantially orthogonally from a planar portion of the first end wall and the second end slot extends substantially orthogonally into a planar portion of the second end wall.

7. The rolling bearing strip of claim 4 wherein the first end projecting tab is substantially oval-shaped in axial cross section and extends along a center line of the rolling bearing strip and the second end slot is substantially oval-shaped in axial cross section and extends along the center line of the rolling bearing strip.

8. The rolling bearing strip of claim 4 wherein an axial extent of the first end wall projecting tab is smaller than an axial extent of the second end wall slot.

9. The rolling bearing strip of claim 4 wherein a radial extent of the first end wall projecting tab away from the first end wall is substantially equal to a radial extent of the second end wall slot.

10. The rolling bearing strip of claim 1 wherein the first end of the separator cage includes a bead extending from the first end in a direction away from the projecting member, the bead extending circumferentially along a center line of the rolling bearing strip.

11. The rolling bearing strip of claim 10 wherein the first end bead is substantially arcuate-shaped in radial cross section.

12. The rolling bearing strip of claim 10 wherein a radial outer surface of the first end bead defines a diameter with respect to the center line of the rolling bearing strip that is less than an outer diameter of each of the rolling bearings of the plurality of rolling bearings with respect to the center line of the rolling bearing strip.

13. The rolling bearing strip of claim 4 wherein the second end includes a bead extending from the second end wall to define a portion of the second end slot, the bead extending circumferentially along a center line of the rolling bearing strip.

14. The rolling bearing strip of claim 13 wherein the second end bead is substantially arcuate-shaped in radial cross section.

15. A rolling bearing strip for a power operated rotary knife providing bearing support for rotation of a rotary knife blade with respect to a blade housing of the power operated rotary knife, the rolling bearing strip comprising:
- a plurality of rolling bearings disposed in spaced apart relation; and
- a flexible separator cage for positioning the plurality of rolling bearings, the flexible separator cage including first and second end portions, the first end portion of the separator cage including a projection extending transversely from the wall and the second end portion of the separator cage including a receiving member, the first end portion projection extending into the second end portion receiving member, the first and second ends secured to form a continuous ring.

16. The rolling bearing strip of claim 15 wherein the first end projection interfits into the second end receiving member to secure the first and second ends.

17. The rolling bearing strip of claim 15 wherein the first end includes a wall defining the projection and the second end includes a wall defining the receiving member.

18. The rolling bearing strip of claim 17 wherein the projection comprises a projecting tab extending transversely from the wall of the first end and the second end receiving member comprises a slot extending radially into the wall of the second end.

19. The rolling bearing strip of claim 18 wherein the first end projection tab extends substantially orthogonally from a planar portion of the first end wall and the second end slot extends substantially orthogonally into a planar portion of the second end wall.

20. The rolling bearing strip of claim 18 wherein the first end projecting tab is substantially oval-shaped in axial cross section and extends along a center line of the rolling bearing strip and the second end slot is substantially oval-shaped in axial cross section and extends along the center line of the rolling bearing strip.

* * * * *